United States Patent [19]
Smith et al.

[11] Patent Number: 5,381,986
[45] Date of Patent: Jan. 17, 1995

[54] FOLDING WING-TIP SYSTEM

[75] Inventors: Mark H. Smith, Vashon Island; Michael E. Renzelmann, Woodinville; Alan D. Marx, Seattle, all of Wash.

[73] Assignee: The Boeing Company, Seattle, Wash.

[21] Appl. No.: 46,015

[22] Filed: Apr. 12, 1993

Related U.S. Application Data

[63] Continuation-in-part of Ser. No. 828,308, Jan. 30, 1992, Pat. No. 5,201,479.

[51] Int. Cl.$^6$ ............................................. B64C 3/56
[52] U.S. Cl. ................................ 244/49; 244/102 SL; 244/120
[58] Field of Search ............... 244/218, 49, 120, 124, 244/102 SL; 292/335, 144, 302; 92/14, 16, 20, 23, 24, 29; 116/124; 280/414

[56] References Cited

U.S. PATENT DOCUMENTS

| | | | |
|---|---|---|---|
| Re. 22,435 | 2/1944 | Evans | 116/124 |
| 2,280,809 | 4/1942 | Evans | 116/124 |
| 2,289,224 | 7/1942 | Swanson et al. | 244/49 |
| 2,320,849 | 6/1943 | Claybourn et al. | 70/265 |
| 2,397,526 | 4/1946 | Bonbright | 244/12 |
| 2,712,421 | 7/1955 | Naumann | 244/49 |
| 2,719,682 | 10/1955 | Handel | 244/49 |
| 2,811,136 | 10/1957 | Westcoff, Jr. et al. | 244/102 SL |
| 2,925,233 | 2/1960 | Dunn et al. | 244/43 |
| 4,024,800 | 5/1977 | Masclet | 244/102 SL |
| 4,664,338 | 5/1987 | Steuer et al. | 244/328 |
| 4,778,129 | 10/1988 | Byford | 244/49 |

FOREIGN PATENT DOCUMENTS 888367 8/1953 Germany .
635260 4/1950 United Kingdom .

Primary Examiner—Galen L. Barefoot
Attorney, Agent, or Firm—Joan H. Pauly

[57] ABSTRACT

A plurality of latch pins are locked into a latch position by primary locks and secondary locks. Each primary lock mechanically blocks movement of its corresponding secondary lock into the secondary lock's locked position when the primary lock is out of its locked position. The secondary locks are ganged together to cause them to move together into and out from their locked positions. A follow-up switch senses movement of the ganging mechanism. A latch pin inhibitor blocks movement of the latch pin into the latch position and is moved away to permit latching by spreading of the wing tip. The inhibitor is linked to a valve to shift the valve and thereby cause hydraulic pressure to be supplied to extend the latch pin. When the locks are in their looked positions, the secondary locks mechanically block the primary locks from moving out of their locked positions. The secondary locks are biased into their locked positions. During flight, the latch pins and locks are isolated from hydraulic pressure. Spreading, latching, and locking procedures are carried out automatically following manual actuation of a control member. A hydraulic actuator that moves the wing-tip between folded and spread positions acts as a strut to hold the wing tip in the folded position.

13 Claims, 53 Drawing Sheets

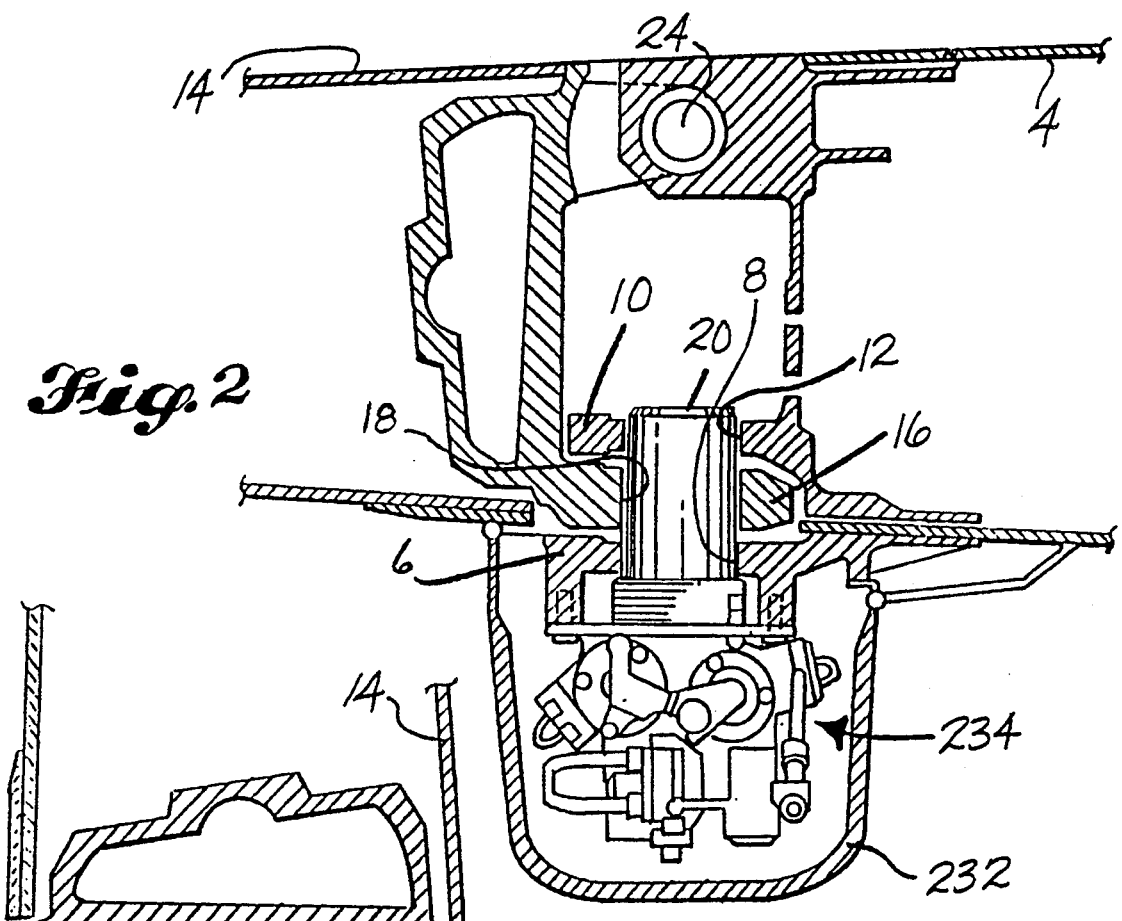
Fig.2
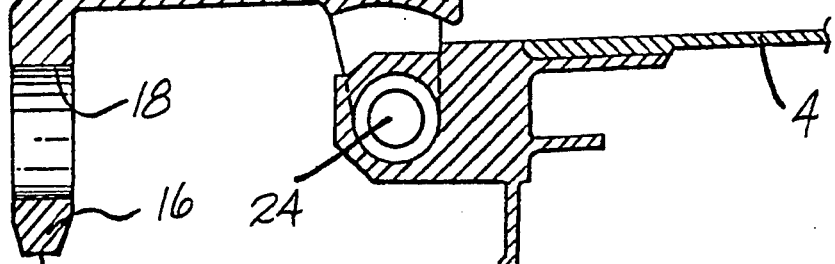
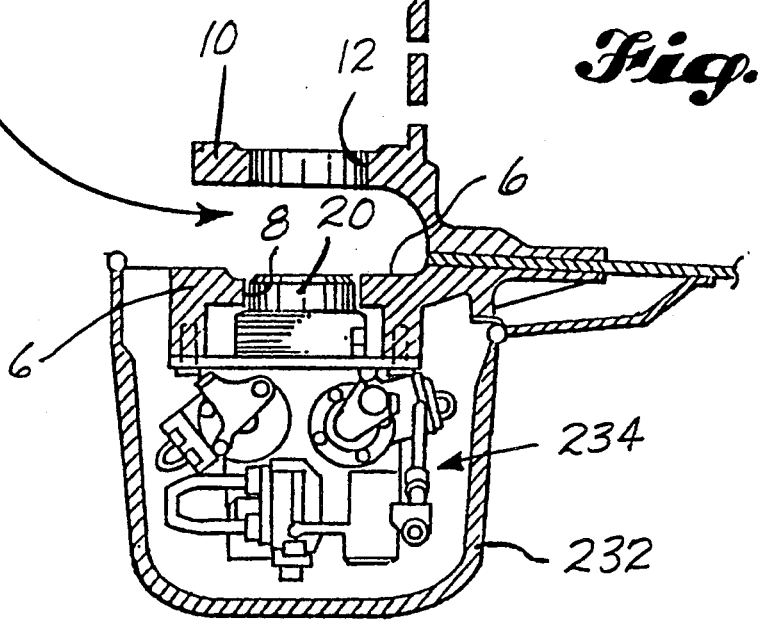
Fig.3

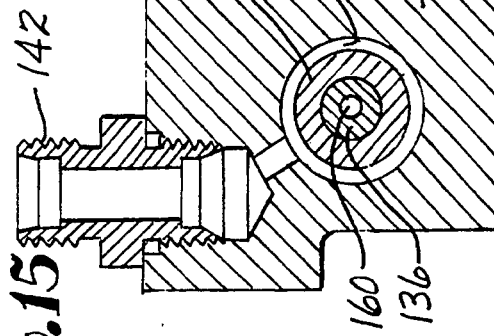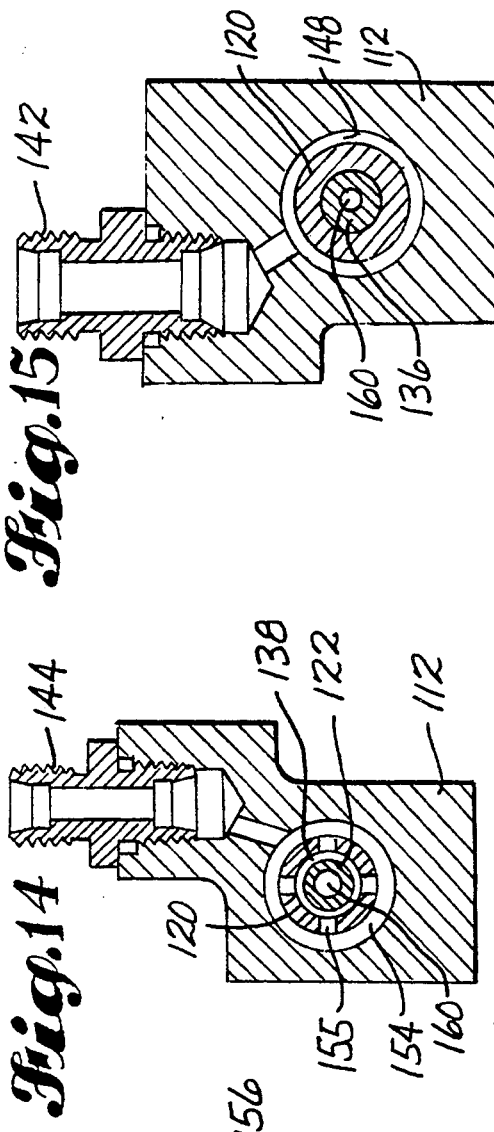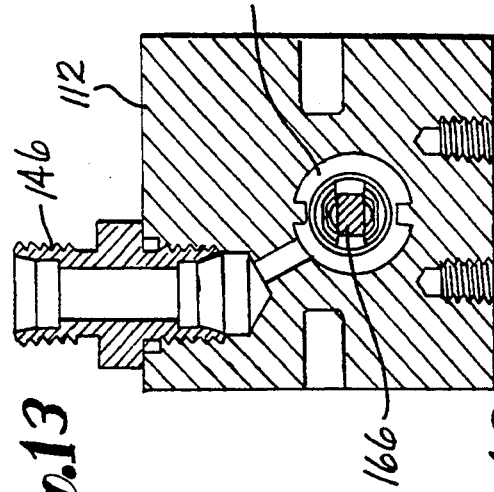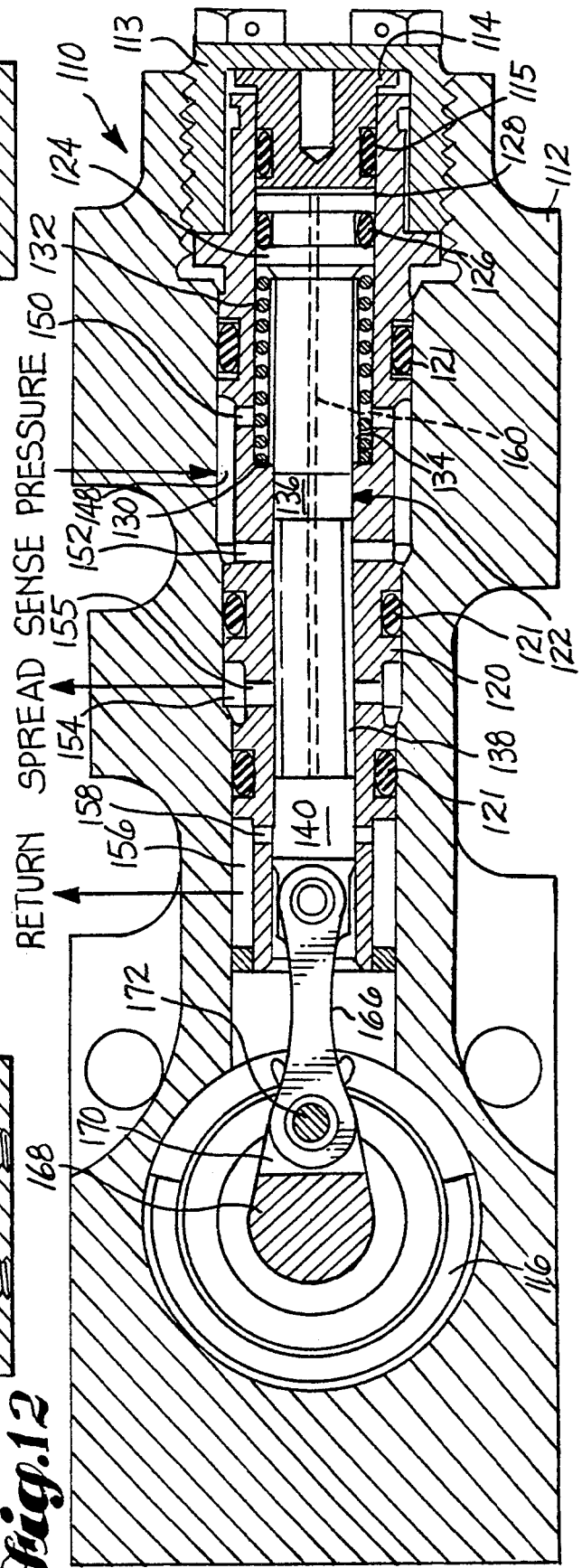

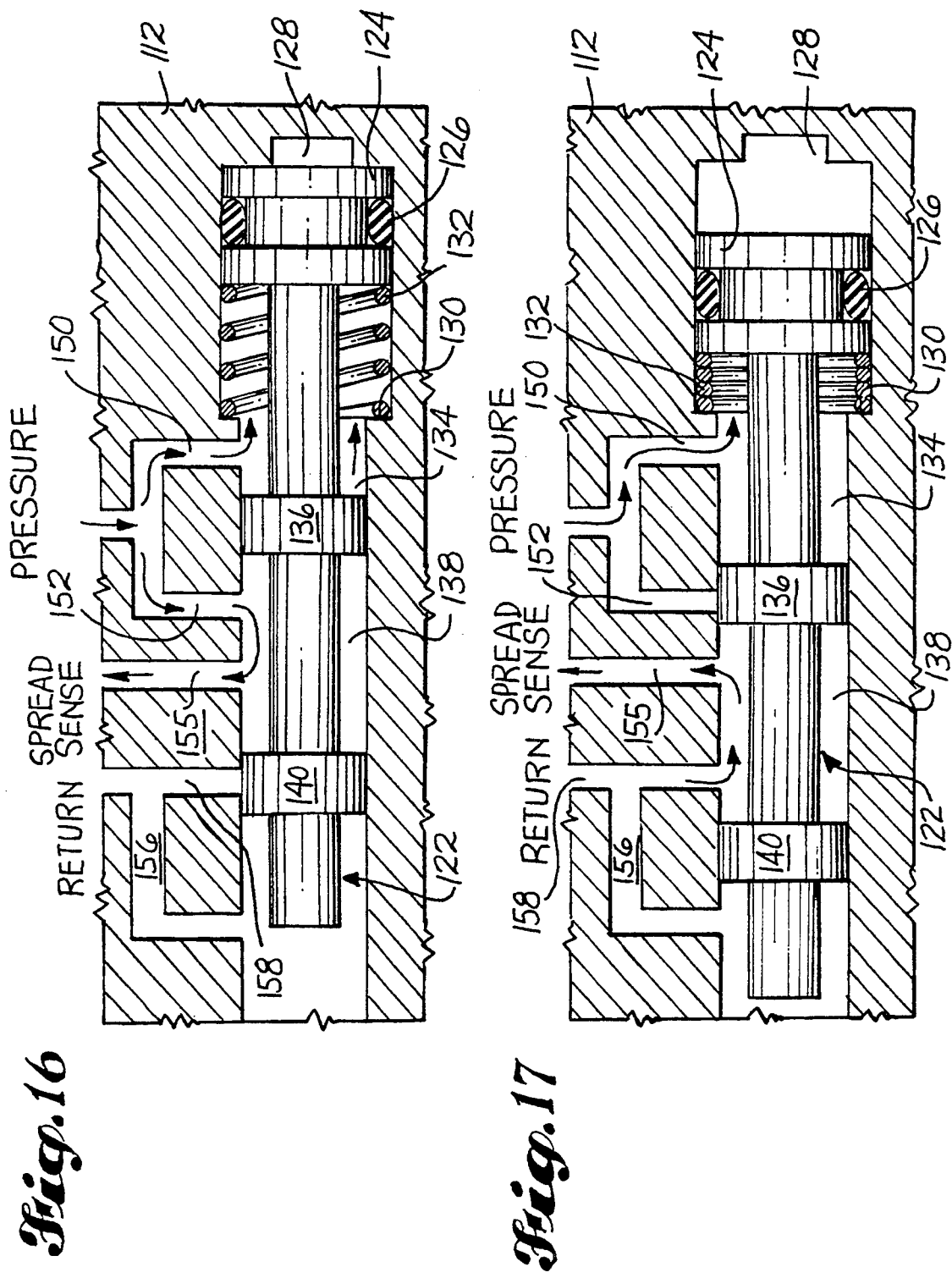

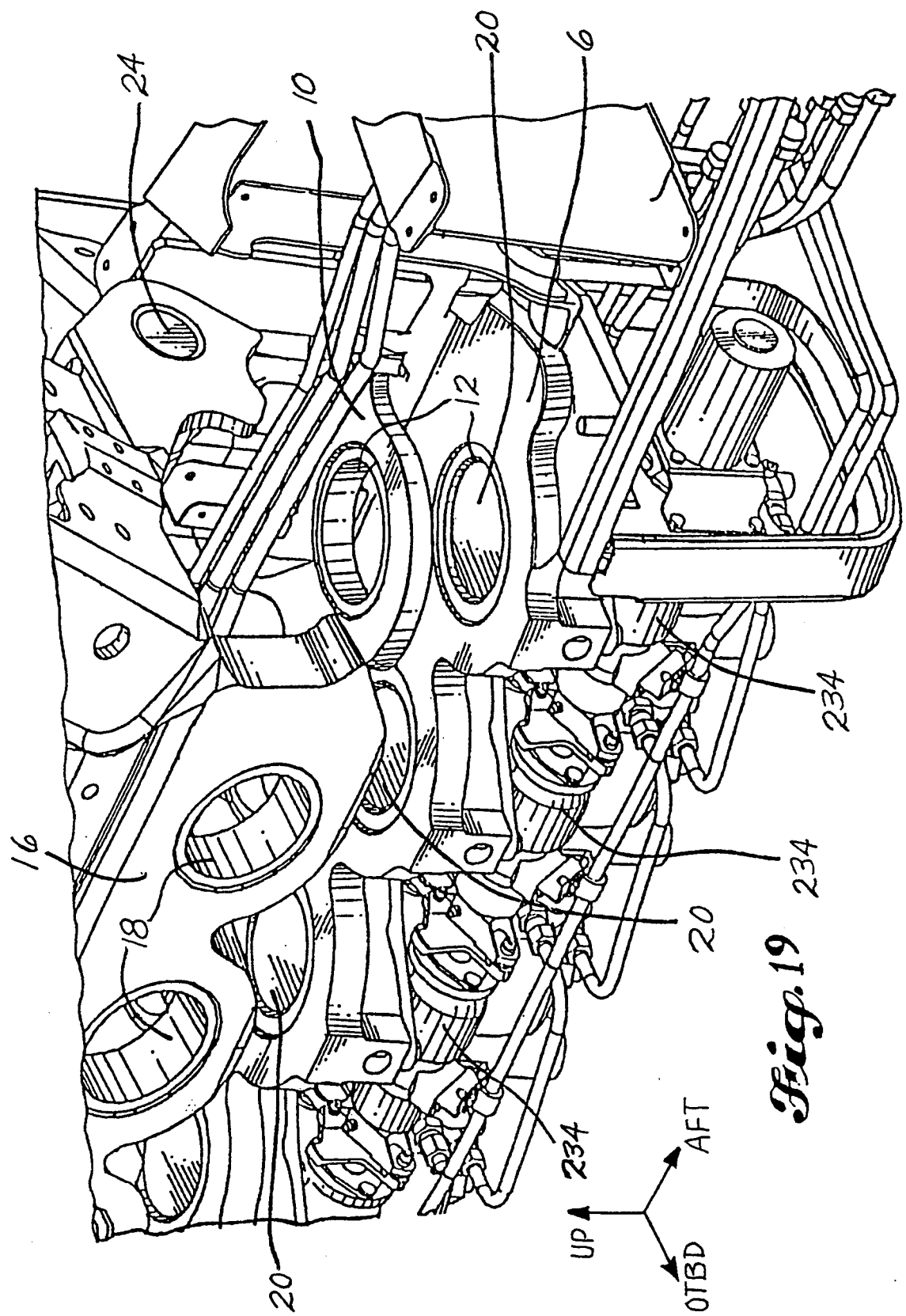

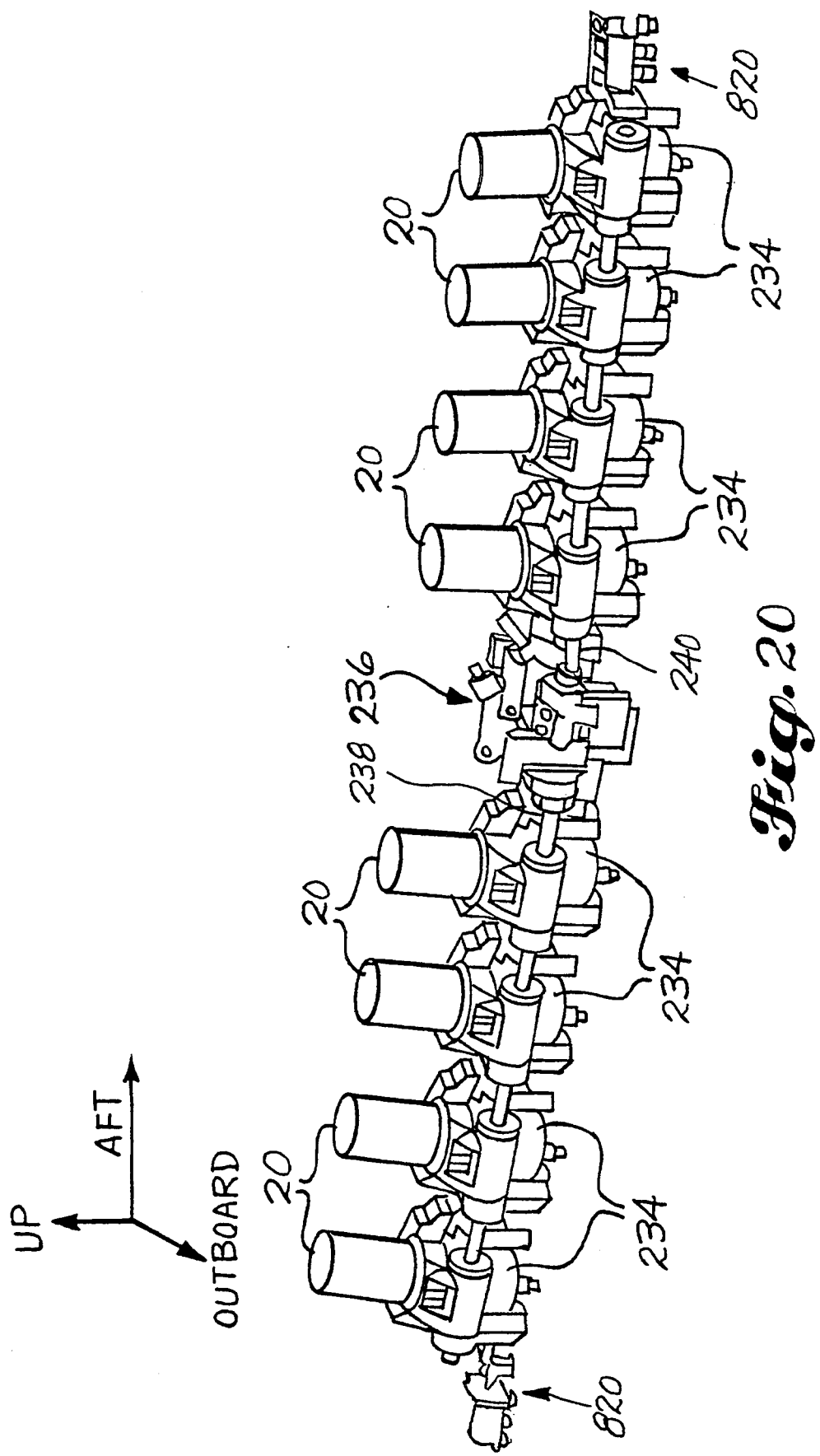

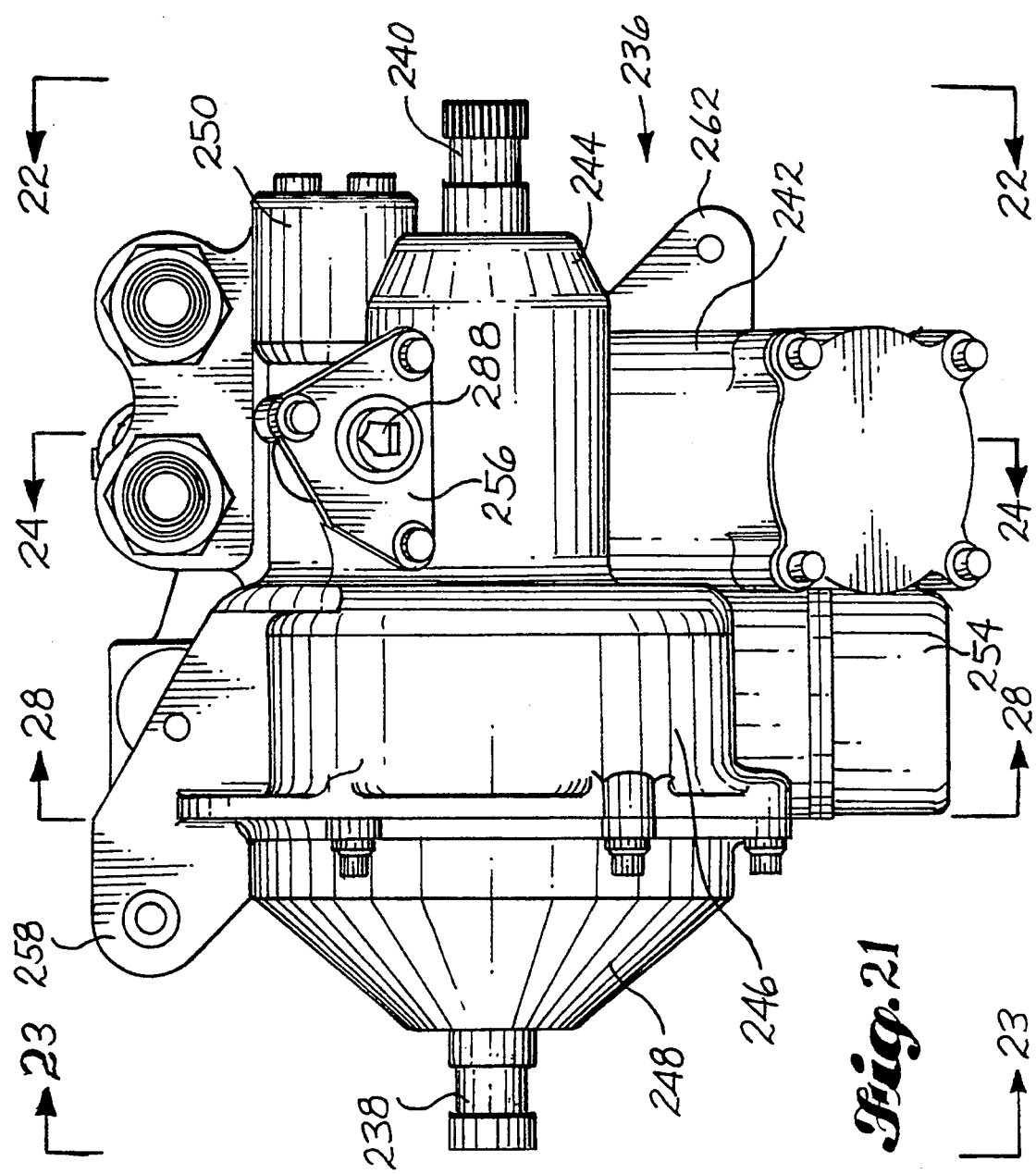

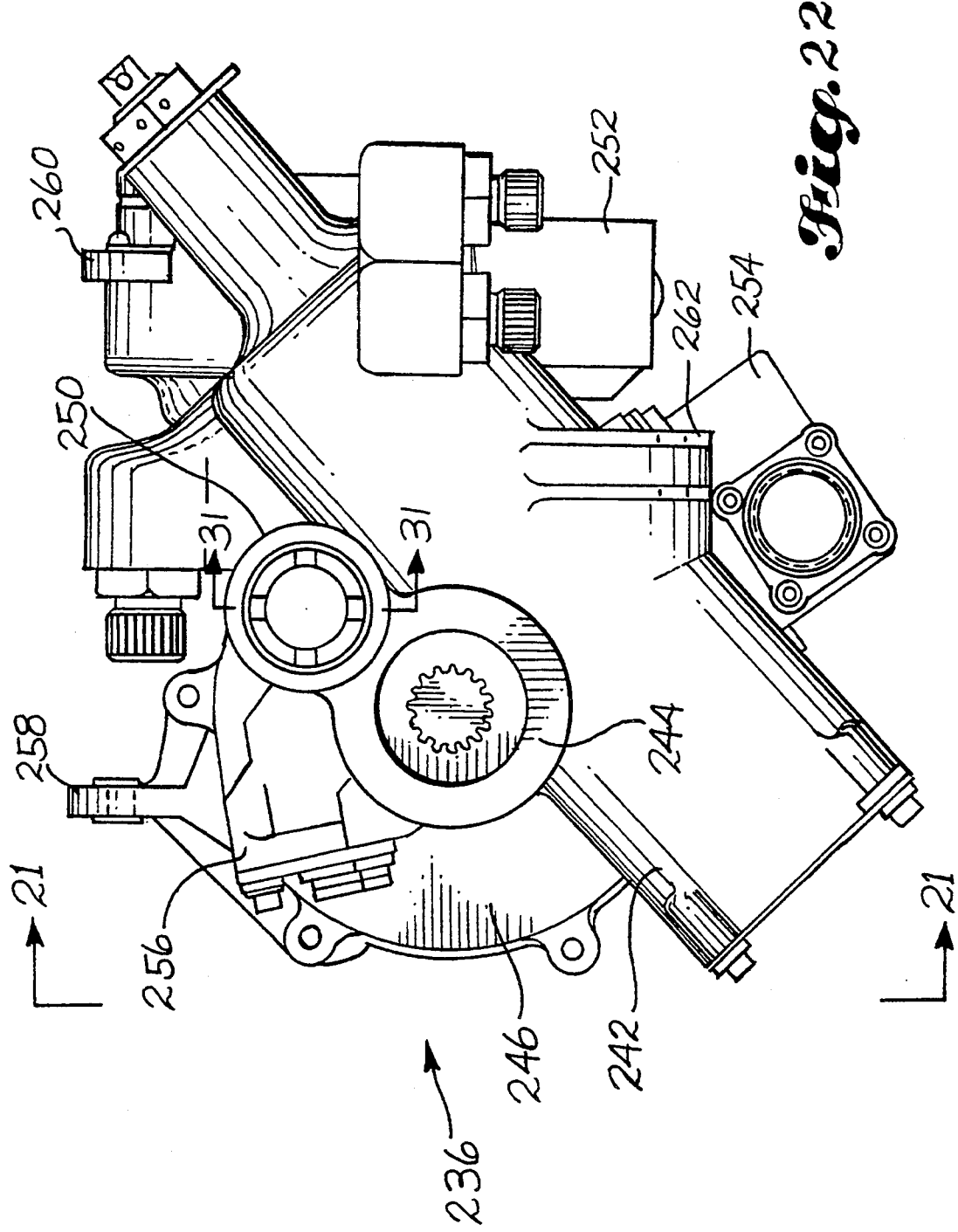

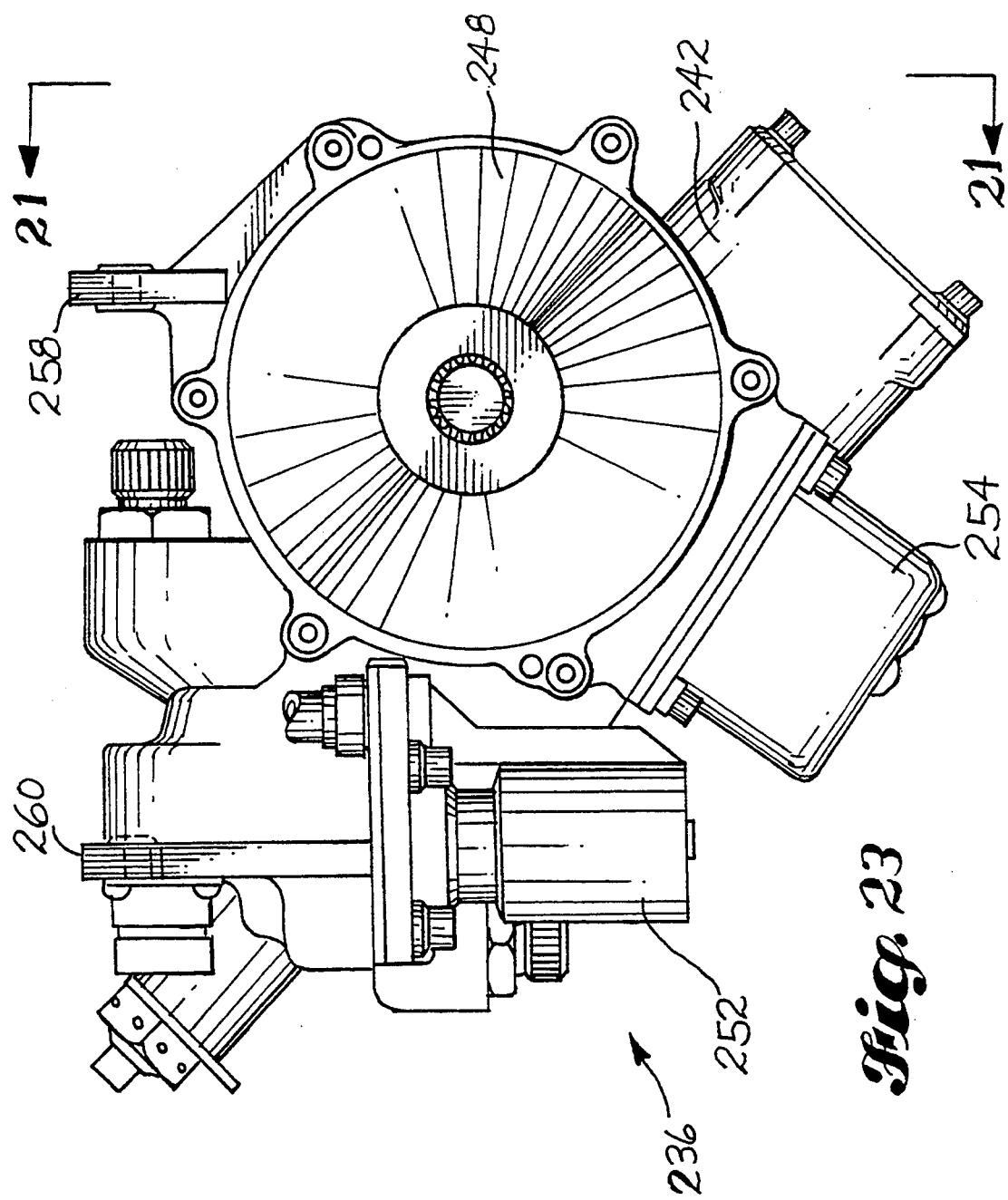

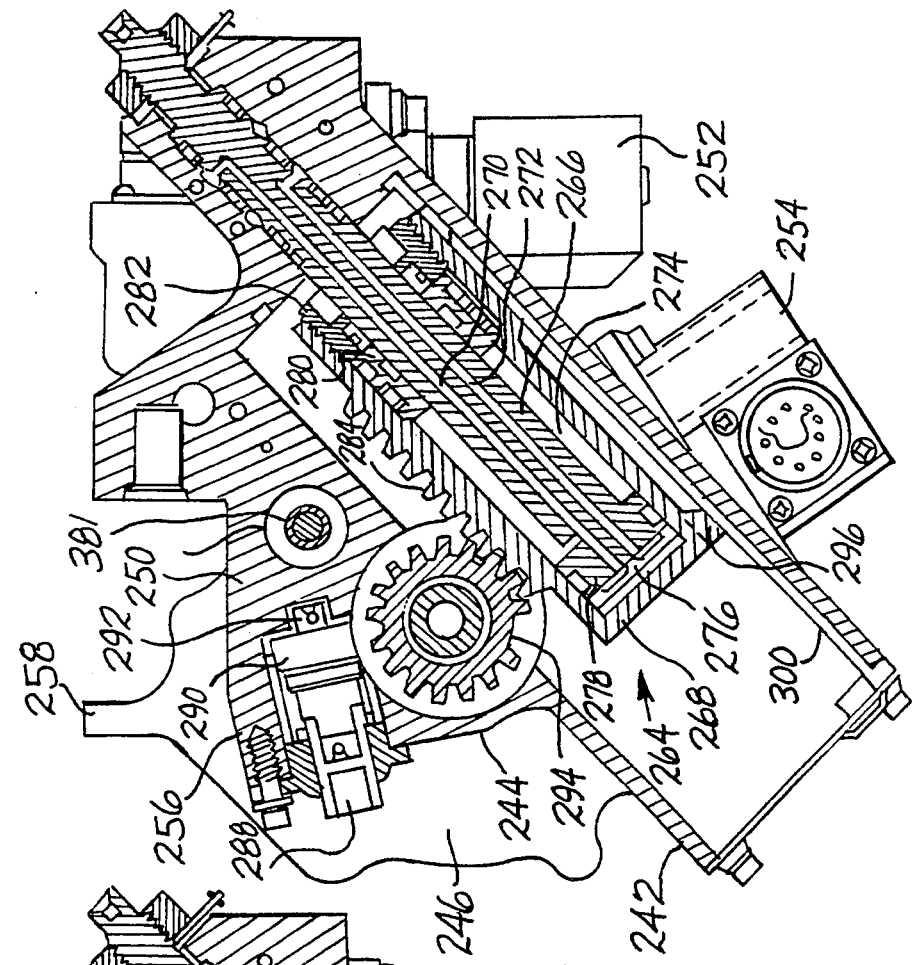
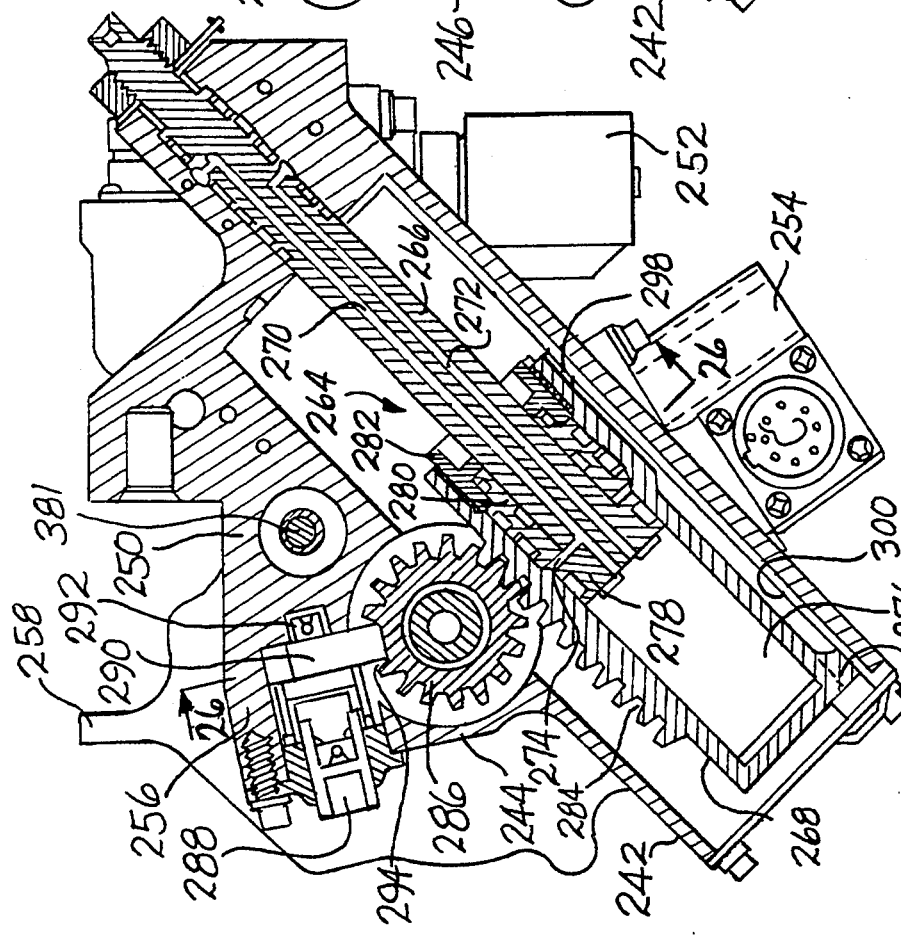

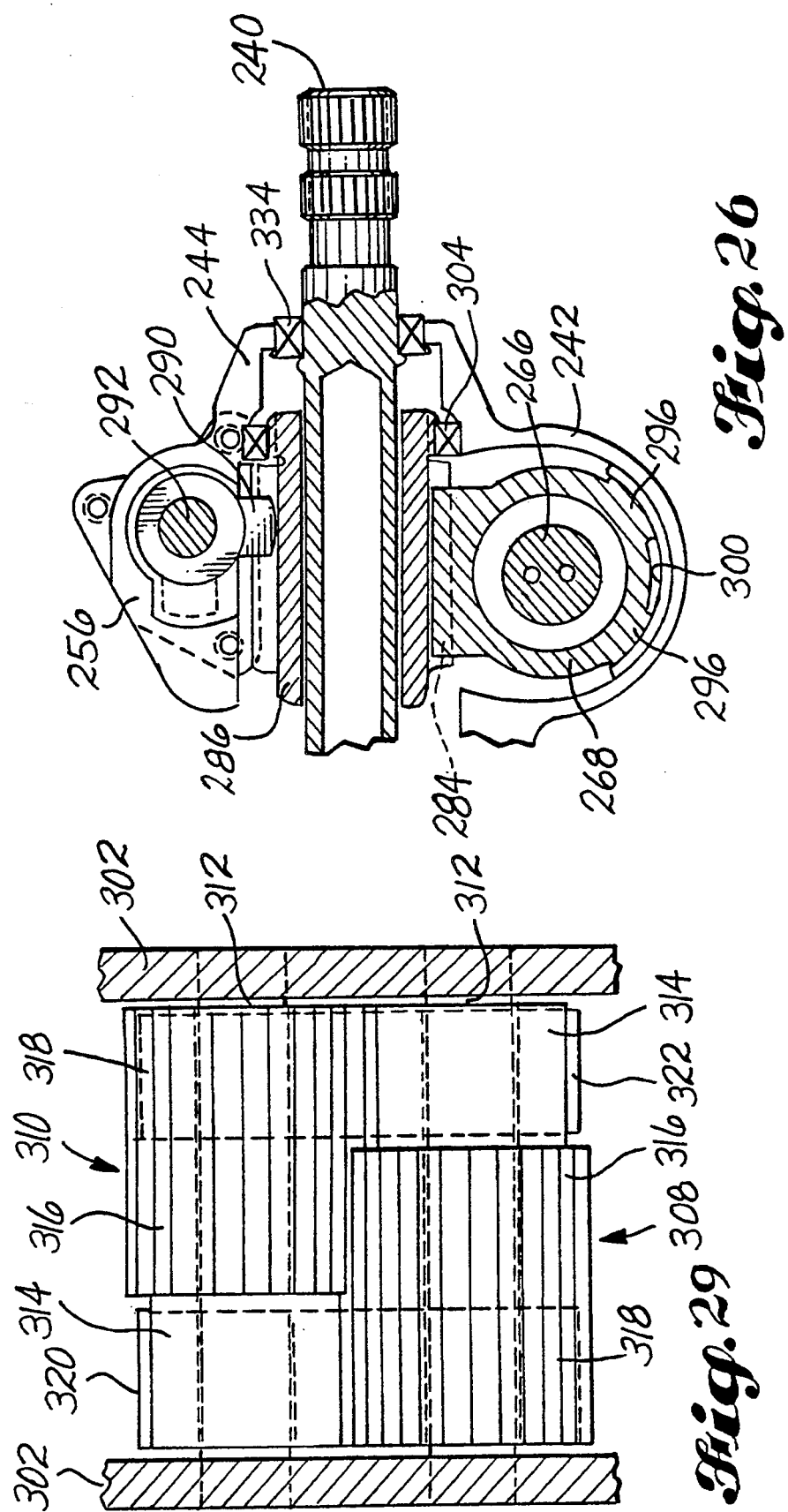

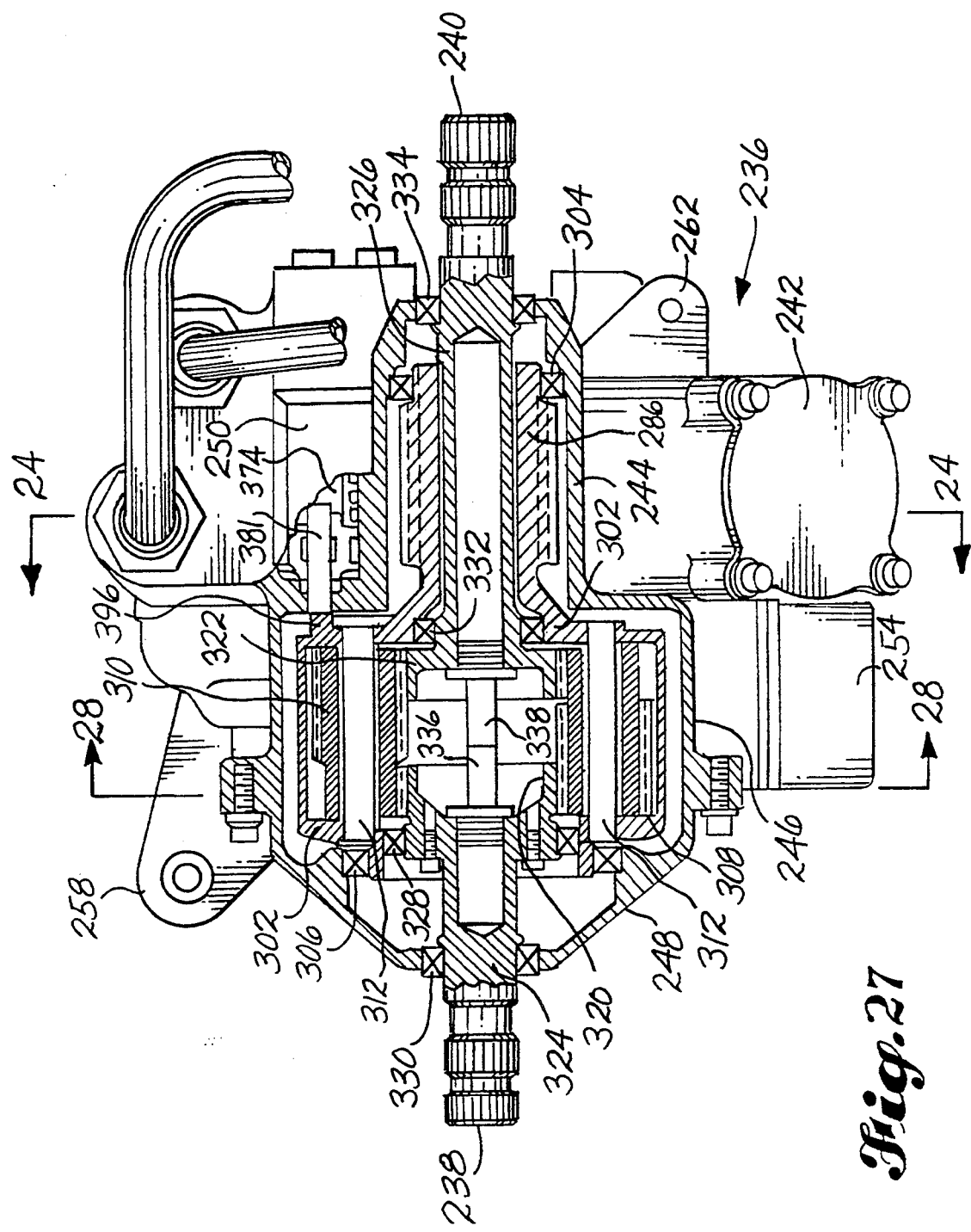

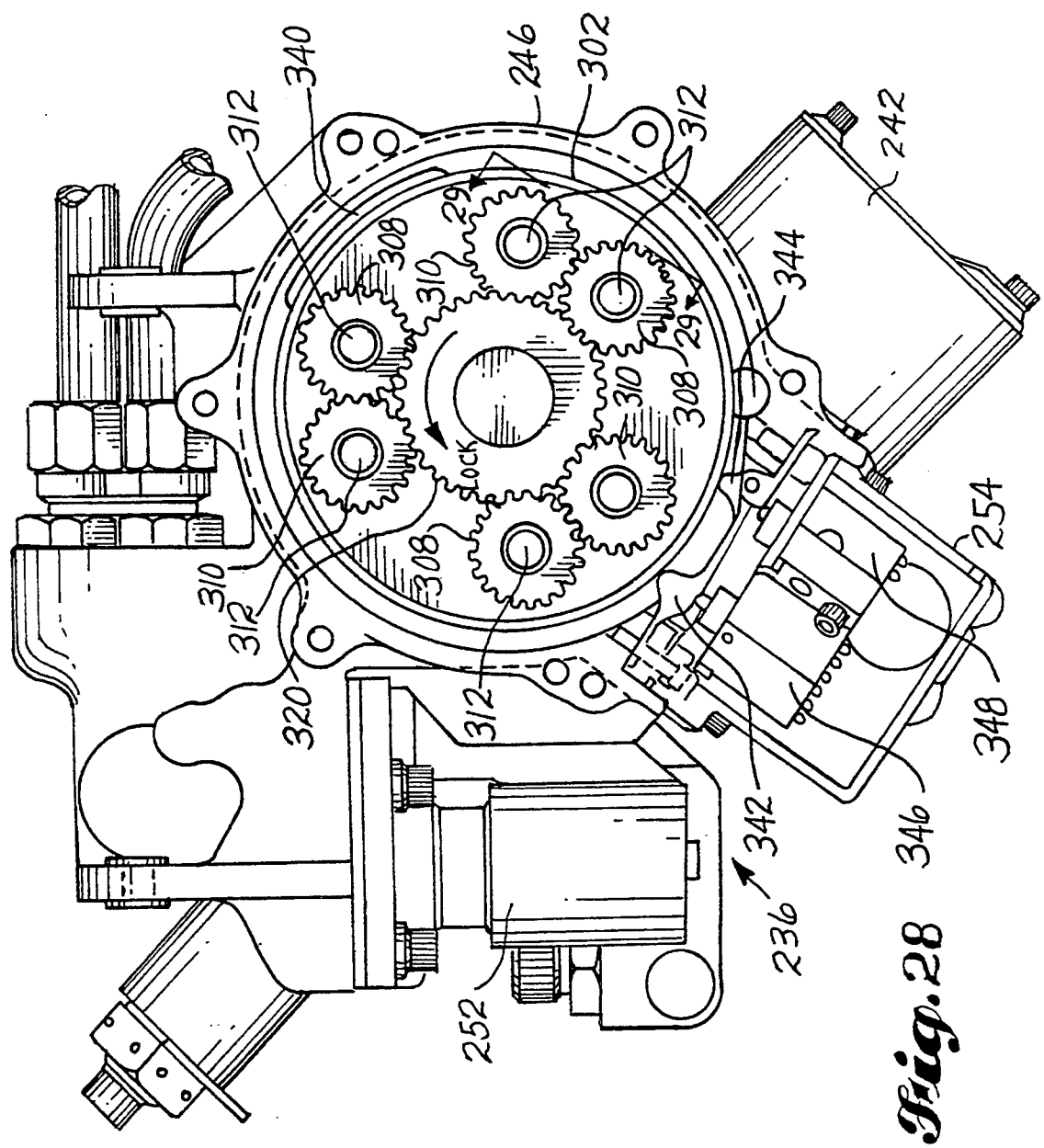

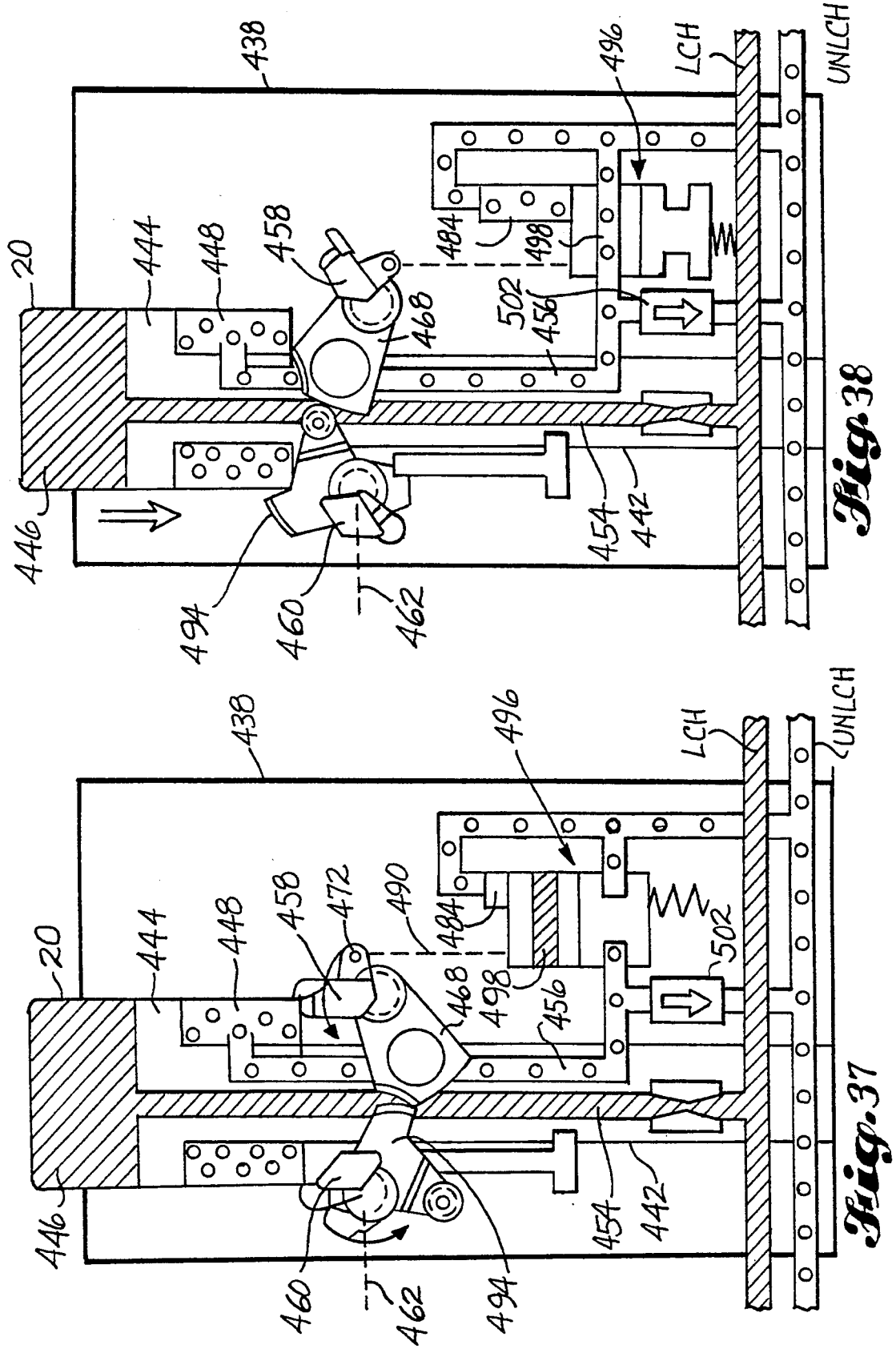

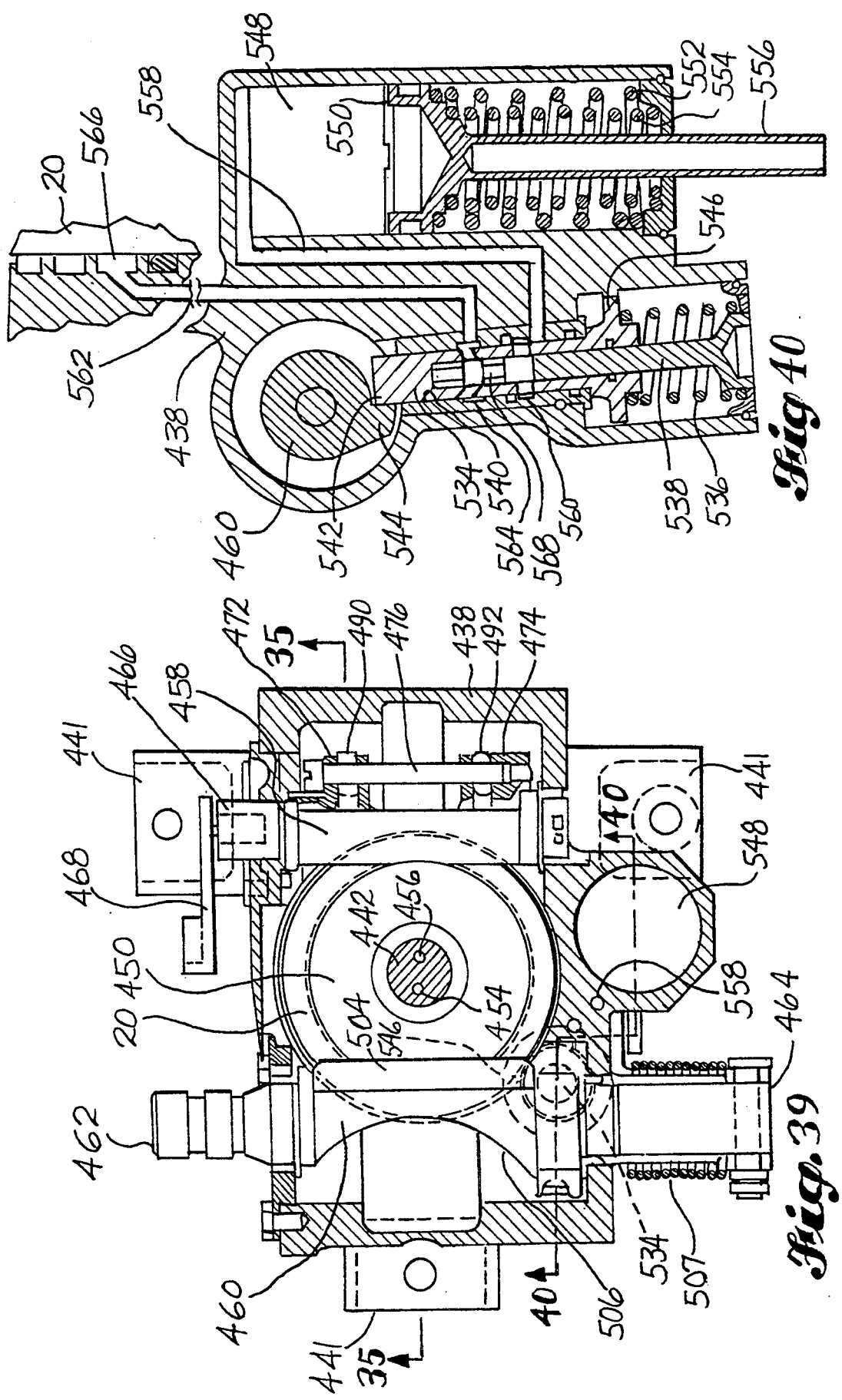

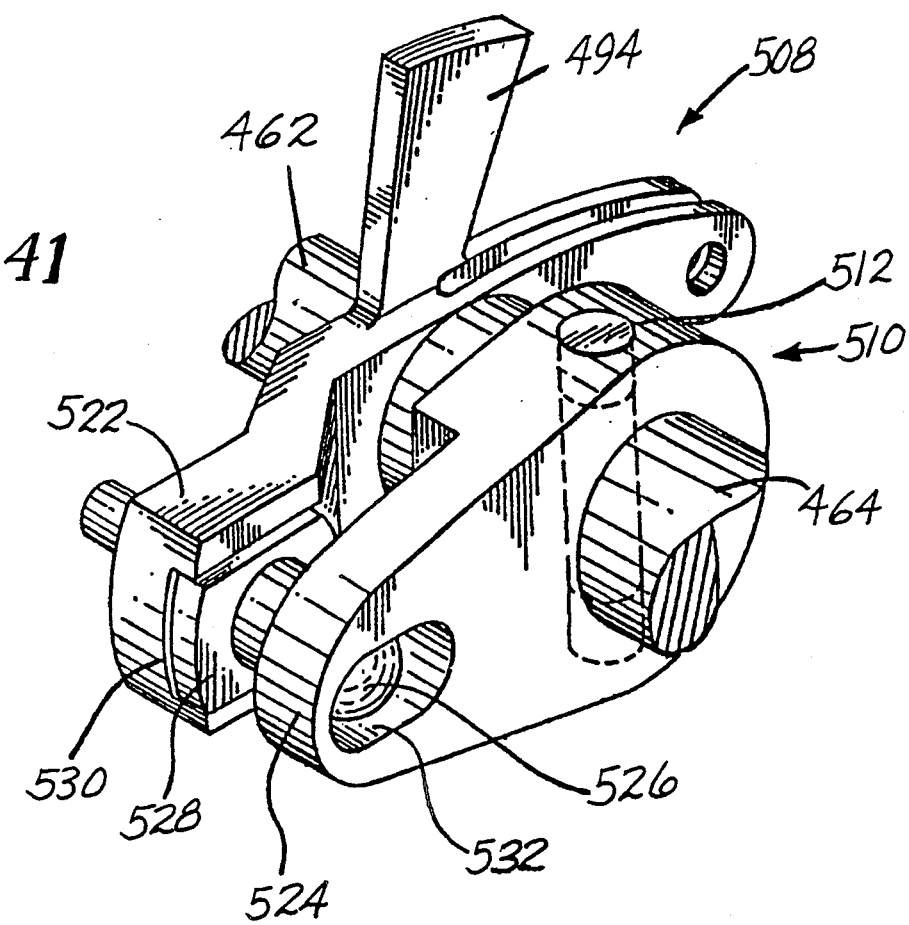

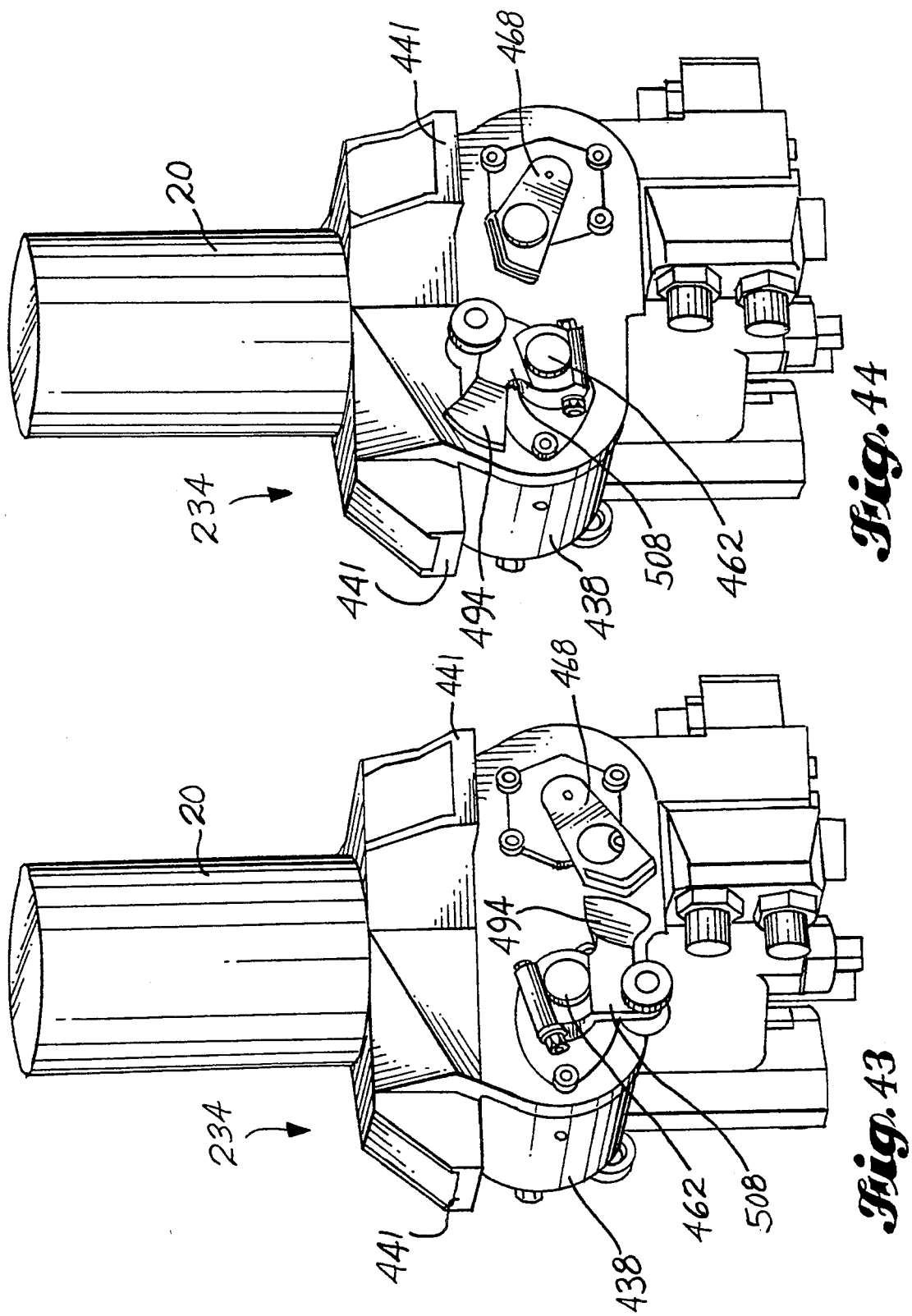

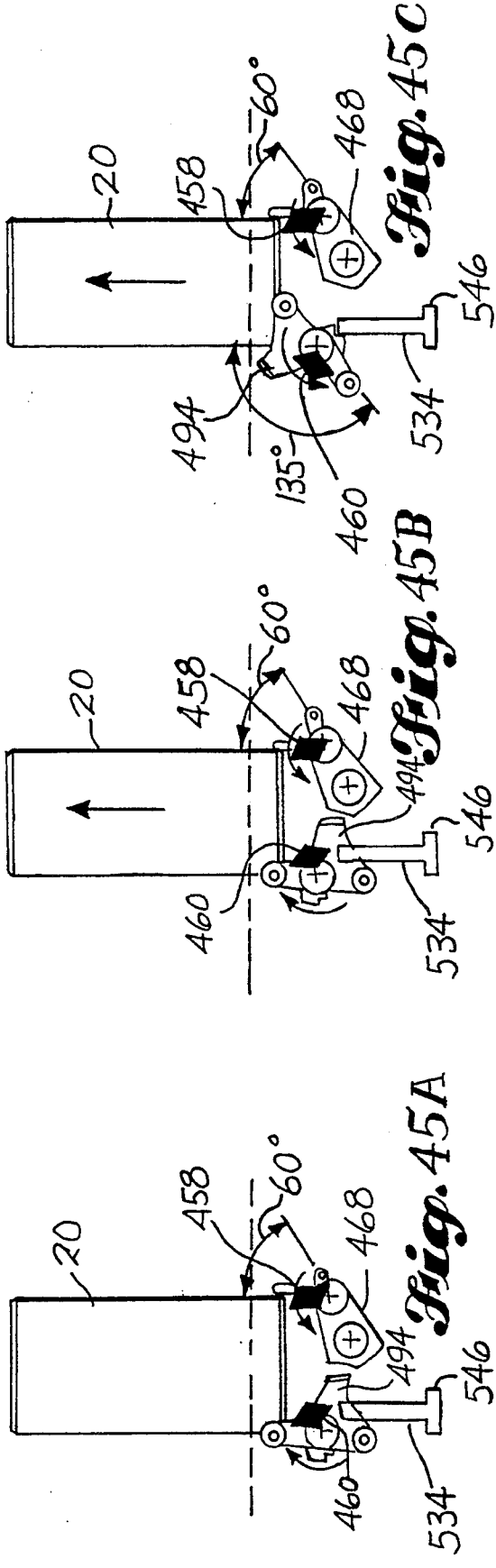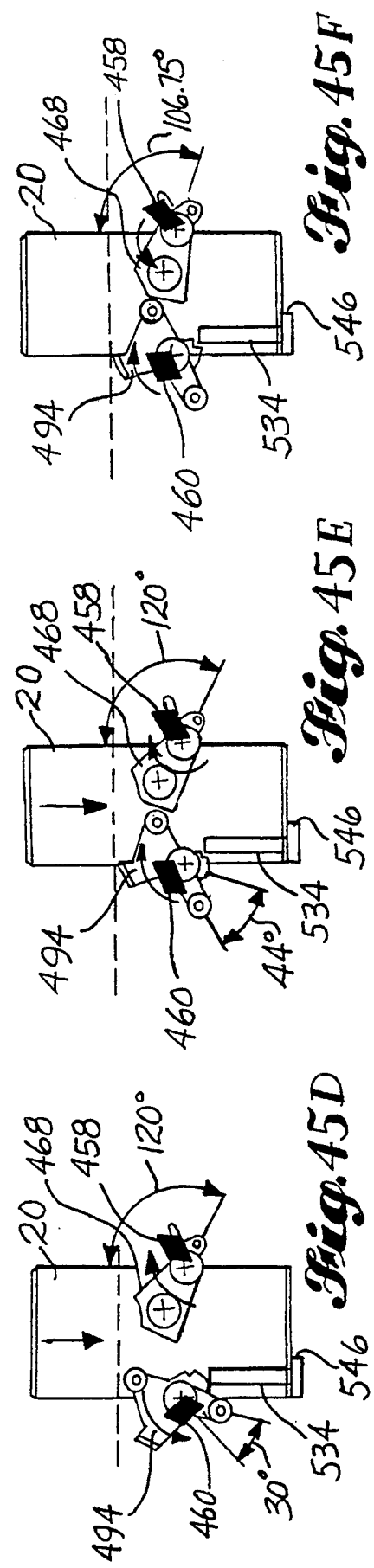

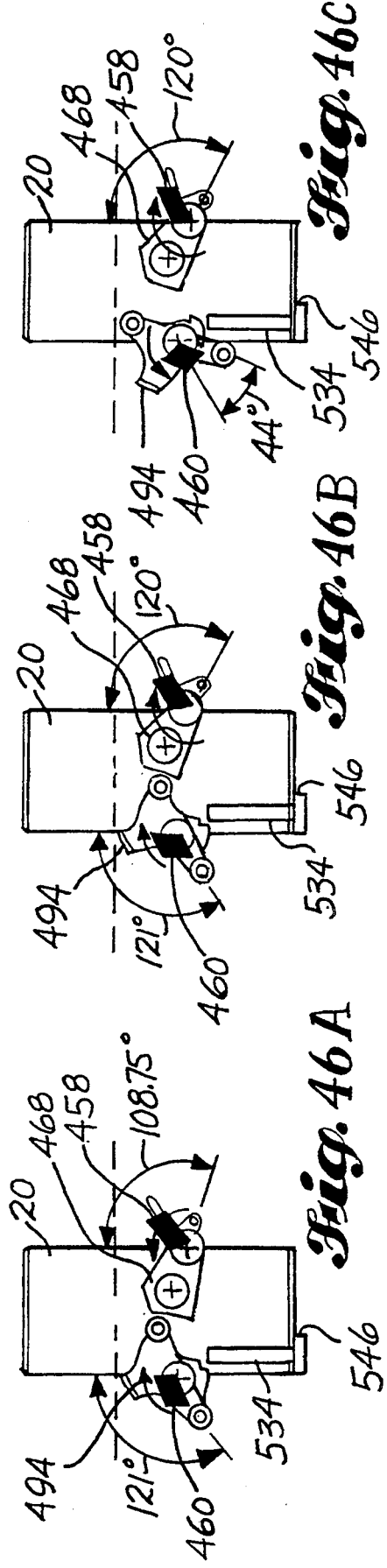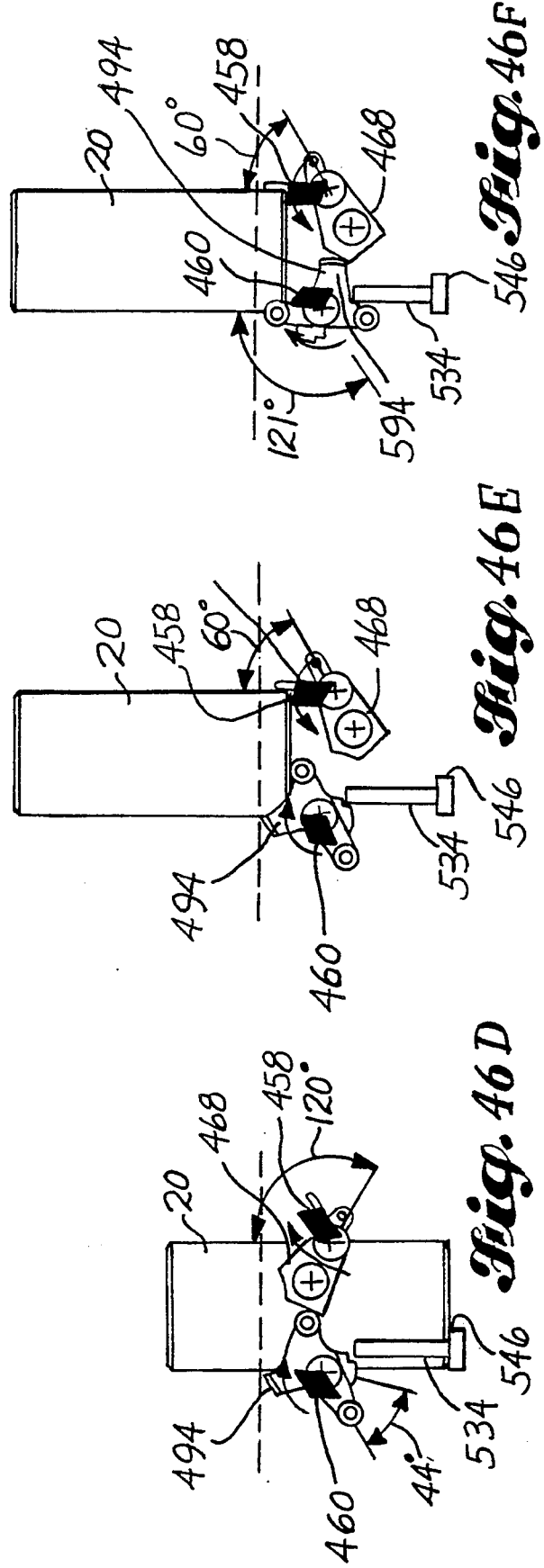

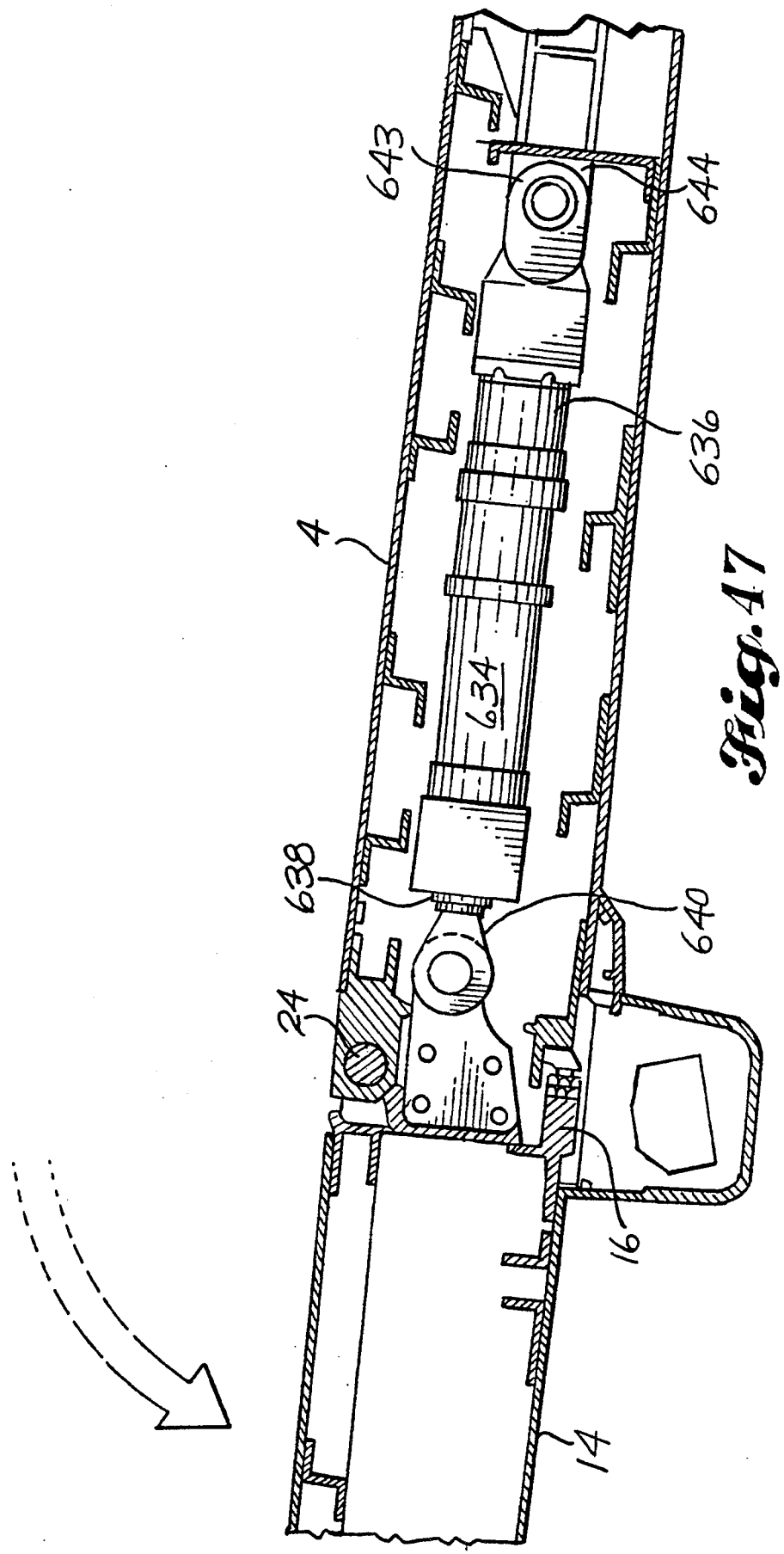

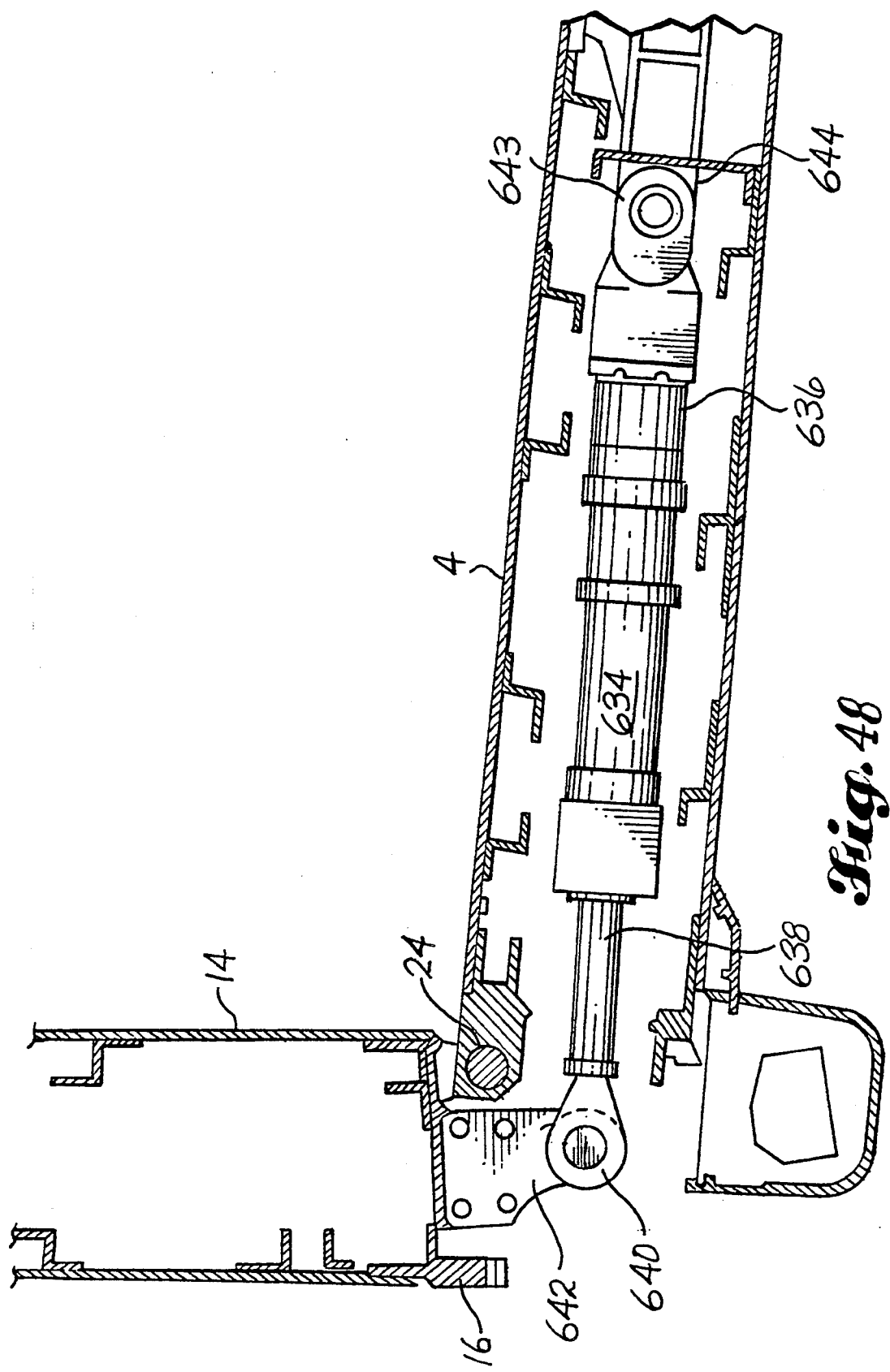

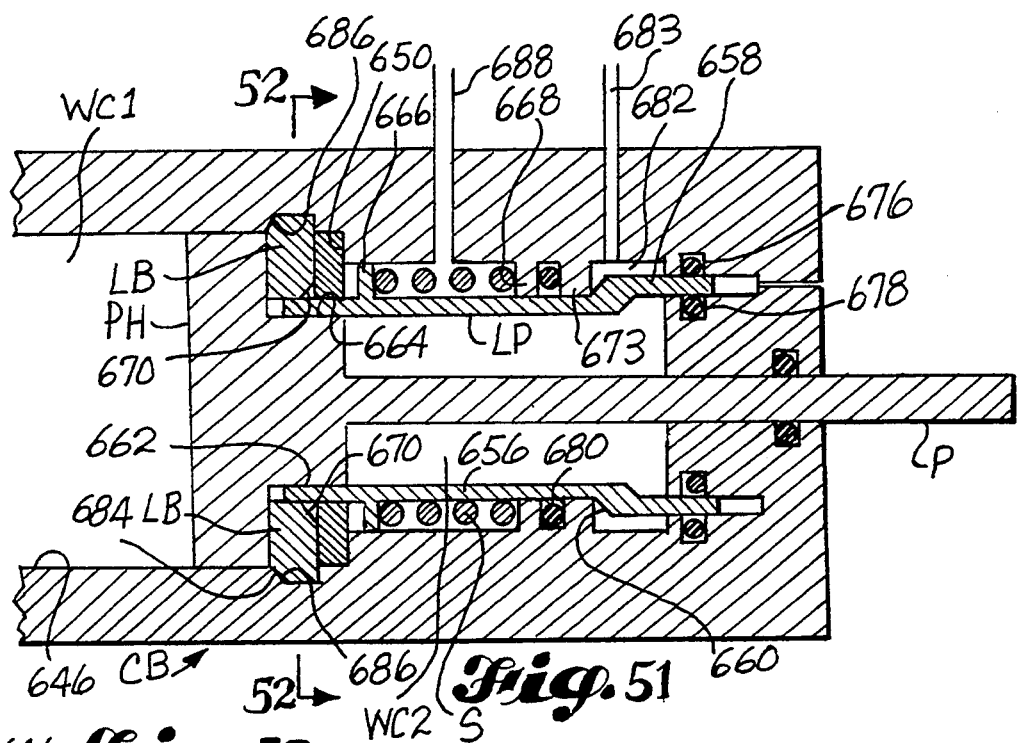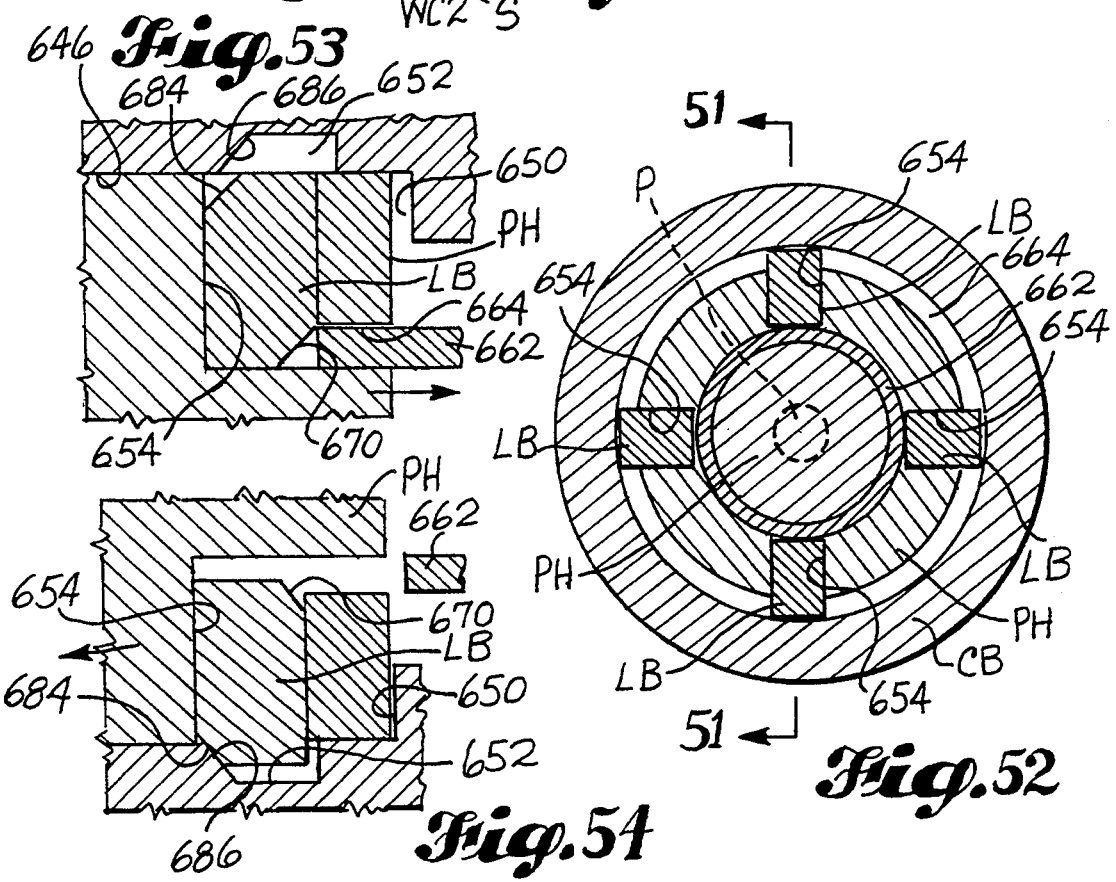

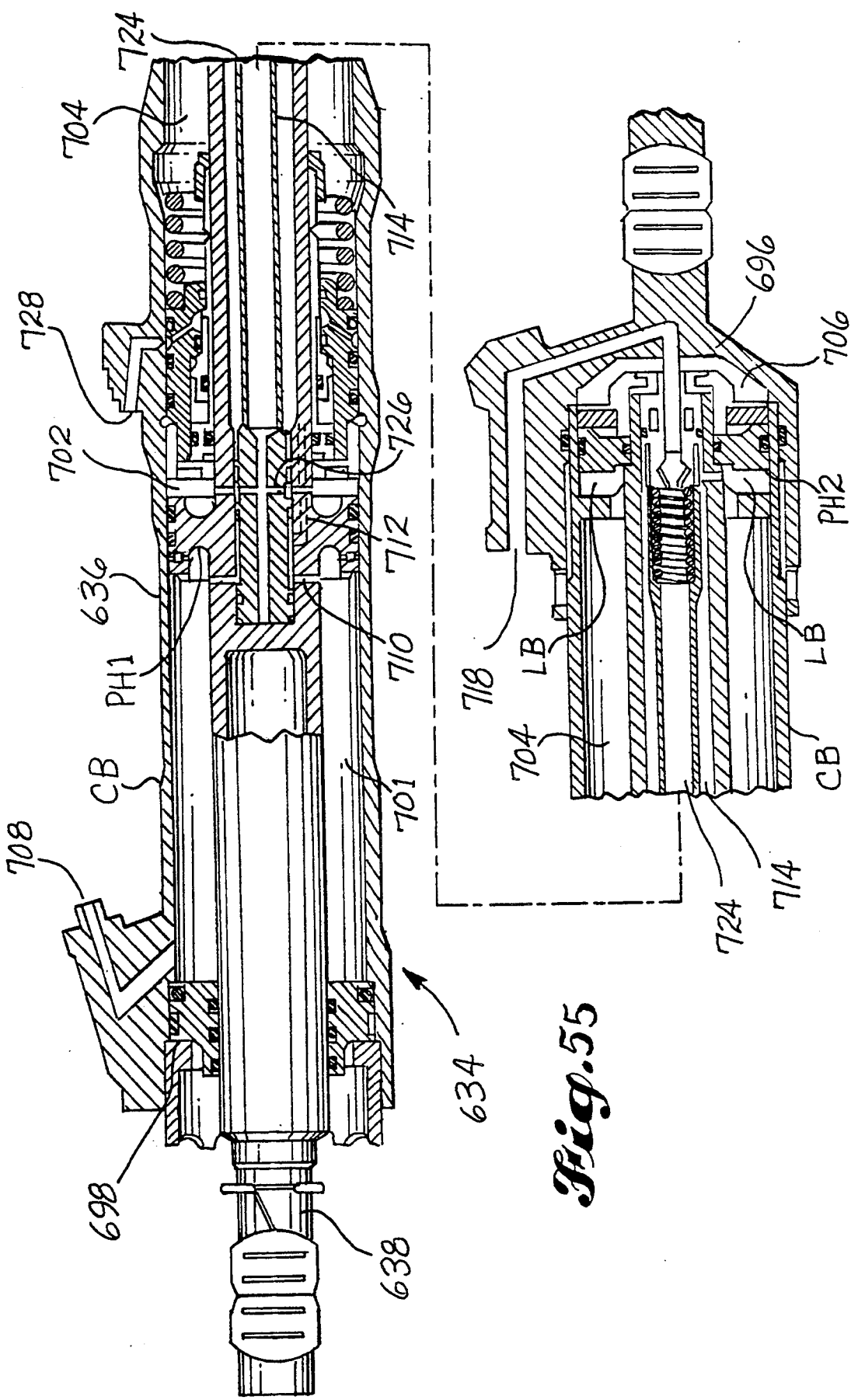

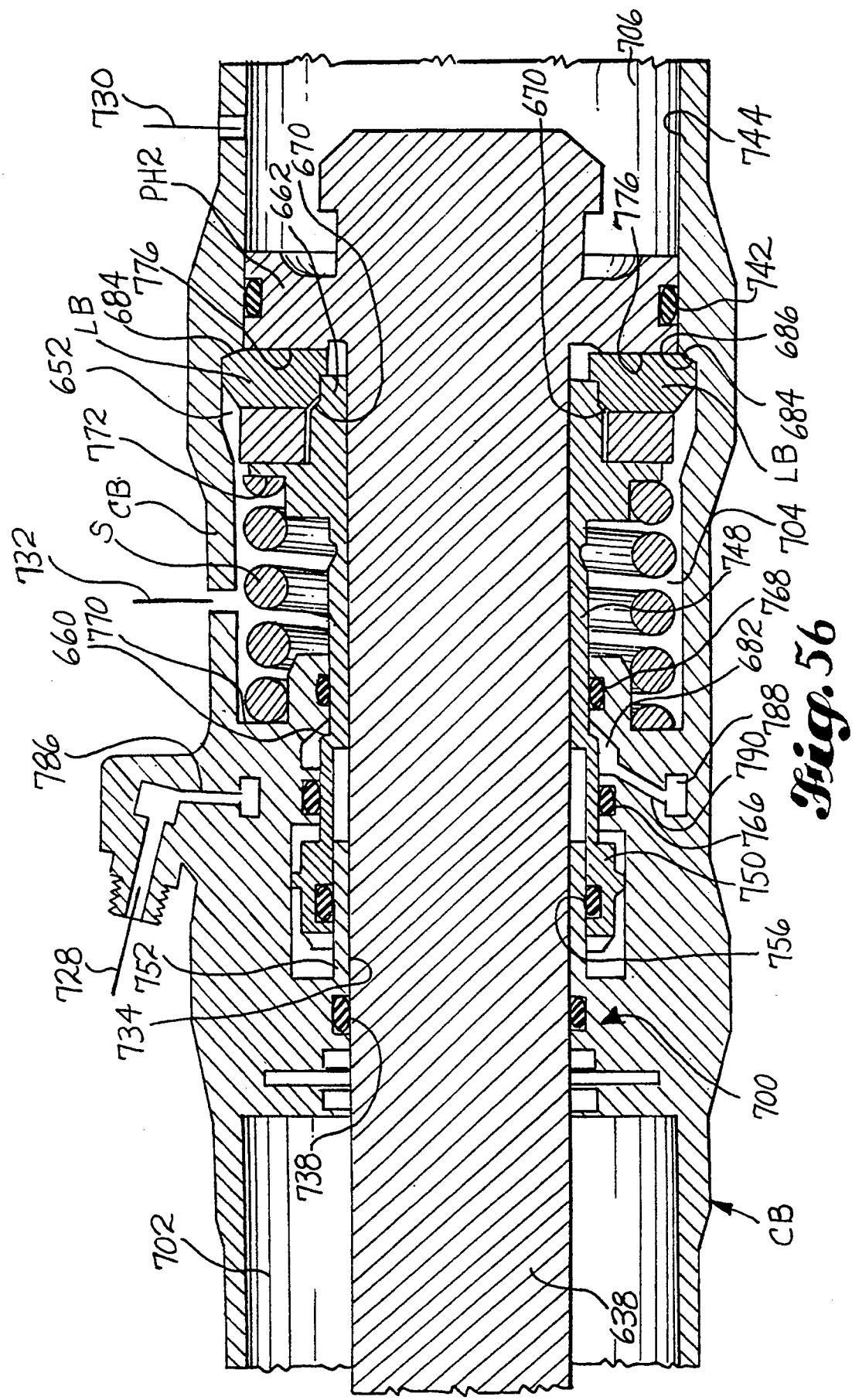

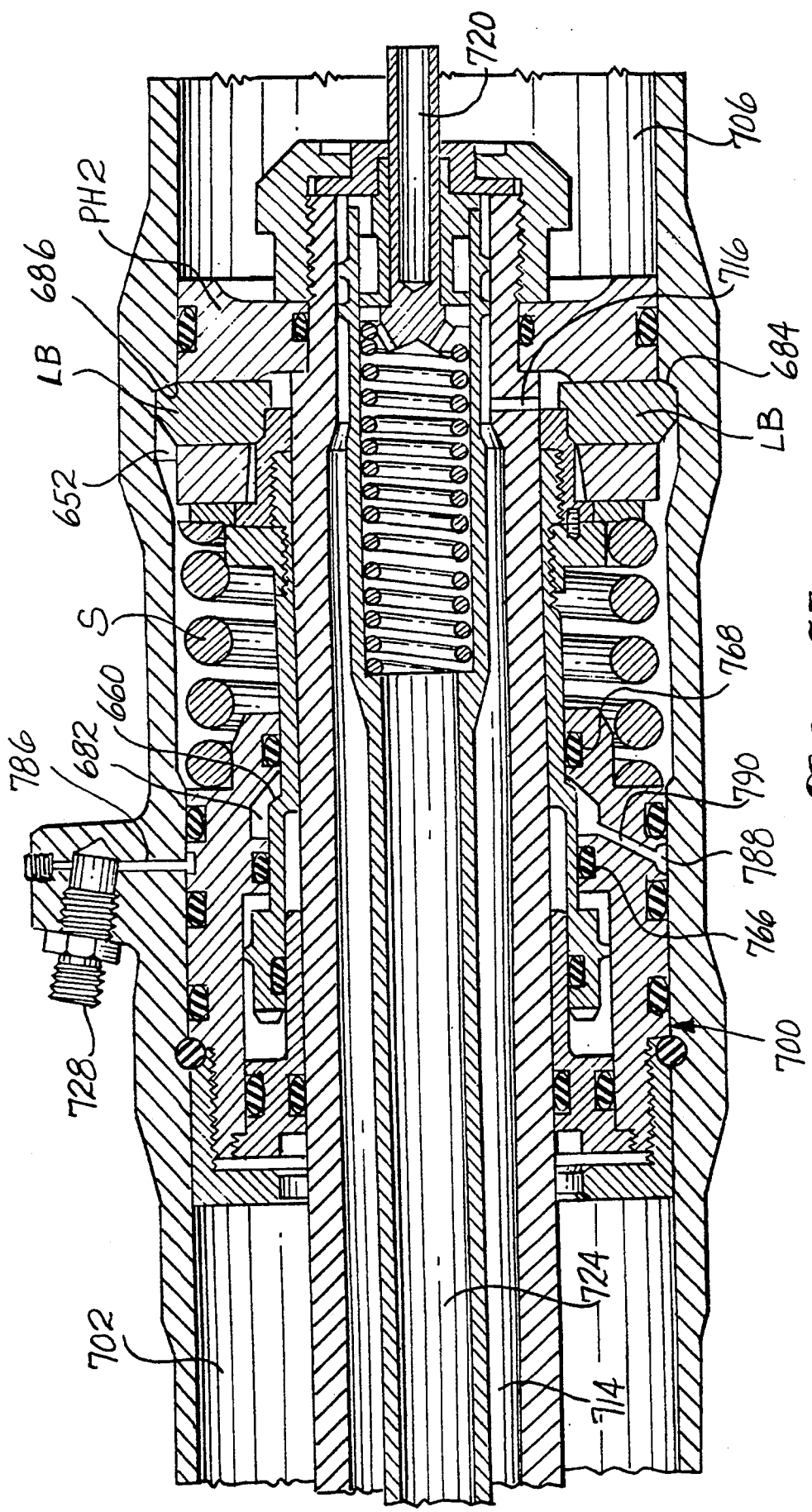

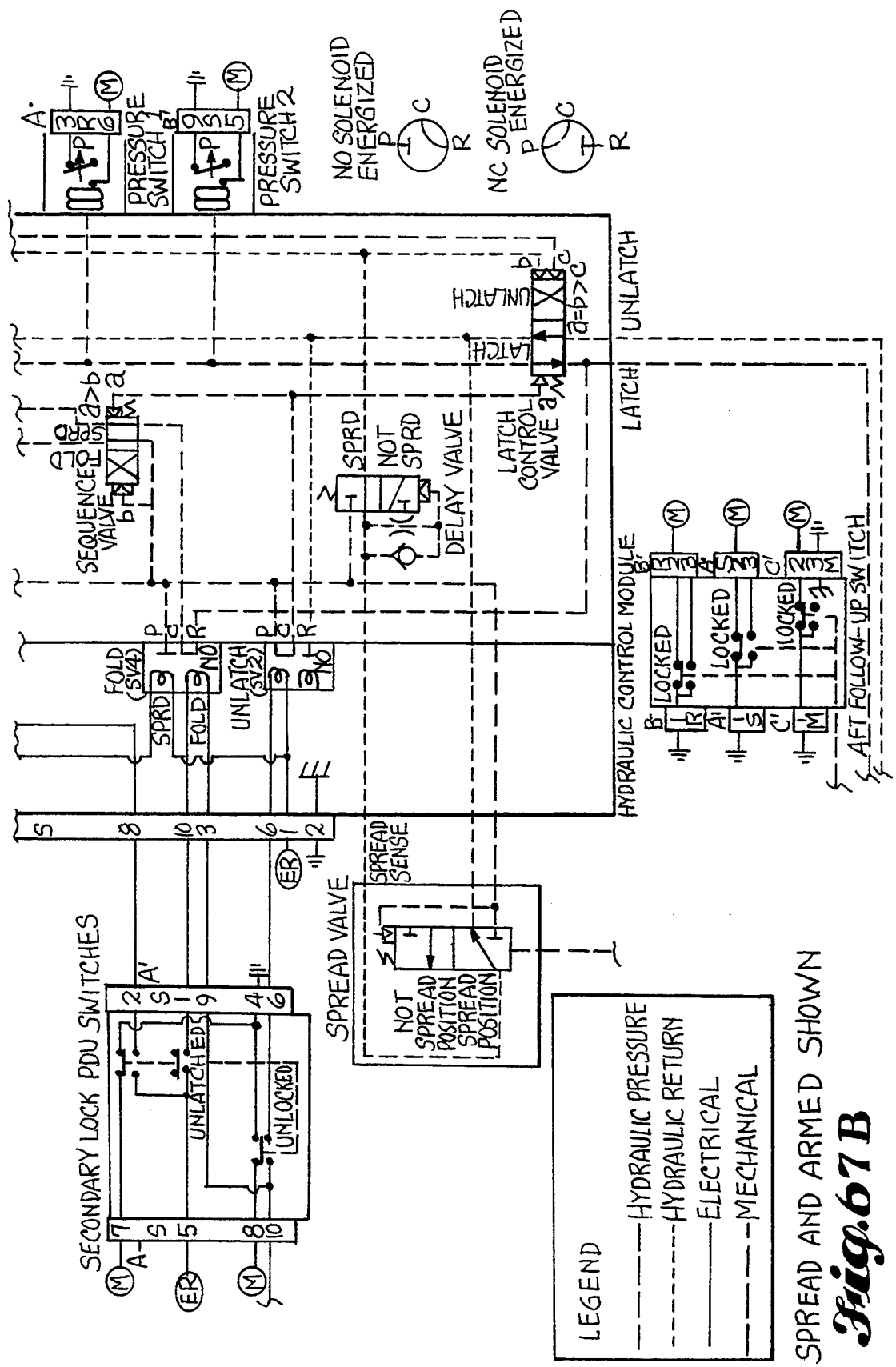

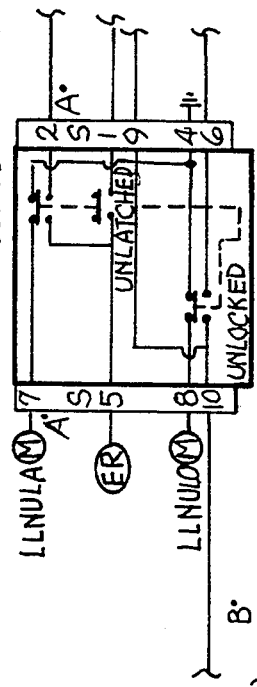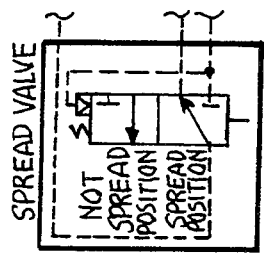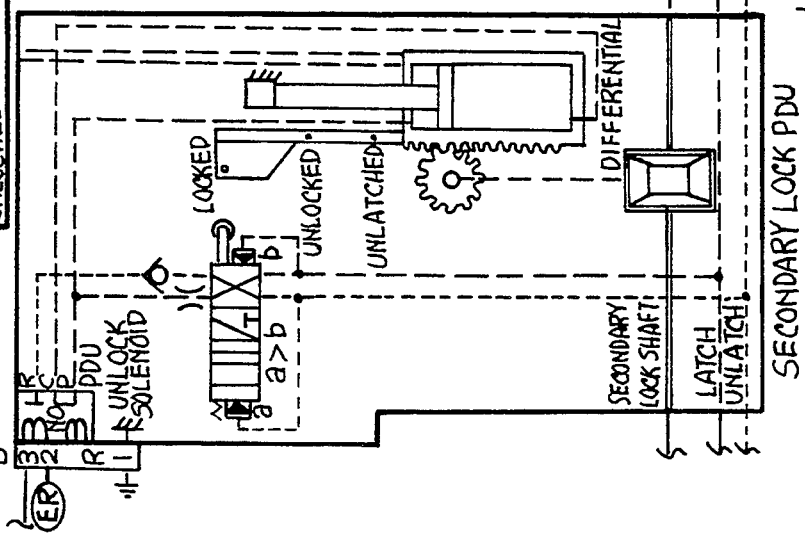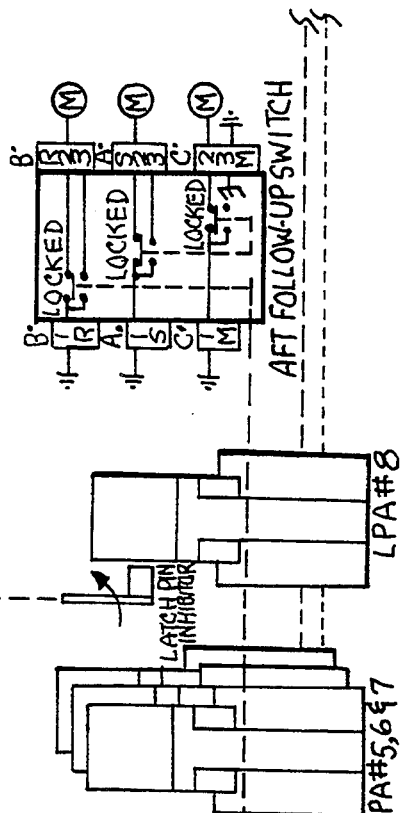
Fig. 68B

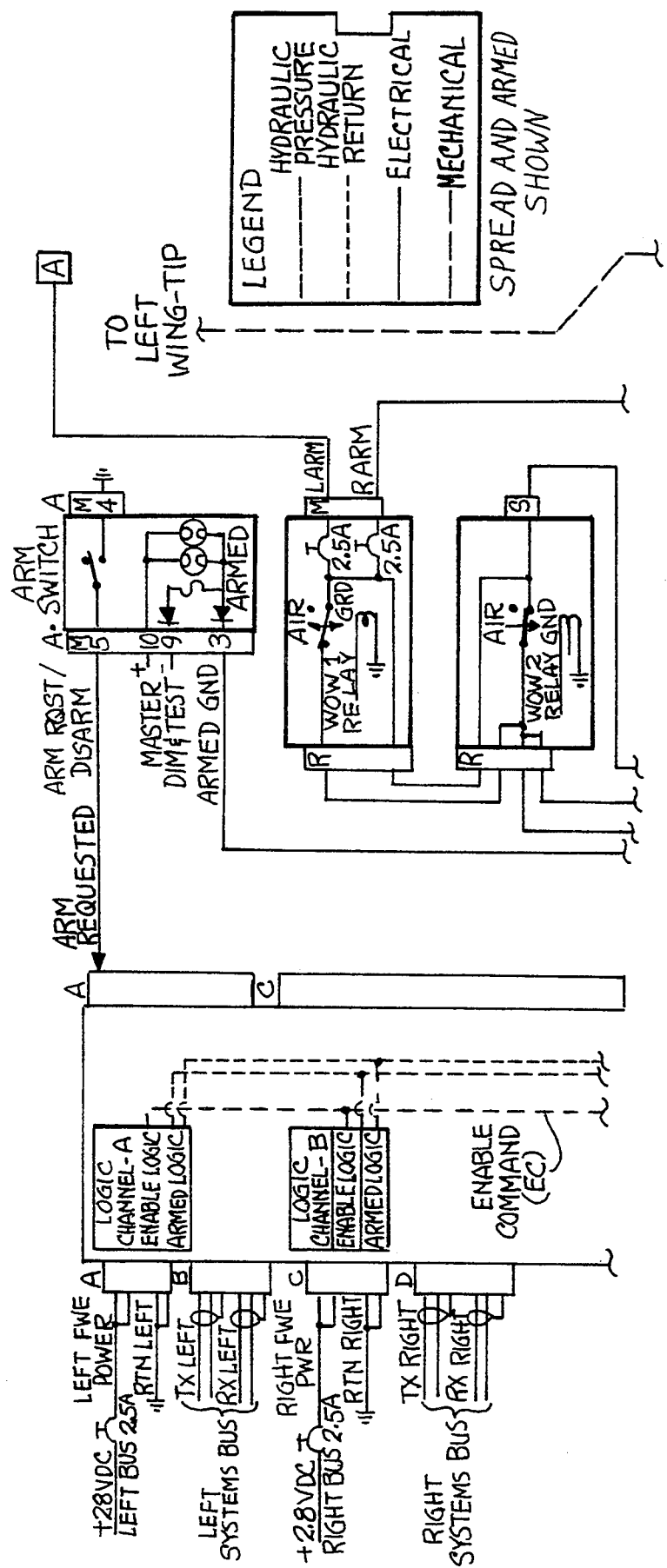

FOLDING WING-TIP SYSTEM

RELATED APPLICATIONS

This application is a continuation-in-part of application Ser. No. 07/828,308, filed Jan. 30, 1992, now U.S. Pat. No. 5,201,479 and entitled "Self-Monitoring Latch Pin Lock for Folding Wing Aircraft". This application is also related to, and incorporates by reference the entire disclosures of applications: Ser. No. 08/045,903, entitled "Latch Pin Inhibitor for Folding Wing-Tip Aircraft, and filed Apr. 12, 1993 in the names of present inventors Michael E. Renzelmann and Mark H. Smith; Ser. No. 08/045,901, entitled "Hydraulic Actuator with Mechanical Lock and Installation", and filed Apr. 12, 1993 in the names of the present inventors; Ser. No. 08/045,900, entitled "Hydraulic Power Drive Unit" and filed Apr. 12 1993 in the names of present inventors Mark H. Smith and Michael E. Renzelmann; and Ser. No. 08/045,899, entitled "Locking Hydraulic Latch Pin Actuator", and filed Apr. 12, 1993 in the names of present inventors Michael E. Renzelmann and Mark H. Smith, and Gregory T. Stramat.

TECHNICAL FIELD

This invention relates to aircraft folding wing-tip systems and, more particularly, to such a system that operates fully automatically after being activated by a flight crew member, that uses mechanical interferences for sequencing the steps of latching and locking and unlocking and unlatching, and that is hydraulically isolated when the wing tips are not being folded or spread.

BACKGROUND INFORMATION

The space required by an aircraft when it is supported by the ground or a structure may be reduced by folding outer portions of the wings to be generally perpendicular to the main wing span. Folding wing-tip aircraft have been used by the military on aircraft carriers to reduce the space required by the aircraft when they are on the carrier. Since unintended folding of the wing tips during flight could be catastrophic, the known military aircraft are provided with a safety system designed to ensure that the wings are fully spread and locked into a spread condition before the aircraft takes off. The safety system relies heavily on a red flag located on each wing. A protruding red flag indicates that the wings are not properly spread.

Each wing tip of the military aircraft is hinged to the main portion of the wing and has a plurality of latch pins for locking the wing tip into a spread position. Each latch pin is provided with an inhibitor, commonly known as a "porkchop" because of its shape, that prevents extension of the latch pin into a latch position when the wing is in a folded condition. In the operation of the system, the pilot lowers a lever about half way to spread the wings. As the wings spread, lugs carried by the wing portions push the inhibitors out of their blocking position. Once the wings are spread, the pilot flips a toggle switch to latch the latch pins and then lowers the lever the remainder of its travel to lock the latch pins. Finally, he verifies that the red flag on each wing is not visible. The flags are mechanically linked to the latch pin locks and are retracted as the locks are activated. The locks are blocked from moving into their locked position when the latch pins are retracted.

In the military system, failure to achieve proper spread condition will be indicated by the flag on a wing if at least one of the inhibitors on the wing is in a non-failed operational condition. A protruding flag is clearly visible to the flight crew and ground crew. In addition, the configuration of the aircraft makes the wing tips visible from the flight deck so that the flight crew can verify the position of the warning flags even in bad weather. Beyond the inhibitors and flags, the system is dependent on intense flight and ground crew inspections to verify that the wings are properly spread before takeoff. In an aircraft carrier environment, reliance on such inspections is practical since it is standard procedure to have a number of ground personnel checking every detail of an aircraft just prior to takeoff.

The military system has a cable-driven control path. Uncommanded fold during flight is addressed by only one level of safety. Failure of one cable can result in the latch pins becoming unlocked, thereby allowing them to migrate out of their holes. Because of the performance requirements of military aircraft, and the resulting severe space restrictions, the second or final safety level is the ejection seat.

The commercial airline industry is highly competitive, and airlines are always searching for ways to increase passenger volume and more efficiently move a given number of passengers from one airport to another. One of the main limitations on increasing passenger volume is the limited number of gates available at any given airport. This limitation has led to a trend to use larger aircraft so that each gate can service a greater number of passengers. The use of larger aircraft to increase passenger volume presents a new problem. The larger aircraft tend to have much larger wing spans than the aircraft that were commonly in use when the gates were built. In a typical gate arrangement, the larger wing span aircraft require more space than is allotted to an individual gate and, thus, the use of such aircraft would tend to reduce the number of usable passenger gates. The assignee of the present applicants has proposed the introduction of folding wing-tip commercial aircraft to solve the problem of limited space at each passenger gate so that passenger volume per gate can be increased without reducing the number of usable gates.

Experience with folding wing-tip military aircraft has provided some guidance in the design of the proposed commercial folding wing-tip aircraft. However, the usefulness of the military aircraft as a guide is limited because of the different use environments and safety requirements relating to military and commercial aircraft. It is anticipated that a commercial aircraft with folding wing tips would not move the wing tips into a spread condition until the aircraft reached the threshold of an active runway. This procedure would provide optimal use of limited width taxiways as well as limited width gate areas. Since ground personnel are not available at runway thresholds, a commercial folding wing-tip aircraft could not rely on ground crew inspections as part of safety procedures for ensuring a proper spread wing condition. In addition, the wing tips of larger commercial aircraft are not visible from the flight deck. Thus, the military warning flag system would have no practical value in the commercial aircraft environment. These considerations and the very rigorous safety requirements that apply to commercial aircraft have necessitated a search for novel approaches to the design of the various aspects of a folding wing-tip system in a commercial aircraft.

DISCLOSURE OF THE INVENTION

According to an aspect of the present invention, a folding wing-tip system comprises a hinge that extends substantially in a forward/aft direction along an aircraft wing and pivotably connects a wing-tip portion to an inboard wing portion. The system further comprises a plurality of latch pin assemblies, a mechanism, and a follow-up switch. The assemblies each include a latch pin having a latch position in which it latches the wing-tip portion in a spread position, and a primary lock and a secondary lock. Each of the primary and secondary locks has a locked position in which it blocks movement of the latch pin out of the latch position. Each primary lock, when it is out of its locked position, mechanically blocks movement of the secondary lock in its assembly into the secondary lock's locked position. The mechanism gangs the secondary locks together to cause them to move together into and out from their locked positions. The mechanism has a locked position corresponding to the locked positions of the secondary locks. The switch is mounted adjacent to the mechanism to sense movement of the mechanism and send a signal in response to the mechanism moving into the mechanism's locked position.

The system preferably further comprises a spread switch mechanically linked to the wing-tip portion and responsive to movement of the wing-tip portion into the spread position. Another preferred feature is primary locks each of which is movable into and out of its locked position independently of the other primary locks.

According to another aspect of the invention, there is provided a method of monitoring a latched and locked condition of a plurality of latch pins each having a latch position in which it latches a folding aircraft wing tip in a spread position. The method comprises providing each latch pin with a primary lock and a secondary lock. Each lock has a locked position in which it blocks movement of the latch pin out of the latch position. The primary and secondary locks are configured and positioned so that each primary lock mechanically blocks its corresponding secondary lock from moving into the secondary lock's locked position when the primary lock is out of its locked position. The secondary locks are ganged together so that they all move together into and out from their locked positions. Movement of the secondary locks into their locked positions is sensed, and a signal in response to such movement of the secondary locks is sent. The signal is used to determine that all of the latch pins are latched and all of the primary and secondary locks are in their locked positions. The method preferably further comprises mounting the primary locks to be movable, independently of each other, into and out from their locked positions. Another preferred feature is the mechanical linking of a spread switch to the wing tip to be responsive to movement of the wing tip into and out from the spread position.

According to another aspect of the invention, a method for determining if a folding aircraft wing tip is fully spread, and of sequencing spreading of the wing tip and latching it into a spread position, is provided. The method comprises, with the wing tip in a folded position, positioning an inhibitor in an inhibit position in which it blocks movement of a latch pin into a latch position and in which it will be contacted and moved by the wing tip as the wing tip moves toward the spread position. The inhibitor is linked to a valve member of a valve to translate movement of the inhibitor caused by contact with the wing tip into movement of the valve member from a first position to a second position. In the first position, a sense port is connected to a first hydraulic pressure, and in the second position, the sense port is connected to a second hydraulic pressure. The sense port is connected to an additional valve, and the second hydraulic pressure is transmitted from the sense port to the additional valve. The second hydraulic pressure shifts the additional valve to, in turn, cause hydraulic pressure to be supplied to extend the latch pin.

According to still another aspect of the invention, a method of preventing in-flight movement of a wing tip, in a folding wing-tip aircraft, from a spread position to a folded position is provided. The method comprises latching the wing tip into the spread position by moving a plurality of hydraulically actuated latch pins into a latch position. Each latch pin is provided with a primary lock and a secondary lock. Each lock is hydraulically actuated and has a locked position in which it blocks movement of the latch pin out of the latch position. The secondary locks are biased into their locked positions. The primary and secondary locks are configured and positioned so that each secondary lock mechanically blocks its corresponding primary lock from moving out from the primary lock's locked position when the secondary lock is in its locked position. During flight, the latch pins and the primary and secondary locks are isolated from hydraulic pressure.

According to another aspect of the invention, a method is provided for sequencing spreading of a folding aircraft wing-tip, moving a plurality of latch pins into a latch position in which they latch the wing tip in a spread position, and locking the latch pins in the latch position. The method comprises manually actuating a control member to initiate a command to spread the wing-tip. In response to the command, a control and monitoring system is electrically activated and electrically and hydraulically powered. The method further comprises automatically spreading the wing tip and latching and locking the latch pins under the control of the control and monitoring system, using mechanical interferences to inhibit each step until previous steps have been successfully completed, and using each step to trigger a subsequent step.

According to yet another aspect of the invention, a method of locking a folding aircraft wing-tip into a folded position is provided. The method comprises providing a hydraulic fold actuator. The actuator is hydraulically operated to move it into a fold position and thereby move the wing tip into the folded position. The actuator is automatically locked in the fold position in response to movement into the fold position. A signal is generated in response to locking of the actuator. The signal is used to cause isolation of the actuator from hydraulic power, and the actuator acts as a strut to hold the wing-tip in the folded position.

The system of the invention, including both its apparatus and method aspects, is a highly reliable and cost effective folding wing-tip system. The system of the invention is suitable for use in a commercial aircraft environment. It provides a very high level of safety while minimizing the need for active input from the flight crew and eliminating any need for ground crew participation in the fold sequence or the spread sequence. This makes it possible for the fold and spread sequences to be carried out at a runway threshold where ground crew are not present. The system of the invention also allows the minimizing of the number of hydraulic lines required to fold and spread the wing and the maximizing of the weight and space savings achieved by the design of its components.

These and other advantages and features of the invention will become apparent from the detailed description of the best mode for carrying out the invention that follows.

BRIEF DESCRIPTION OF THE DRAWINGS

In the drawings, like element designations refer to like parts throughout, and:

FIG. 2 is a sectional view of a portion of one of the wings shown in FIG. 1, illustrating the hinge in a spread position and latched by a latch pin.

FIG. 3 is like FIG. 2 except that it shows the latch pin retracted and the hinge in a folded position.

FIGS. 12-15 are sectional views taken along the lines 12—12, 13—13, 14—14, and 15—15, respectively, in FIG. 11.

FIG. 16 is a schematic sectional view of the valve shown in FIGS. 10-15 with the valve spool in a first position corresponding to a folded condition of the associated wing tip.

FIG. 17 is like FIG. 16 except that the valve spool is in its second position corresponding to the spread condition of the wing.

FIG. 19 is an enlarged fragmentary pictorial view showing a bank of latch pin actuators and their latching and locking mechanisms.

FIG. 20 is a pictorial view of the fore and aft banks of latch pin actuators on one wing and the associated hydraulic power drive unit.

FIG. 21 is an outboard plan view of a hydraulic power drive unit.

FIG. 22 is a view of the hydraulic power drive unit shown in FIG. 21 taken substantially along line 22—22 of FIG. 21.

FIG. 23 is a side view of the hydraulic power drive unit shown in FIG. 21 and taken substantially along line 23—23 of FIG. 21.

FIGS. 24 and 25 are cross-sectional views showing engagement of the drive cylinder rack with the drive pinion and taken substantially along line 24—24 of FIGS. 21 and 27.

FIG. 26 is a fragmentary sectional view taken substantially along line 26—26 of FIG. 24.

FIG. 27 is a view similar to FIG. 21 partially cut away and sectioned to show the power transferring drive differential of the power drive unit.

FIG. 28 is a cross-sectional view showing differential gearing and control switches of the power drive unit and taken substantially along line 28—28 of FIGS. 21 and 27.

FIG. 29 is a fragmentary view showing one pair of planet gears and taken substantially along line 29—29 of FIG. 28.

FIGS. 37 and 38 are schematic diagrams of the latch pin and primary lock actuator.

FIG. 39 is a sectional view taken substantially along line 39—39 of FIG. 35.

FIG. 40 is a fragmentary sectional view taken substantially along line 40—40 of FIG. 39 and showing the secondary lock inhibit post and grease reservoir.

FIG. 41 is a pictorial view of a ball stud connection in the drive train of the latch pin actuator secondary lock mechanism.

FIG. 43 is a pictorial view of a latch pin actuator, showing the mechanical interference projections between primary and secondary locks in a latched and locked condition.

FIG. 44 is a view similar to FIG. 43, except that it shows the latching actuator in a latched, but unlocked condition.

FIGS. 45A-45F are sequential schematic diagrams showing the relationships between the latch pin, primary lock, and secondary lock during a fold operation.

FIGS. 46A-46F are sequential schematic diagrams showing the relationships between the latch pin, primary lock, and secondary lock during a spread operation.

FIG. 47 is a fragmentary longitudinal sectional view taken through the aircraft wing in the vicinity of the fold axis, such view showing the wing in an extended position and the fold/extend actuator in a retracted position.

FIG. 48 is a view like FIG. 47, except that it shows the fold/extend actuator in an extended position and the outboard ends,portion of the wing in a folded position.

FIG. 51 s a view like FIG. 49, except that it shows the actuator in its locked position.

FIG. 52 is a cross-sectional view taken substantially along line 52—52 of FIG. 51.

FIG. 53 is an enlarged fragmentary view in the region of a lock bolt, showing an upper lock bolt being cammed radially outwardly.

FIG. 54 is a view similar to FIG. 53, except that it shows a lower lock bolt being cammed radially inwardly.

FIG. 55 is a two-part longitudinal sectional view of the preferred embodiment of a fold/extend actuator.

FIG. 56 is an enlarged scale fragmentary, partially schematic view of the actuator shown in FIG. 55, taken in the vicinity of the lock mechanism, such view showing the actuator locked into an extended position.

FIG. 57 is a view like FIG. 56 but showing details of the preferred embodiment which have been omitted from FIG. 56.

FIG. 70 is a schematic diagram of the monitoring portions of the system.

BEST MODE FOR CARRYING OUT THE INVENTION

The drawings show apparatus that is constructed in accordance with the invention and that constitutes the best mode for carrying out the apparatus aspects of the invention currently known to the applicants. The drawings also illustrate the best mode for carrying out the method aspects of the invention currently known to the applicants.

Figure 1:
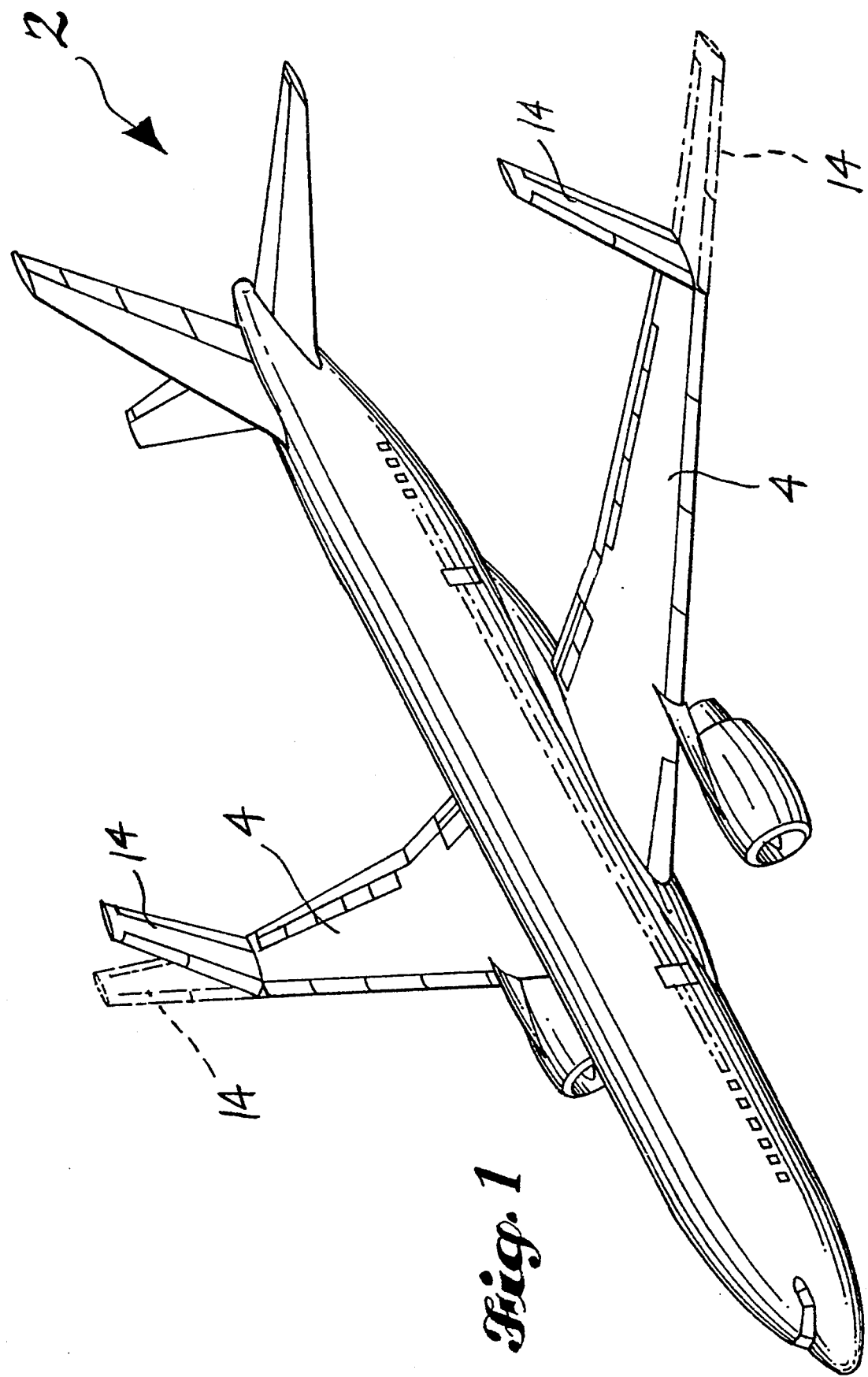
FIG. 1 is a pictorial view of an aircraft having folding wing tips and incorporating the preferred embodiment of the invention.

FIG. 1 shows a commercial passenger aircraft 2 with folding wings. Each wing has an inboard portion 4 and an outer wing-tip portion 14. The wing tip 14 is hingedly connected to the inboard portion 4. A folded position of the wing tip 14 is shown in solid lines, and the spread position is shown in broken lines. In the spread position, the two portions 4, 14 together form a single continuous airfoil. It is anticipated that the apparatus of the invention will be incorporated into the type of aircraft 2 shown in FIG. 1.

Figure 4:
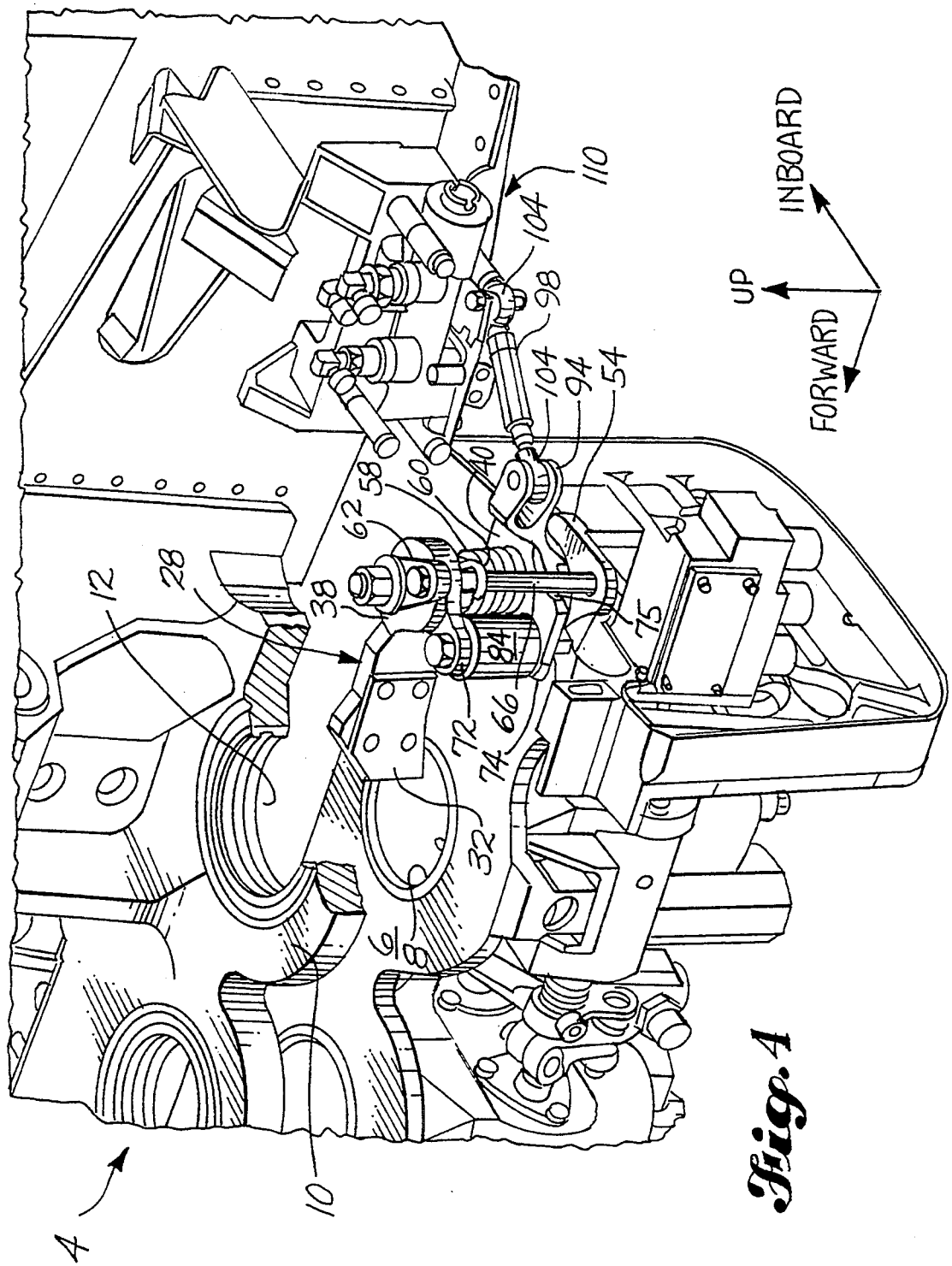
FIG. 4 is a fragmentary pictorial view of the inboard wing portion shown in FIGS. 2 and 3.

Referring to FIGS. 2–4, the two portions 4, 14 of each wing are connected to each other along a hinge 24 that extends substantially the entire chord length of the wing at the hinge location. When the wing is in a spread condition, a plurality of latch pins 20 structurally fasten the two portions 4, 14 together. At each latch pin location, the inboard wing portion 4 has two spaced lugs 6, 10 with aligned openings 8, 12. The wing-tip portion 14 has a corresponding lug 16 with an opening 18. When the wing is spread, the openings 8, 12, 18 in the three lugs 6, 10, 16 are aligned and receive the latch pin 20, as shown in FIG. 2. FIG. 3 illustrates the latch pin 20 retracted and the wing-tip portion 14 pivoted into the folded position shown in solid lines in FIG. 1. In FIGS. 2 and 3, the mechanisms for extending and retracting the latch pin 20 and locking the latch pin 20 in place are generally designated by the reference numeral 234.

The hinge 24 is a piano hinge connection that has a single hinge pin. The pin's outer diameter is stepped to facilitate assembly. The pin is a hollow cylinder which runs the length of the hinge 24 and is secured to the aft end by a lock washer and nut. A Teflon (trademark) sleeve and a secondary retention pin are inserted into and run the length of the pin's inner bore. Bushings are pressed into each end of all hinge knuckles. Each bushing's inside diameter is unique to allow a close tolerance fit with the stepped outside diameter of the pin. The latch pins 20 and the hinge pin together carry flight loads across the hinge line.

Latch Pin Inhibitor and Spread Valve

Figure 5:
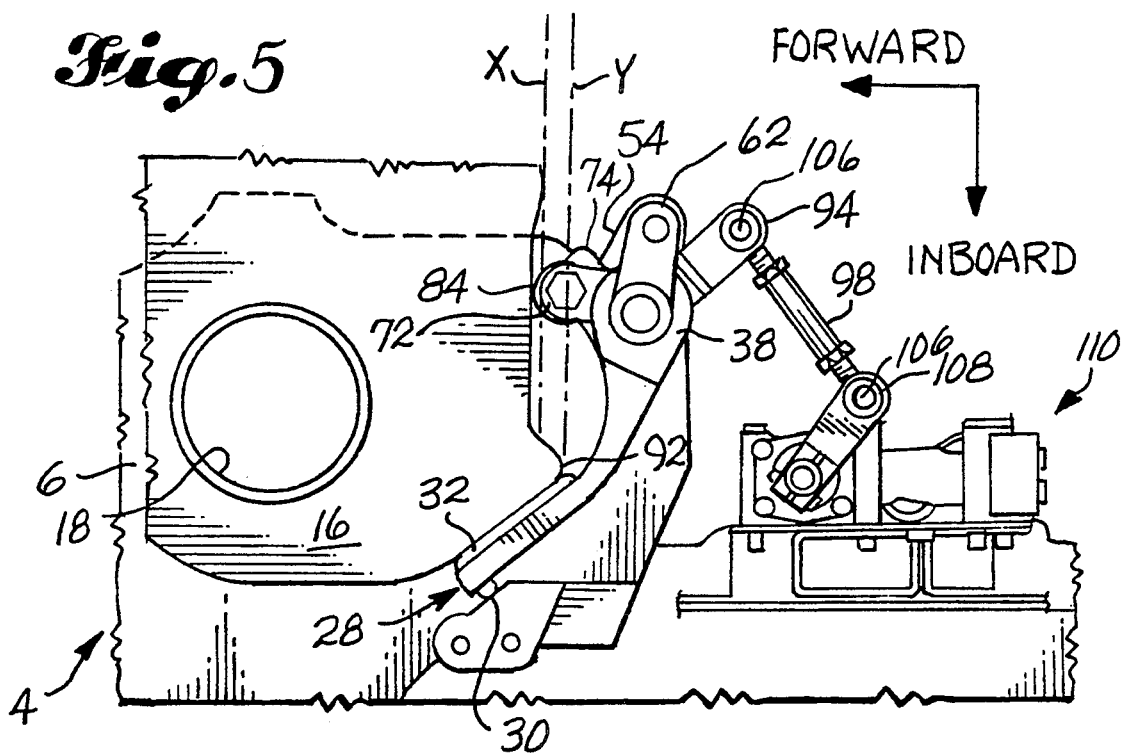
FIG. 5 is a schematic plan view of the wing portion shown in FIG. 4, with a wing tip lug moved into latching position and upper portions of the wing omitted.
Figure 6:
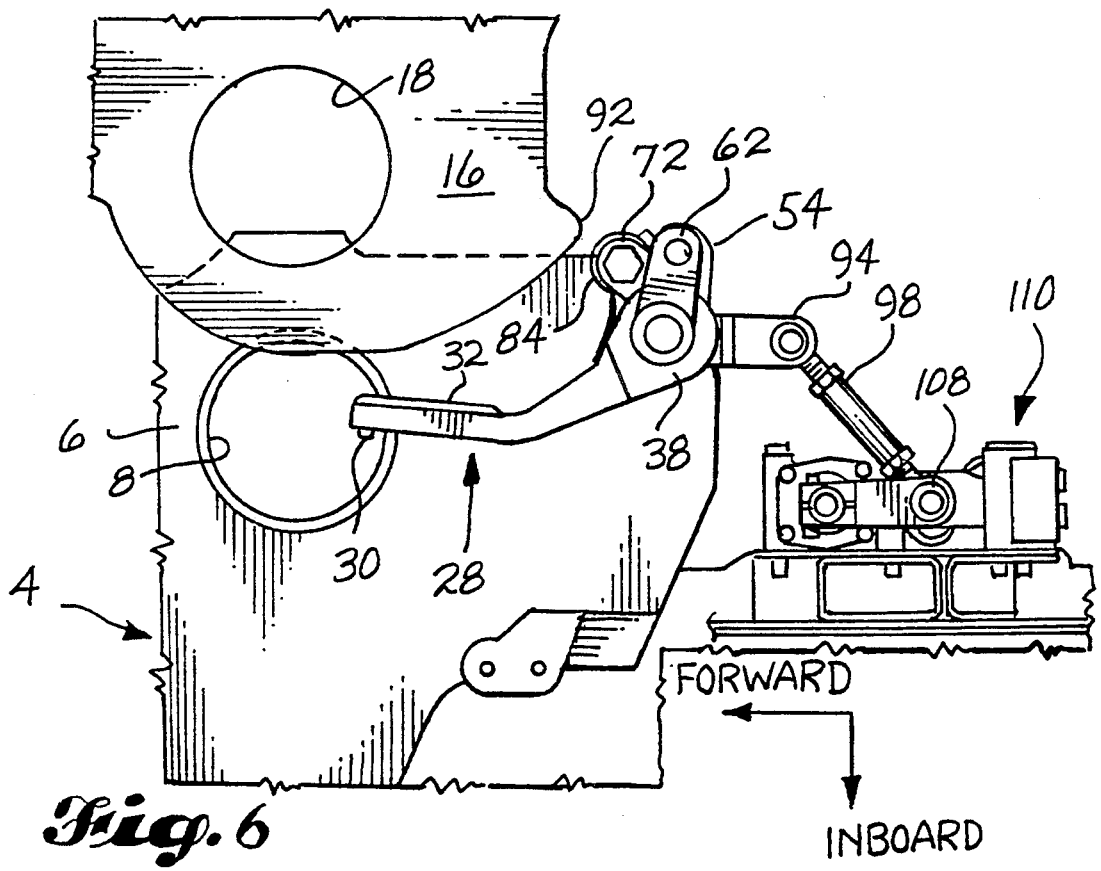
FIG. 6 is like FIG. 5 except that it shows the folded position of the apparatus.

Referring to FIG. 4, apparatus for inhibiting latch pin extension and indicating spread or fold condition is preferably mounted adjacent to the aftmost latch pin location on the inboard wing portion 4. The preferred embodiment of this apparatus is shown in FIGS. 4–18. The apparatus includes an inhibitor 28, shown in FIGS. 4–10. The inhibitor 28 is pivotably mounted on the inboard wing portion 4 to pilot about a pivot axis A (FIG. 7) between an inhibit position and an engaged position. In its inhibit position, the inhibitor 28 is positioned to be engaged by the lug 16 on the wing-tip portion 14 as the wing portions 4, 14, and the lugs 6, 10, 16 carried thereby, move from their folded position to their spread position. Preferably, the inhibitor 28 extends over a portion of the opening 8 in the lug 6 when it is in its inhibit position, to inhibit movement of the latch pin 20 through the opening 8. This preferred inhibit position is shown in FIGS. 4 and 6. As the wings are spread, the wing-tip lug 16 moves between the inboard lugs 6, 10 and thereby engages the inhibitor 28 and moves it into the engaged position illustrated in FIG. 5. This permits the latch pin 20 to be extended through the three aligned openings 8, 12, 18 when the wings are fully spread.

Figures 7, 8:
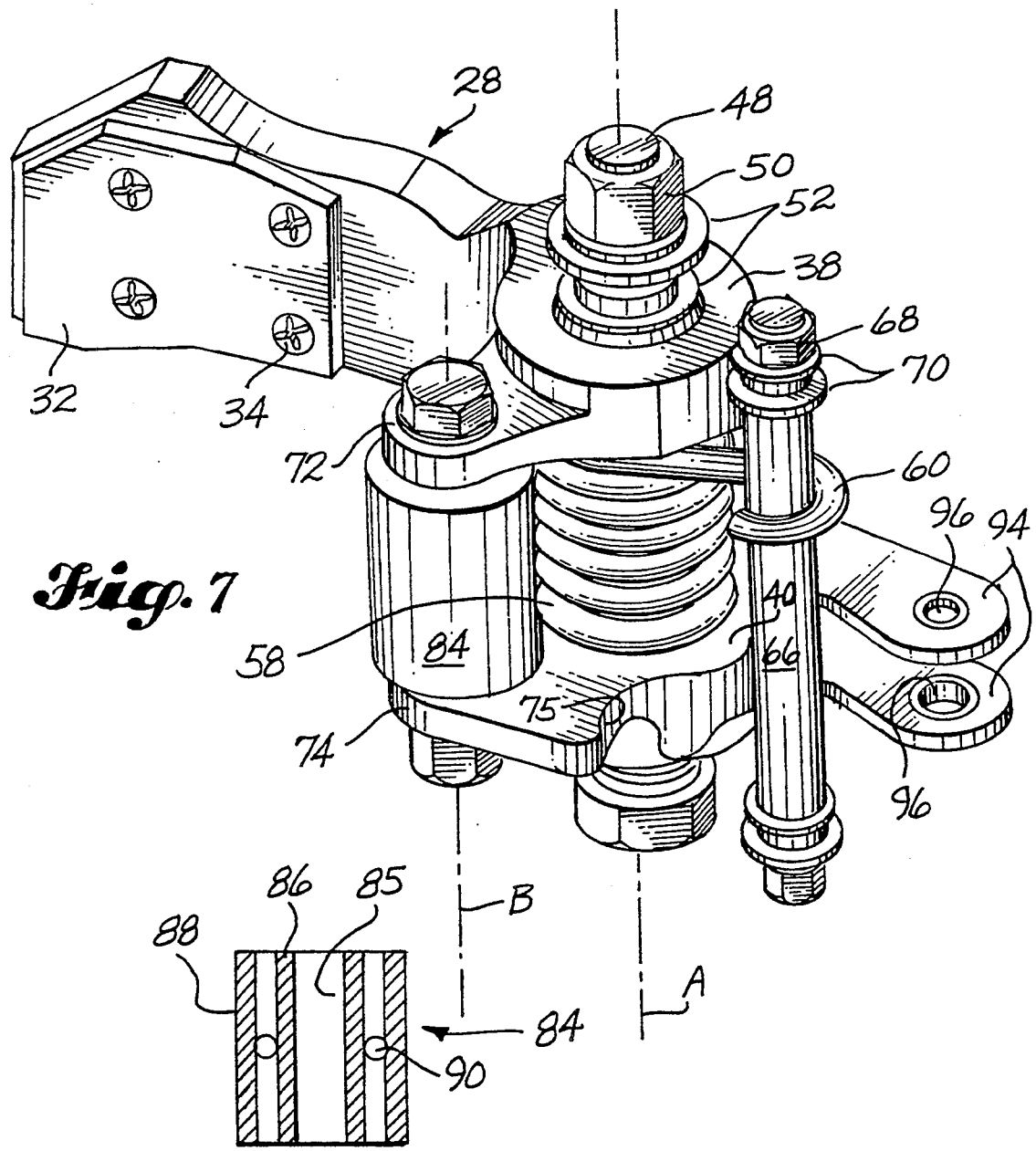
FIG. 7 is a pictorial view of a preferred embodiment of the inhibitor and associated structure.
FIG. 8 is a sectional view of the roller shown in FIG. 7.
Figure 9:
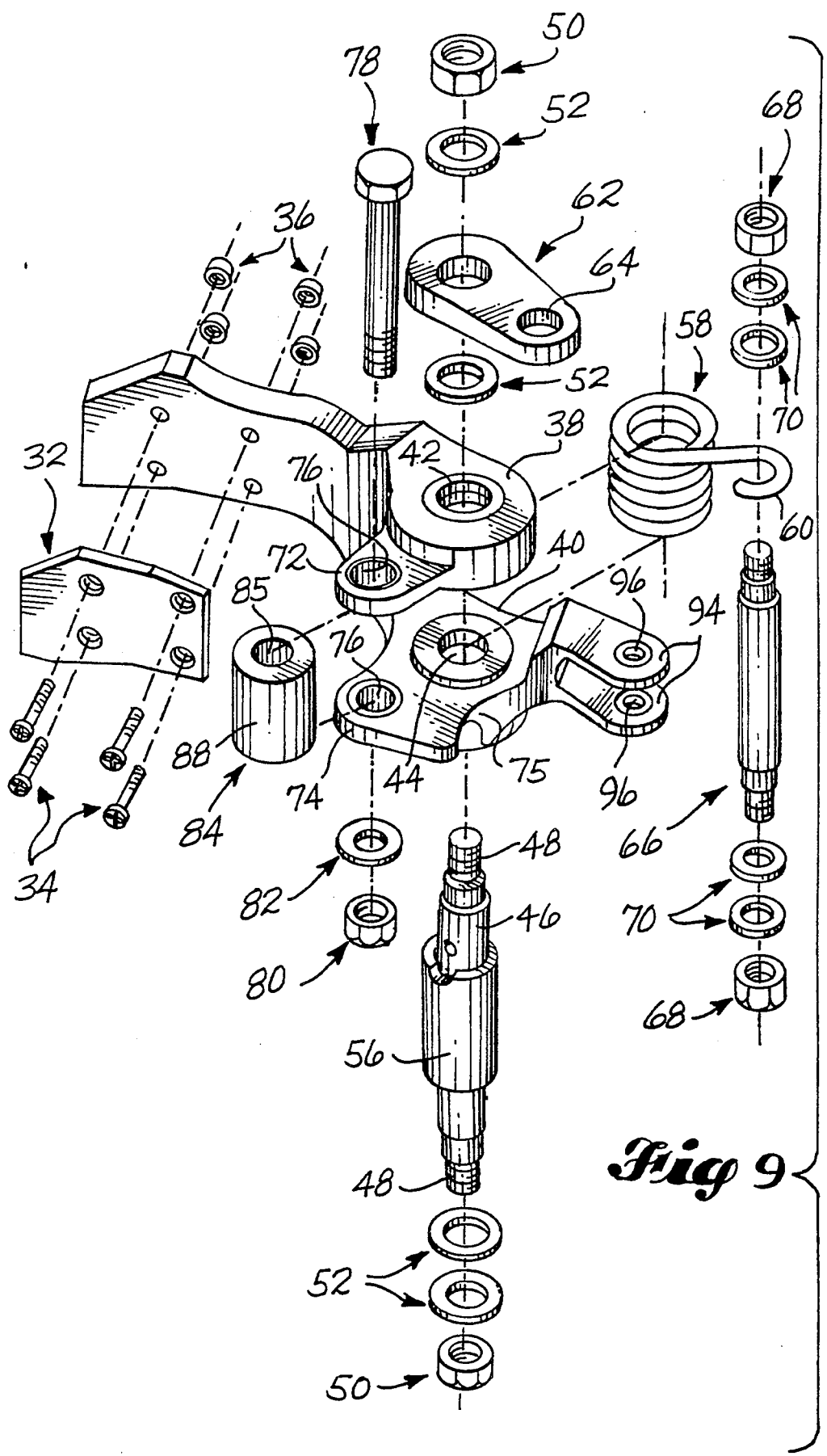
FIG. 9 is an exploded pictorial view of the apparatus shown in FIG. 7.
Figure 10:
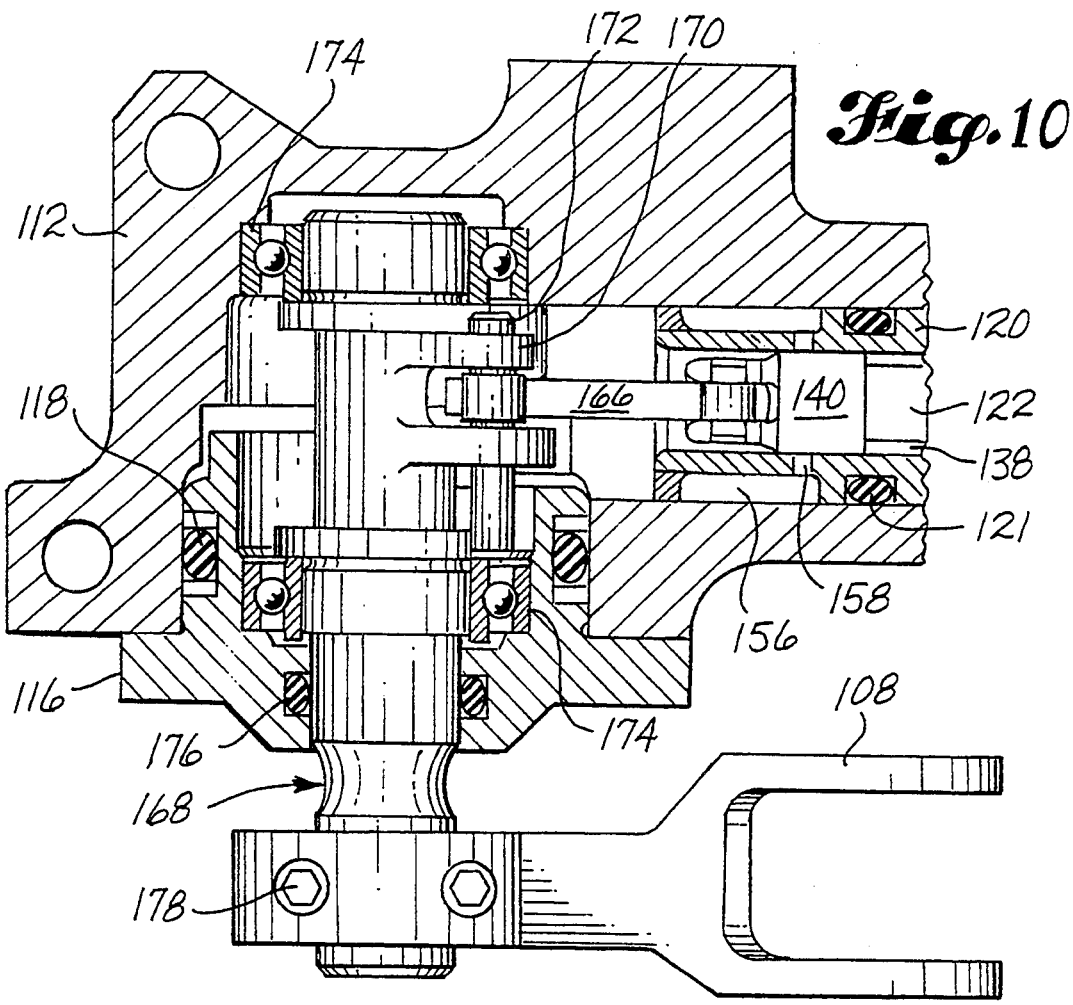
FIG. 10 is a fragmentary sectional view of an end portion of the preferred embodiment of the spread valve, with parts shown in elevation.
Figure 11:
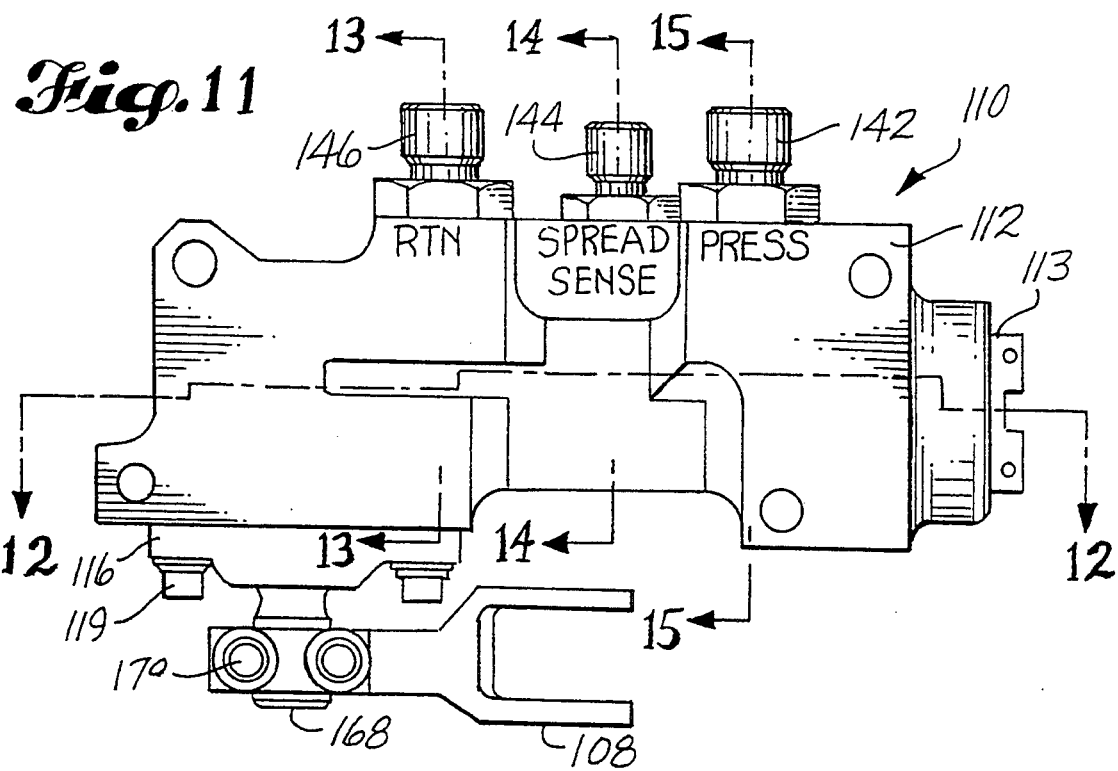
FIG. 11 is an elevational view of the valve shown in FIG. 10.
Figure 18:
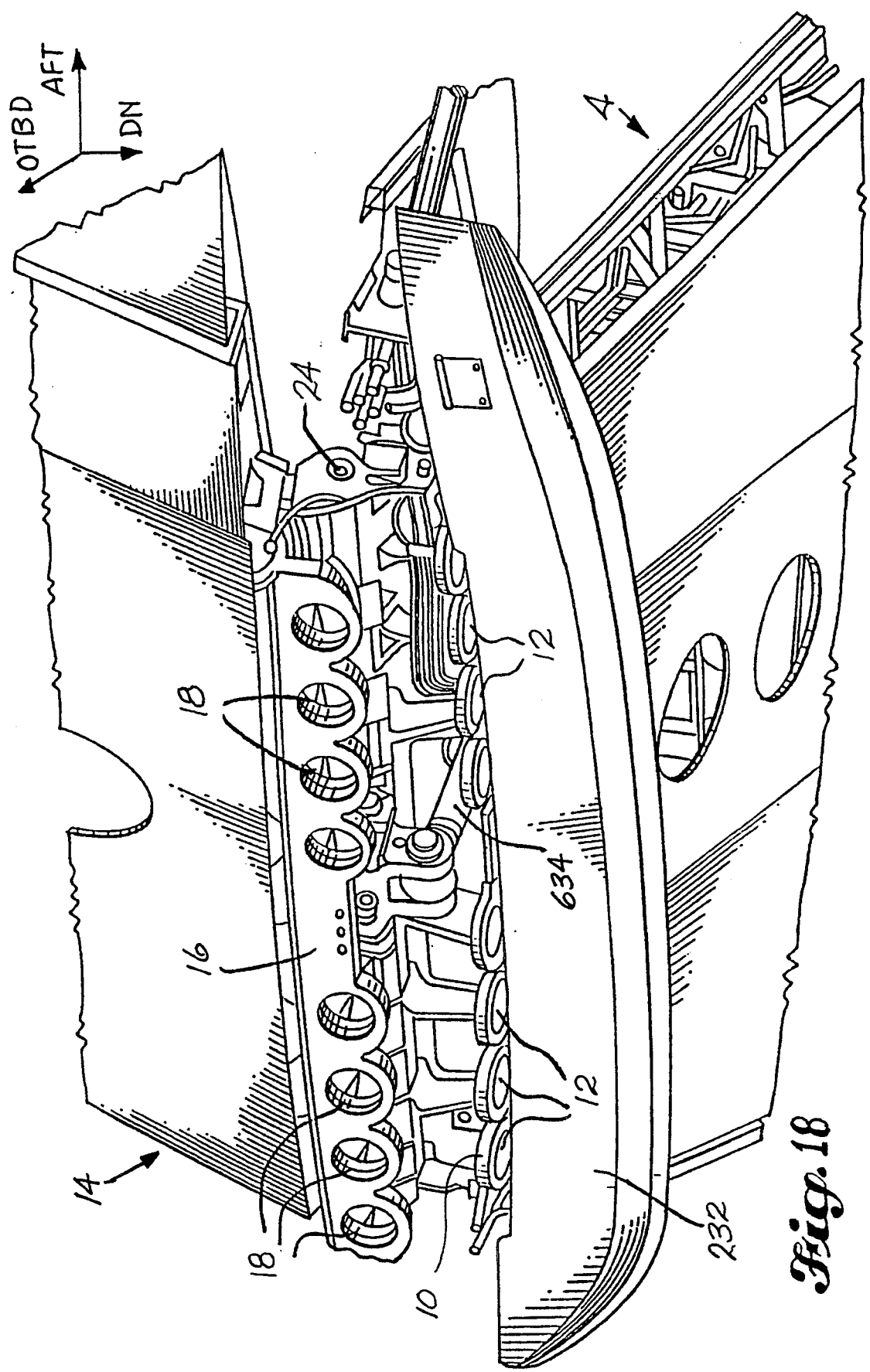
FIG. 18 is a fragmentary pictorial view of the hinge connection.

The details of the structure of the inhibitor 28 can best be seen in FIGS. 7 and 9. The inhibitor 28 has a projecting first end that extends over the opening 8 when the inhibitor 28 is in its inhibit position, as shown in FIGS. 4 and 6 and discussed above. The projecting end is provided with a bearing plate 32 that is secured to the inhibitor body by bolts 34 and nuts 36. The plate 32 is contacted by the lug 16 as the lug 16 moves into position between the inboard lugs 6, 10. The plate 32 is made from a suitable bearing material to prevent wear of the inhibitor body and provide smooth sliding engagement between the lug 16 and the inhibitor 28. The mounting of the plate 32 by means of bolts 34 and nuts 36 enables its easy removal and replacement to simplify maintenance of the inhibitor 28. On the rear surface of the projecting end of the inhibitor 28 opposite the bearing plate 32, a stop member 30 is preferably provided to prevent overtravel of the inhibitor 28 when it is engaged by the lug 16, as shown in FIG. 5. During normal operation, the stop member 30 does not contact any structure when the inhibitor 28 is in the engaged position. The stop member 30 may be removable to allow its replacement.

The end of the inhibitor 28 opposite the projecting end is bifurcated and has parallel spaced fingers 38, 40. Aligned openings 42, 44 in the fingers 38, 40 receive a pivot shaft 46 that defines the axis A. Referring to FIG. 9, the pivot shaft 46 has opposite threaded ends 48 that extend through the openings 42, 44 and are secured in place by nuts 50 and washers 52. A sleeve 56 surrounds the midportion of the shaft 46 between the threaded ends 48. A torsion spring 58 surrounds the sleeve 56, as shown in FIGS. 4 and 7. The spring 58 has a first end (not shown) that engages the inhibitor 28, and a second hook end 60 that is anchored to a support 54 carried by the inboard wing portion 4. The support 54 may be formed integrally with the lower inboard lug 6. An anchor member 62 is mounted on the pivot shaft 46 between the top finger 38 of the bifurcated end of the inhibitor 28 and the corresponding securing nut 50. The anchor member 62 has an opening 64 that receives an anchor bolt 66. The opposite ends of the bolt 66 are secured to the anchor member 62 and support 54 by nuts 68 and washers 70. The anchor member 62 is pivotably mounted on the pivot shaft 46 to be pivotable relative to the inhibitor 28. When the inhibitor 28 pivots in response to engagement by the wing-tip lug 16, the anchor member 62 and anchor bolt 66 remain in their stationary position. This creates torsion in the spring 58 to bias the inhibitor 28 back toward its inhibit position shown in FIGS. 4 and 7.

Each of the fingers 38, 40 of the bifurcated end of the inhibitor 28 is provided with a side lug 72, 74. The lower side lug 74 includes a stop surface 75 that contacts the anchor bolt 66 to limit movement of the inhibitor 28 toward its inhibit position (FIG. 4). The two side lugs 72, 74 together provide a means for mounting a roller 84 to pivot with the inhibitor 28 about axis A. A bolt 78 extends through aligned openings 76 in the side lugs 72, 74 and through an axial opening 85 in the roller 84. The upper end of the bolt 78 has a head formed thereon, and the lower end is secured by means of a nut 80 and a washer 82. The details of the structure of the roller 84 are shown in FIG. 8. The roller has concentric inner and outer cylindrical portions 86, 88. The outer portion 88 is supported on the inner portion 86 by a bearing 90. The outer portion 88 is freely rotatable with respect to the inner portion 86 about roller axis B for the purpose described below.

In addition to the inhibitor 28, the apparatus shown in FIGS. 4-6 includes a spread valve 110 and linkage interconnecting the inhibitor 28 with the valve 110. To accomplish the interconnection, the inhibitor 28 is provided with a projecting yoke 94. The valve 110 carries a yoke 108, shown in FIGS. 4-6, 10, and 11. A connector rod 98 extends between the two yokes 94, 108. The yoke 94 on the inhibitor 28 has spaced openings 96 through which a fastener 106 is received to pivotally connect an eye 104 on an end of the rod 98 to the yoke 94. The opposite end of the rod 98 is similarly pivotably connected to the yoke 108 carried by the valve 110. The outer end of a pivot shaft 168 is secured by fasteners 178 to the end of the yoke 108 opposite the connection to the rod 98. The shaft 168 actuates the valve 110, as described further below. The rod 98 may be made adjustable, such as providing it in the form of a turnbuckle, to permit precise adjustment of the movement of the yoke 108 and the shaft 168 in response to pivoting of the inhibitor 28.

The valve 110 is shown in FIGS. 4-6 and 10-17. It can best be seen in FIGS. 10-17. The valve 110 comprises a main housing 112 having an axial bore opening onto one end of the housing 112 and having an opposite blind end. A radial bore communicates with the blind end of the axial bore. The open end of the axial bore is closed by an end cap 113 that threadedly engages the main housing 112. A retainer housing portion 116 is received into the radial bore to pivotably secure a pivot shaft 168 to the main housing 112. The retainer 116 is secured to the main housing 112 by fasteners 119. A seal 118 is positioned between the two housing portions 112, 116 to seal the interior of the valve 112.

An annular sleeve 120 is received in the axial bore and has an axial opening extending therethrough into which a valve spool 122 is received. In the assembled valve 110, the sleeve 120 is fixed in position. It serves the known purpose of facilitating machining of the valve and its various chambers and passageways while maintaining the main housing 112 as a single integral piece. The sleeve 120 has annular chambers machined on its outer circumferential surface and radial passageways extending therethrough. Seals 121 seal the interface between the sleeve 120 and the housing 112 between chambers and passageways. The outer end of the sleeve 120 receives a plug 114 that is held in position by the end cap 113. A seal 115 is positioned between the plug 114 and the inner surface of the sleeve 120.

The valve member or spool 122 is connected to the yoke 108 by means of the pivot shaft 168 and a pivot link 166 to cause the spool 122 to shift between first and second positions in response to pivoting of the inhibitor 28. The spool 122 reciprocates between a first position, shown in FIGS. 10-12 and 16, and a second position, shown in FIG. 17. The valve 110 has a pressure port 142, a sense port 144, and a return port 146. When the spool 122 is in the first position, sense port 144 is in communication with the pressure port 142 and is closed from communication with the return port 146. In the second position, the sense port 144 communicates with the return port 146 and is closed from communication from the pressure port 142. The sense port 144 is always in communication with the system control module, described below. Return pressure in the sense port hydraulically signals the control module that the wings are fully spread.

The internal structure of the valve 110, and in particular the sleeve 120 and spool 122, can best be seen in FIGS. 12-15. The end of the spool 122 adjacent the plug 114 forms a piston 124 that is provided with a seal 126 to sealingly engage the inner surface of the sleeve 120. An end chamber 128 between the piston 124 and the plug 114 is always connected to return pressure by means of an axial passageway 160 through the spool 122. Inwardly of the piston 124, the sleeve 120 has a radial shoulder 130 formed thereon. A coil spring 132 surrounds the spool 122 and has opposite ends abutting the shoulder 130 and the piston 124. The spring 132 biases the spool 122 into its first position. The machining of the inner surface of the sleeve 120 to form the shoulder 130 also forms an annular chamber 134 between the spool 122 and the sleeve 120. Inwardly of the chamber 134, the spool 122 has a land 136 that slidably engages the inner surface of the sleeve 120. Inwardly of the land 136 is an annular chamber 138 formed by a reduced diameter portion of the spool 122. A second land 140 is formed on the spool 122 on the end of the reduced diameter portion opposite the land 136.

The outer circumferential surface of the sleeve 120 is machined to form annular chambers, and radial passageways extend through the sleeve 120, to provide fluid communication between the valve ports 142, 144, 146 and the spool 122. A first annular groove on the sleeve 120 forms an annular chamber 148 that communicates with the pressure port 142. Two axially spaced sets of radial passageways extend from the annular chamber 148 to the inner surface of the sleeve 120. Each set includes four circumferentially spaced passageways. The first set 150 extends from the annular chamber 148 to the annular chamber 134 in which the spring 132 is positioned. When the spool 122 is in the first position shown in FIGS. 10–12 and 16, the second set 152 communicates the annular chamber 148 with the chamber 138 formed by the reduced diameter portion of the spool 122. The spread sense port 144 is positioned between the pressure port 142 and the return port 146 and communicates with a second annular chamber 154 formed by a circumferential groove on the sleeve 120. The chamber 154 communicates with the chamber 138 surrounding the spool 122 via radial passageways 155. The return port 146 communicates with a third annular chamber 156 formed by machining the outer surface of the sleeve 120. Radial passageways 158 extend inwardly from the chamber 156 to the inner surface of the sleeve 120.

The spool 122 is mechanically moved between its first and second positions by movement of the inhibitor 28 via the linkage interconnecting the inhibitor 28 and the spool 122. Referring to FIGS. 4–6, pivoting movement of the inhibitor 28 pivots the connector rod 98 and the valve yoke 108 to thereby pivot the pivot shaft 168, best seen in FIGS. 10 and 12. The pivot shaft 168 is received into the radial bore in the valve housing 112 through an opening in the retainer 116. A seal 176 seals the interface between the shaft 168 and the retainer 116. The inner portion of the shaft 168 is rotatably supported in the housing 112 and retainer 116 by bearings 174. The shaft 168 has two projecting lugs that form a yoke 170. One end of the pivot link 166 extends into the yoke 170 and is pivotally secured thereto by a pin 172. The opposite end of the link 166 is pivotally secured to an end portion 164 of the spool 122. The link 166 converts pivotal movement of the shaft 168 into translational movement of the spool 122 in the sleeve 120.

The two positions of the spool 122 are shown schematically in FIGS. 16 and 17. FIG. 16 shows the spool position when the inhibitor 28 is in its inhibit position shown in FIGS. 4 and 6. The pressure port is in communication with the annular chamber 134 to urge the spool 122 toward the right (as shown). The area difference between the surfaces exposed to the pressure on the land 136 and the piston 124 results in the biasing force in the rightward direction. The pressure port is also in communication with the spread sense port via passageway 152, annular chamber 138, and passageway 155. Communication between the return port and the spread sense port is blocked by land 140 which is adjacent to the inner radial end of passageway 158.

FIG. 17 shows the second position of the spool 122 in which the spool has shifted to the left (as shown). Movement of the spool 122 has compressed the spring 132 to create a biasing force resisting the pull of the interconnecting linkage on the valve spool 122. In addition, the pressure port is still in communication with annular chamber 134 so that the pressure continues to urge the spool 122 toward its first position shown in FIG. 16. Land 136 has moved into alignment with the radial end of passageway 152 to close passageway 152 and thereby cut off communication between the pressure port and the spread sense port. At the same time, land 140 has moved away from the radial end of passageway 158 so that the return port and the spread sense port are in communication via passageway 158, annular chamber 138, and passageway 155. The resulting change in pressure in the spread sense port provides a signal to the control module that the wing portions 4, 14 are in their spread position. Preferably, the linkage and the valve elements are precisely dimensioned so that communication between the spread sense port and the pressure port is not cut off until the wing portions 4, 14 are fully spread.

The inhibitor/spread valve combination is provided with a number of safety features to prevent an incorrect spread sense signal and premature extension of the latch pin 20. The valve 110 is designed so that it is always biased towards its first position, which indicates that the wing portions 4, 14 are not spread. As discussed above, the biasing of the valve spool 122 is accomplished mechanically via the spring 132 and by means of pressure from the pressure port acting on the piston 124 in annular chamber 134. Both ends of the spool 122 are always connected to return. The communication of the spread sense port with the return port in the spread condition reinforces the safety of the valve 110. If leakage of pressure in the valve 110 should occur so that pressure from the pressure port reaches the sense port when the spool 122 is not in its first position, the resulting incorrect signal will indicate a folded wing position so that the result of the valve failure is a delay in takeoff, which is inconvenient but not a safety hazard. On the other hand, an incorrect spread signal can only result from a major failure in the hydraulic system, such as a major leak in the valve housing or elsewhere. In such a situation, the incorrect spread signal will not create a safety hazard because the failure in the hydraulic system will shut down the aircraft and prevent extension of the latch pins.

The inhibitor 28 itself is also provided with safety features. The spring 58 biases the inhibitor 28 into its inhibit position shown in FIGS. 4 and 6 to block latch pin extension and help prevent a spread signal if the wing-tip lug 16 is not urging the inhibitor 28 into its engaged position shown in FIG. 5. The biasing force of the spring 58 is reinforced by the mechanical (spring) and pressure biasing of the valve spool 122, which tend to move the inhibitor 28 into its inhibit position via the linkage between the spool 122 and the inhibitor 28. Further back-up protection to the inhibitor spring biasing is provided by positive return of the inhibitor 28 to its inhibit position by withdrawal of the wing-tip lug 16 into its folded position. A cam 92 is formed on the lug 16 and is positioned to engage the roller 84 as the lug 16 moves from its spread position to its folded position. This relative positioning is illustrated by the broken lines X, Y in FIG. 5. As can be seen therein, if the inhibitor 28 remains in its engaged position as the lug 26 withdraws, the cam surface 92 will contact the outer circumferential surface of the roller 84 to positively cause pivoting of the inhibitor 28 back into its inhibit position. When the wing tips are again spread, the cam 92 does not contact the roller 84 as the lug 16 moves into alignment with the lugs 6, 10 since the roller 84 is pivoted out of the pathway of the lug 16, as shown in FIG. 6. The safety feature of the combination of the cam 92 and the roller 84 ensures resetting of the inhibitor 28 and the return of the system to a condition in which folded wing tips are indicated even if the spring biasing of the inhibitor 28 fails or the inhibitor sticks or jams.

The inhibitor/spread valve combination is designed so that other types of failures in the apparatus also will not result in an incorrect spread signal. If there is a failure in any part of the linkage, the mechanical and fluid pressure biasing of the valve 110 will cause a folded condition to continue to be indicated. Similarly, if the projecting end of the inhibitor 28 is damaged or broken, movement of the lug 16 into its spread position will simply fail to create a spread signal.

PDU

As discussed above, the hinge connection of each wing tip is latched into a spread position by a series of latch pins 20 which extend through the aligned openings 8, 12, 18 in the hinge lugs 6, 10, 16. The latch pins 20 are locked into place by independently-operated primary locks and a mechanically-linked series of secondary locks. The secondary locks are rotated between locked and unlocked positions by a hydraulic power drive unit (PDU) 236. This unit 236 is one of the most important parts of the system of the invention. Folding and spreading movement of the wing tip 14 relative to the inboard wing portion 4 is driven by a hydraulically-operated actuator 634. The wing tip 14 is locked in a folded condition by the actuator 634.

A fairing 232 which projects below the wing houses latch pin actuator units 234 (shown in FIG. 19) as well as the PDU 236. Referring to FIG. 20, the PDU 236 is designed to rotationally actuate two series or banks of secondary locks on latch pin actuator units 234 to lock the wing tip 14 in a spread position. In preferred form, the PDU 36 is positioned at a midpoint in a row of actuator units 234 and includes axially-aligned, separate drive outputs 238, 240 at opposite ends thereof.

Referring to FIGS. 21–23, general external components of the PDU 236 are shown. The PDU 236 is substantially enclosed within and supported by a housing having multiple parts or compartments. A linear hydraulic piston/cylinder compartment 242 is positioned adjacent a pinion compartment 244. Axially aligned with the pinion compartment 244 is a differential compartment 246 which includes an end cover 248. Another compartment 250 of the housing contains a selector valve and is positioned adjacent the differential compartment 246 and axially parallel to the pinion compartment 244. The housing also includes a compartment 252 for a solenoid valve and a compartment 254 which houses sensor switches, the operation of which will be described later. Adjacent and tangential to the pinion compartment 244 is a compartment 256 which houses a manual lock-out that engages with the pinion. The housing is mounted onto the fixed inboard portion 4 of the wing by means of three mounting ears 258, 260, 262.

Referring to FIGS. 24 and 25, therein is shown at 264 a linear hydraulic piston/cylinder unit which is the primary drive of the PDU 236. The unit includes a fixed piston rod 266 and movable cylinder 268. The rod 266 is mounted at one end of the housing compartment 242 and includes first and second internal passageways 270, 272 which provide a flow of hydraulic pressure to first and second chambers 274, 276, respectively, in the cylinder 268. The first chamber 274 is on the rod side of a piston head 278 and the second chamber 276 is on the cylinder side of the piston head 278. A cylinder head 280, held in place by a threaded retaining nut 282, closes the chamber 274 around the piston rod 266.

Carried on one exterior side of the cylinder 268 is a set of gear teeth in the form of a rack 284. This rack 284 of gear teeth is sized and positioned to mesh with teeth of an adjacent pinion gear 286. Linear movement of the cylinder 268 caused by applying hydraulic pressure to either the piston chamber 274 or cylinder chamber 276 results in rotational movement of the pinion gear 286. In preferred form, one stroke length of the moving cylinder 268 and rack 284 carried thereon results in approximately 165° of rotation of the pinion gear 286.

The pinion gear 286, and consequently the cylinder 268, can be manually locked in position at one extreme stroke of the cylinder 268. This position corresponds with a fully-locked position of the latch pin actuator units 234 to which the PDU 236 is connected, as will be explained more fully later. In preferred form, the manual lock-out mechanism is operated externally by means of a key or wrench fitted into a socket 288 such that a cam 290 mounted on an internal shaft 292 can be rotated into an appropriately positioned notch 294 on the pinion gear 286. This position is illustrated in FIGS. 24 and 26.

Referring to FIG. 25, the locking cam 290 is shown rotated to an unlocked position, allowing movement of the pinion gear 286. The cylinder 268 is shown at its opposite end of stroke, hydraulic pressure having been applied to the rod side chamber 274. Linear movement of the rack 284 has resulted in clockwise rotation of the pinion gear approximately 165°. Substantially opposite the rack 284 on the cylinder 268 are bearing members 296, 298 which ride on an inside surface 300 of the piston/cylinder compartment 242 of the housing. This can also be seen in FIG. 26. These slide bearings 296, 298 cause the rack 284 to remain meshed with teeth of the pinion gear 286 and minimize friction. This arrangement of bearings 296, 298 carries lateral loads of the cylinder 268, thereby isolating the piston 278 and piston rod 266 from such lateral loads.

Referring now to FIG. 27, and specifically to the pinion gear 286 shown in longitudinal section, it can be seen that a planetary gear cage or carrier 302 extends axially from the pinion gear 286 and is located in the differential housing 246, 248. The pinion gear 286 and carrier 302 are integrally formed and are carried by bearings 304, 306 in the housing 244, 248. Rotation of the pinion gear 286 by movement of the cylinder 268 results in identical rotation of the carrier 302.

Referring also to FIG. 28, it can be seen that six planet gears 308, 310, arranged in three coordinating pairs, are mounted on the carrier 302. Each planet gear 308, 310 is mounted for free rotation on an axle 312. The six axles 312 are carried by the cage 302 in an aligned arcuate path which is concentric with the axis of the pinion gear 286.

As can best be seen in FIG. 29, but also in FIGS. 27 and 28, the planet gears 308, 310 each have three axial portions or regions. A first portion 314 comprises approximately one-third the axial length of the planet gear 308, 310 and is devoid of teeth. The second and third portions 316, 318 include congruous intermeshing teeth. Each pair of planet gears 308, 310 includes one gear axially reversed of the other such that the teeth of each midportion 316 intermesh and the untoothed portion 314 of one gear 308 is adjacent a toothed end portion 318 of its companion gear 310. As expected, the intermeshing of the midportions 316 requires that rotation of one gear 308 on its axle 312 will result in rotation of the other gear 310 on its axle 312, but, of course, in the opposite direction.

Positioned radially inwardly of the carrier 302 and planet gears 308, 310 are a pair of axially spaced sun gears 320, 322. The sun gears 320, 322 include teeth which are sized and positioned to intermesh with end portions 318 of one set of planet gears 308, 310, respectively. Specifically, three planet gears 308 intermesh with sun gear 320 at positions which are spaced apart approximately 120° relative to one another. Rotation of either the planet gears 308 or the sun gear 320 will result in converse rotation of the other. Likewise, planet gears 310 intermesh with sun gear 322 and are also spaced approximately 120° relative to one another. Rotation of either the planet gears 310 or the sun gear 322 will result in converse rotation of the other.

Sun gear 320 includes an axially-directed shaft 324 which extends outwardly of the housing 248 and ends in drive output 238. Sun gear 322 includes an axially-extending shaft 326 which extends freely through the pinion gear 286, outward of the pinion gear housing 244 and terminates in drive output 240. The sun gears 320, 322 and their respective shafts 324, 326 are axially aligned and oppositely directed. Sun gear 320 and shaft 324 are carried by bearings 328, 330. Sun gear 322 and shaft 326 are carried by bearings 332, 334. A pair of spacers 336, 338 extend axially inwardly from the sun gears 320, 322 to hold the gears in an appropriate axially-spaced position. In preferred form, the spacers 336, 338 are made of a self-lubricating thermoplastic material. This allows the end portions which contact each other to act as simple bearings when necessary. Under normal circumstances, both shafts 324, 326 will be rotated simultaneously. Under some conditions, as will be explained below, one shaft could remain stationary or rotate at a different rate relative to the other.

As can be understood from a study of FIGS. 27, 28 and 29, the differential gearing of the PDU 236 allows the drive outputs 238, 240 to operate and be driven independently of one another. As previously described, linear movement of the cylinder 228 carrying the gearing rack 284 causes rotation of the pinion gear 286 and, in turn, the differential carrier 302. Under normal circumstances, when both drive outputs 238, 240 are permitted to rotate together, the planet gears 308, 310 do not rotate relative to the carrier 302 or their axles 312. Instead, they are moved with the carrier 302, without independent rotation, along the previously-described arcuate path. Because neither set of planet gears 308, 310 is rotating relative to the other, the sun gears 320, 322 are also rotated around the same axis and at the same rate as the carrier 302 and pinion gear 286. In this situation, rotation of the drive outputs 238, 240 is identical and the PDU 236 is acting in a direct-drive capacity.

If one of the outputs 238, 240 is stalled or slowed relative to the other, the differential gearing allows the other output to continue to receive power, but at an increased speed. For example, if drive output 238, including its associated drive shaft 324 and planet gear 320, becomes stalled while the carrier 302 is being rotated, one set of planet gears 310 which have teeth intermeshed with the sun gear 320 will begin to rotate relative to the carrier 302 and their supporting axles 312, around the periphery of the sun gear 320. The rotation of planet gear 308, as previously described, causes rotation of its associated and intermeshed planet gear 310 in the opposite direction.

Referring to FIG. 28, in the above-described scenario in which sun gear 320 was stalled, one planet gear 308 of each pair would be rotated in the counter-clockwise direction as it is moved through a counter-clockwise arcuate path by the carrier 302 around the sun gear 320. In turn, planet gears 310, which do not engage sun gear 320, would be rotated oppositely in a clockwise direction. Referring now also to FIGS. 27 and 29, it can be seen that this rotation of planet gears 310 compounded by their being carried in an arcuate path by the carrier 302 will cause the second sun gear 322 to be rotated at an increased speed. As a result, output 240 will reach its terminal point of rotation prior to complete reciprocation of the linear hydraulic piston cylinder unit 264 and prior to full rotation of the carrier 302. Thereafter, full power would then be diverted to driving the previously-stalled sun gear 320 and its corresponding output 238. If the resistance which had stalled the output 238 is overcome, sun gear 320, shaft 324 and output 238 will then be rotated, again at an increased speed relative to rotation of the cage 302 and pinion gear 286. Under such conditions, the planet gears 308, 310 would begin to rotate oppositely of that previously described and a converse reaction would divert power to the sun gear 320. This causes the output 238 to "catch up" and reach its termination of rotation when the carrier 302 has fully rotated and the piston cylinder unit 264 has fully reciprocated.

Referring now specifically to FIG. 28, the position of the carrier 302, and consequently the drive outputs 238, 240, is monitored by the system. In preferred form, the carrier 302 includes a radially-directed cam surface 340 which is positioned to contact pivotally-mounted levers 342, 344 located in the switch housing 254. Also in the switch housing 254 are corresponding snap-action switches 346, 348 which are actuated by movement of the levers 342, 344, respectively.

FIG. 28 shows the PDU 236 in the "locked" position. The PDU 236 operates a series of ganged-together secondary locks, one of which is located on each latch pin actuator unit 234. "Locked," as used herein, refers to one end of the PDU's cycle in which the outputs 238, 240 have been fully rotated in one direction and the piston cylinder unit 234 is fully extended, as shown in FIG. 24.

When "unlocking," the carrier 302 and drive outputs 238, 240 are rotated clockwise as viewed in FIG. 28. Rotation through approximately 131° will position the PDU 236 in an "unlocked" position in which the cam surface 340 is rotated into position to depress lever 344, thereby actuating switch 348. The PDU 236 is stopped in this position due to a mechanical-type interference built into the latch pin actuators 234, indicating that each latch pin is "unlocked" but remains "latched." As each latch pin 20 is retracted, this mechanical interference is removed allowing the PDU 236 to rotate itself and the secondary locks through approximately another 30° of rotation. In this position, the cam surface 340 depresses both levers 342, 344, thereby actuating both switches 346, 348. This selective actuation of the switches 346, 348 allows the position of the PDU 36, and consequently the position of both the secondary locks and latch pins, to be monitored by the control module.

Figure 30:
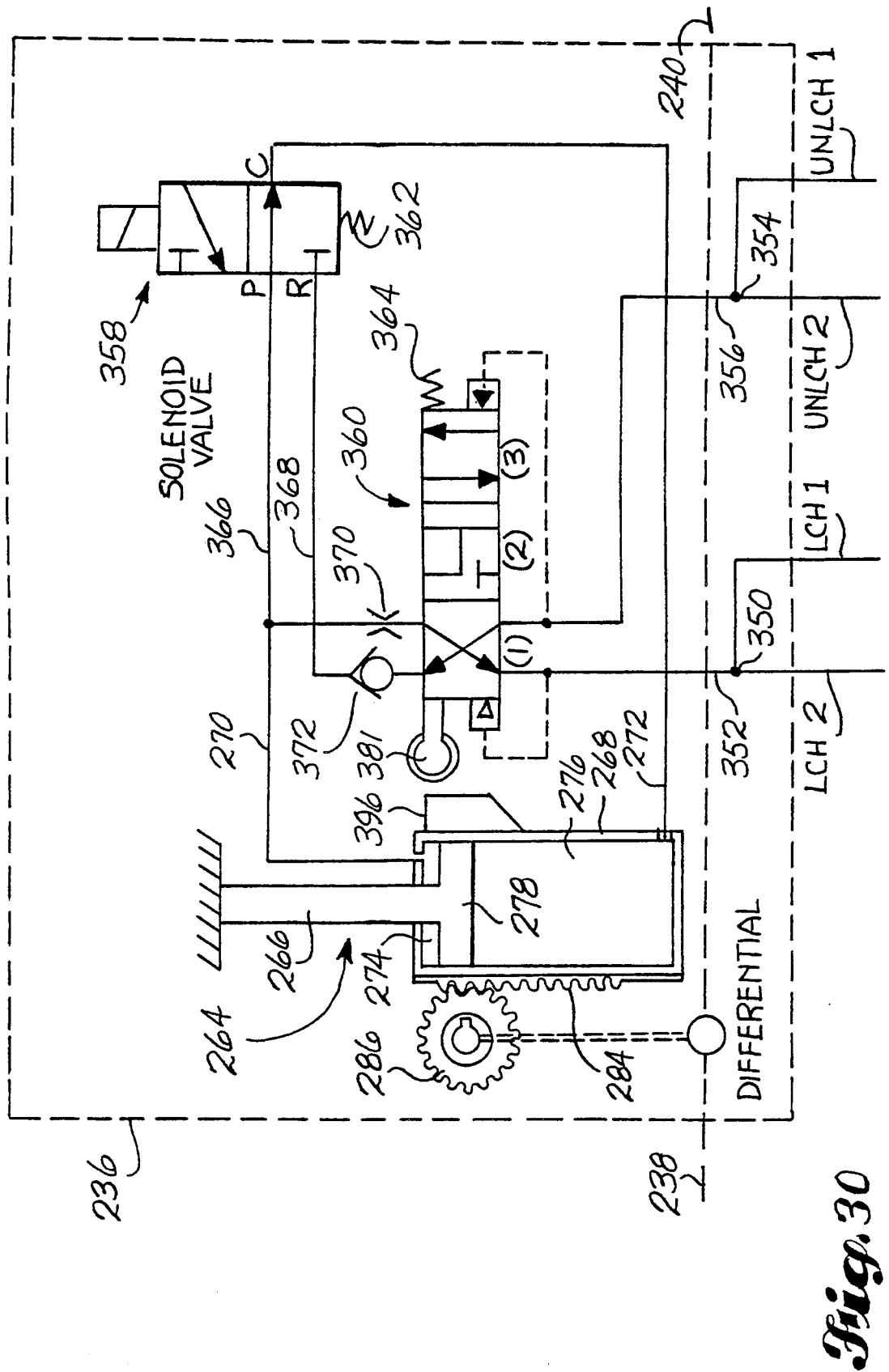
FIG. 30 is a schematic diagram illustrating the preferred arrangement of hydraulic control circuitry of the power drive unit.

Referring to FIG. 30, therein is shown a schematic representation of a preferred internal control system for the PDU 236. In preferred form, the same hydraulic pressure system which operates the latch pin actuator units 234 is used to operate the PDU 236. This reduces the total number of hydraulic lines required to be run along the length of the stationary wing portion 4 to the relatively-remote and crowded region of the wing-tip hinge 24. Both the PDU 236 and the latch pin actuator units 234 are connected to a latch line and an unlatch line. When hydraulic pressure is placed on the LATCH side, the UNLATCH line acts as a return line. When hydraulic pressure is placed on the UNLATCH line, the LATCH line acts as a return line.

In order to reduce the total number of line connections required, an internal "T" connection is used at each component 234, 236. Referring again to FIG. 30, hydraulic lines LCH 1, LCH 2 are connected to fittings on the PDU housing and an internal "T" 350 provides a branch 352 for a "latch pressure high" supply line. Hydraulic lines UNLCH 1, UNLCH 2 are connected to the housing and another internal "T" 354 provides a branch line for "unlatch pressure high" supply 356.

Figure 31:
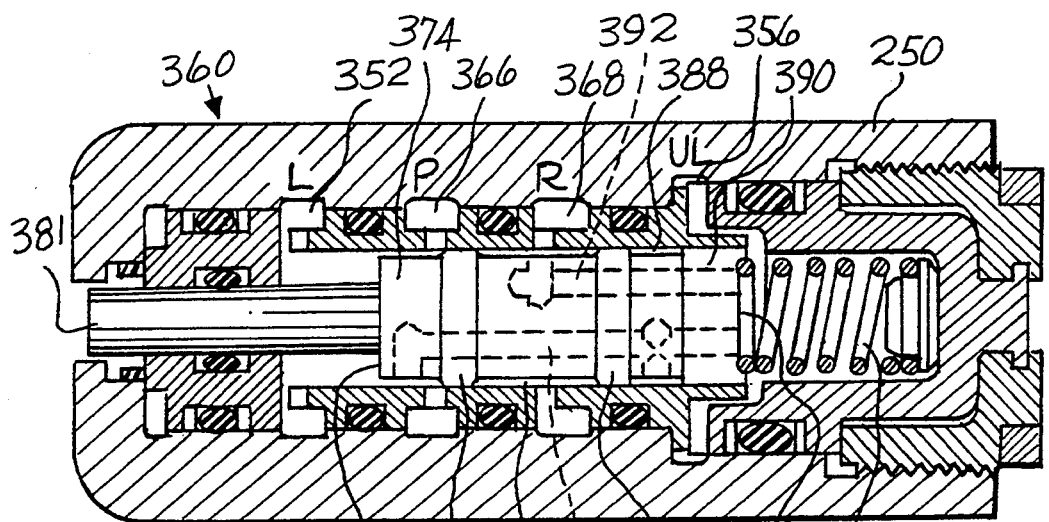
FIGS. 31-33 are longitudinal sectional views of the selector valve of the power drive unit, taken substantially along line 31—31 of FIG. 22.
Figure 32:
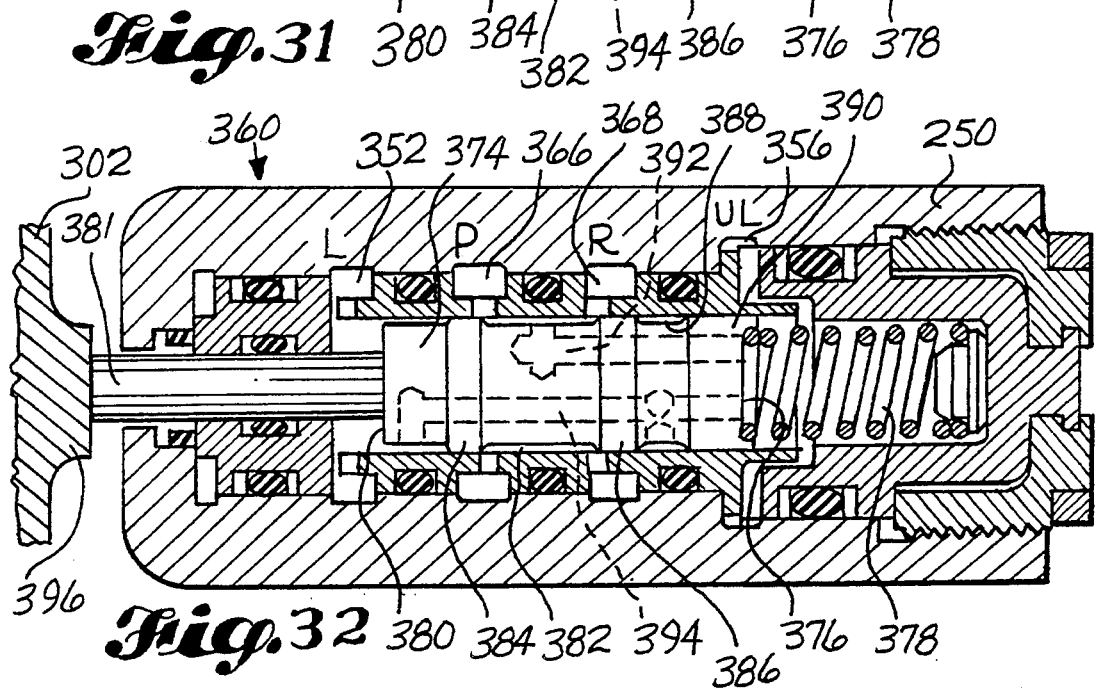
Figure 33:
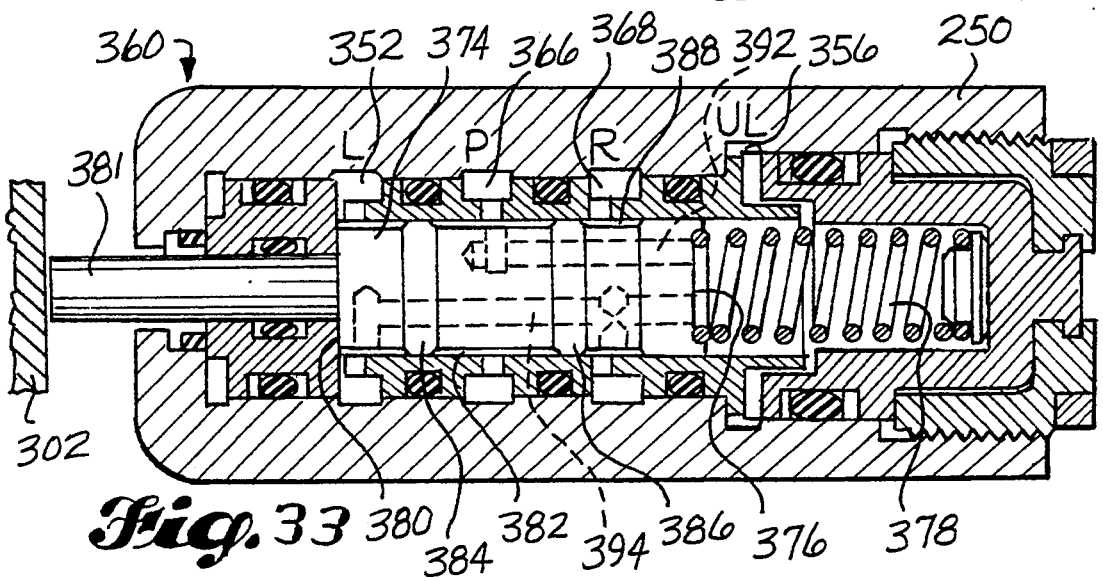

The internal control system for the PDU 236 includes an electrically-actuated solenoid valve 358, also referred to as the PDU unlock solenoid, and a switching control valve 360. The solenoid valve 358 is spring biased 362 into a default "disarmed" position. The switching control valve 360 is located in housing 250 and includes three distinct positions. In preferred form, valve 360 is a spool valve such as is shown in FIGS. 31-33. The position of the spool is controlled by hydraulic pressure at opposite ends and by a spring 364 which biases the spool toward the third position (FIG. 33).

When the solenoid valve 358 is de-energized, as illustrated in FIG. 30, equal hydraulic pressure is delivered to both the piston side chamber 274 and cylinder side chamber 276 of the cylinder 268. This is the case whether LATCH pressure is high or UNLATCH pressure is high and regardless of the position of valve 360. In this situation, the PDU 236 is "commanded" or biased toward "lock." This is due to the difference in surface area between chambers 274 and 276 in the cylinder 268. The greater surface area presented on the cylinder side of the piston head 278, as opposed to the piston rod 266 side of the piston head 278, causes the piston cylinder unit 264 to extend as illustrated in FIGS. 24 and 30, when equal pressure is applied to both sides. As previously described, this is the "lock" position. Output lines 366, 368 from the valve 360 connect to ports of the solenoid valve 358. Output line 366 may, if desired, include a flow restrictor 370 and is connected to the "piston side" chamber 274 of the cylinder 268 through conduit 270. Line 366 is also connected to the port designated "P" (representing "piston side") of the solenoid valve 358. Output line 368 includes a check valve 372 and is connected to the return port (designated "R") on the solenoid valve 358.

Referring to FIGS. 31-33, therein is shown a preferred embodiment of the switching control valve 360. The valve 360 includes a spool 374 which is biased at one end 376 by a spring 378. Extending axially from the opposite end 380 is an inhibit "dog" or rod 381, the function of which will be described later. A first groove 382 is formed between lands 384, 386. A second groove 388 is formed between lands 386, 390. An internal passageway 392 through the spool 374 connects the first end 376 with the first groove 382. A second passageway 394 connects the second end 380 with the second groove 388.

One of the safety features built into the folding wing-tip system is that the latch pin actuator units 234 cannot retract the latch pins 20 until all of the secondary locks are unlocked. The power drive unit 236 helps ensure proper sequencing of the fold procedure by preventing unlocking of the secondary locks if UNLATCH is being commanded, i.e. pressure to the UNLATCH line 356 is high, prior to the PDU 236 having operated to unlock the secondary locks. In order to assist understanding of this safety feature, a description of the operation of the PDU 236 follows.

The fold sequence begins with wing tips 14 in a spread position, fully latched and locked. The preliminary enabling and arming of the system are described below in the description of the operation of the overall system. When the system is armed, hydraulic pressure "high" is commanded to the LCH lines, including supply line 352. Hydraulic pressure "low," or return, is commanded to the UNLCH lines, including supply line 356. As can be seen from a study of FIGS. 30-33, applying hydraulic pressure to line 352 and connecting line 356 to return shifts the valve 360 to a first position, compressing spring 364, 378. This position is illustrated in FIG. 31. Equal hydraulic pressure is applied through lines 270 and 272 to chambers 274 and 276 of the actuation cylinder 268. Due to the previously-described difference in surface area on opposite sides of the piston head 278, the cylinder 268 is shifted or remains biased toward the extended or "locked" position.

The PDU 236 is then commanded to unlock by energizing the solenoid valve 358. This causes the force of spring 362 to be overcome and the cylinder chamber 276 to be connected to return. This connection is made through line 272, energized solenoid valve 358, line 368, check valve 372, valve 360, and line 356. Pressure being applied through line 270 to the piston chamber 274 causes actuation of the piston cylinder unit 264, thereby driving the pinion gear 286 and, consequently, outputs 238, 240 to "unlock" in the previously-described manner. When the carrier 302 has travelled through approximately 131° of rotation, switch 348 is actuated signalling the control module that all secondary locks are "unlocked". The control module then switches hydraulic pressure to the UNLCH lines and connects the LCH lines to return. Due to the configuration of the latch pin actuator units 234 the primary locks are "unlocked" and latch pins 20 are retracted to an "unlatched" position. At the same time, valve 360 senses a loss of hydraulic pressure to the second end 380 of the spool and the presence of hydraulic pressure on the first end 376, causing the spool 374 to shift to the third position, as shown in FIG. 33.

In this position, hydraulic fluid entering at port 356 is applied against the first end 376 of the spool 374 and is delivered through passageway 392 to groove 382 and into line 366. The return line 368 communicates with the second end 380 of the spool 374 and port 352 via groove 388 and passageway 394. The nearly instantaneous shift of valve 360 from position (1) (FIG. 31) to position (3) (FIG. 33), as a result of the reversing of hydraulic pressure from line 352 to line 356, causes the cylinder 268 to remain in its actuated position (FIG. 25) and the PDU 236 to continue to bias the secondary locks toward "unlock."

As previously described, after each latch pin 20 has been fully retracted, the secondary locks, and consequently the drive outputs 238, 240 of the PDU 236, are allowed to rotate approximately another 30° further. The second switch 346 is actuated by the cam 340 contacting the lever 342 and a "fully unlatched" condition is signaled to the control module. The actuator 634 is then activated to fold the wing tip 14,.

During a subsequent spread sequence, hydraulic pressure "high" is switched from line 356 to line 352, causing valve 360 to again shift to its first position (FIG. 31), and the PDU 236 continues to bias its outputs 238, 240 toward "unlock" while the latch pins 20 are moving into a "latched" position. The PDU 236 is then commanded to "lock" by de-energizing the solenoid valve 358. Equal pressure again being applied to chambers 274 and 276 of the cylinder 268, the piston cylinder unit 264 is once again extended, driving the pinion gear 286 and, consequently, drive outputs 238, 240 toward the "locked" position.

A sequencing malfunction of the system can be detected by the PDU 236. Specifically, if the system commands UNLATCH before the PDU 236 has been commanded to UNLOCK, shifting of the valve 360 into the third position is inhibited, the PDU 236 is not operated to drive its outputs 238, 240, and the secondary locks remain locked. This is accomplished by an interference between the inhibit rod 381 and a cam surface 396 on the carrier 302. The interference is illustrated in FIGS. 27 and 32 and schematically in FIG. 30. Cam surface 396 is appropriately positioned on the carrier 302 such that when the PDU 236 is in the "locked" position, it provides a mechanical interference preventing shifting of the valve 360 into its third position. Instead, if UNLATCH is commanded while the PDU 236 is still in the "locked" position, the spool 374 of valve 360 will shift to a second position, shown in FIG. 32. In this second position, hydraulic fluid entering port 356 and moving through passageway 392 is delivered to both lines 366 and 368. In this condition, regardless of the position of solenoid valve 358, hydraulic pressure is either equal to both chambers 274, 276 of the cylinder 268 or the Cylinder 268 is hydraulically locked. In either event, the piston/cylinder actuator 264 remains in its fully extended position and the PDU 236 remains in its "locked" position. As a result of the system failure, the folding wing tips 14 will neither unlock nor unlatch and the wing tips 14 remain spread. This calls to the attention of the flight deck or ground crew a failure in the general control system which must be corrected. This safeguard, however, results in the wing tips 14 remaining spread—a condition which may be inconvenient, but always safe.

Latch Pin Actuator Assembly

As noted above, the PDU 236 drives secondary locks for a plurality of latch pins 20. Each pin 20 is moved hydraulically into place by its own actuator unit 234 (see FIG. 20). T h e basic construction of each actuator unit 234 is shown in FIGS. 2, 3, 35, and 36. All of the actuator units 234 are substantially identical. It is presently anticipated that there will be eight individual latch pin actuator units 234 and eight latch pins 20 on each wing. The preferred arrangement of the ganged plurality of units 234 is shown generally in FIG. 20. The specific relationship between the units 234 is discussed in some detail below.

Figure 34:
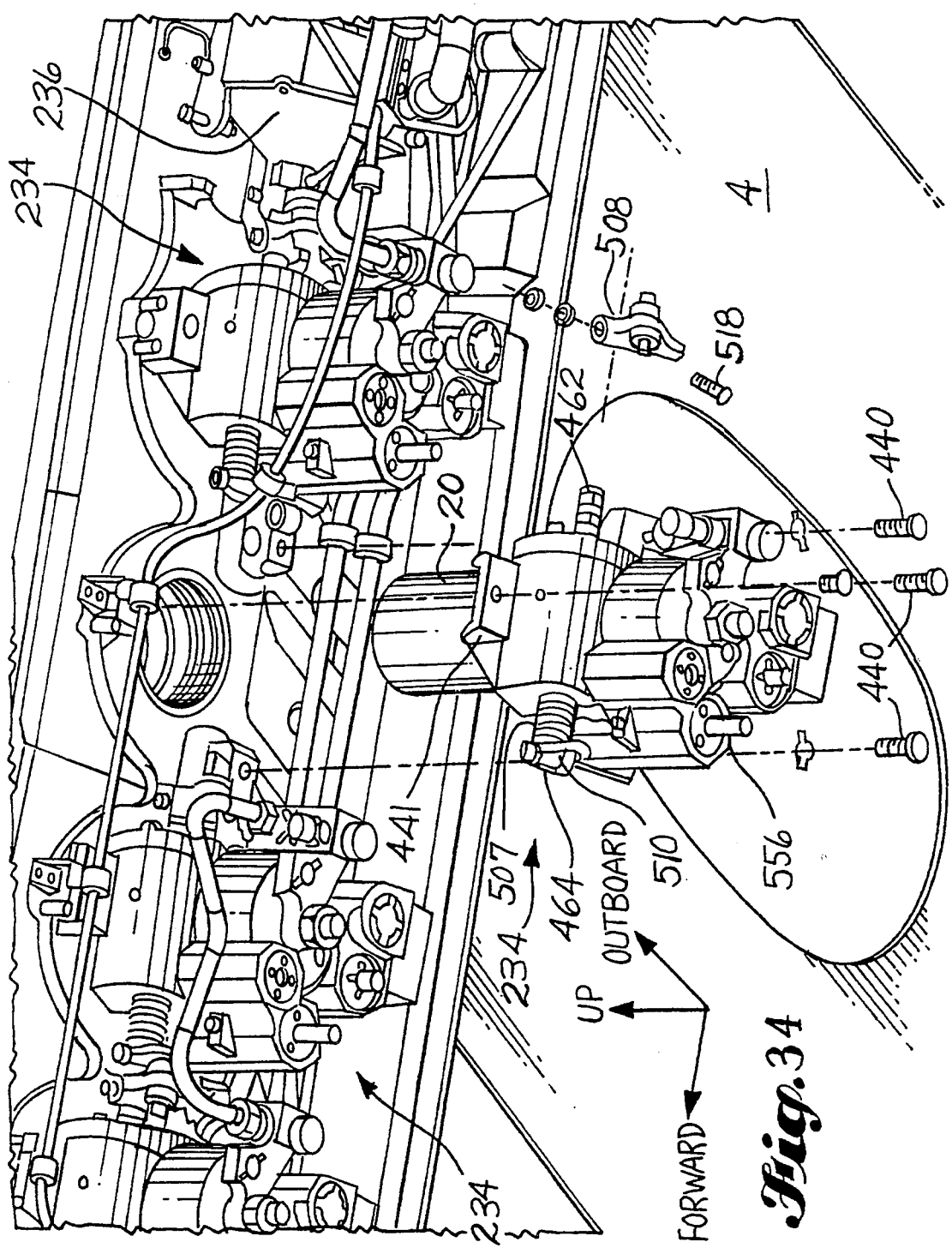
FIG. 34 is a partially exploded pictorial view of one of the hydraulic latch pin actuators and associated structures.
Figure 35:
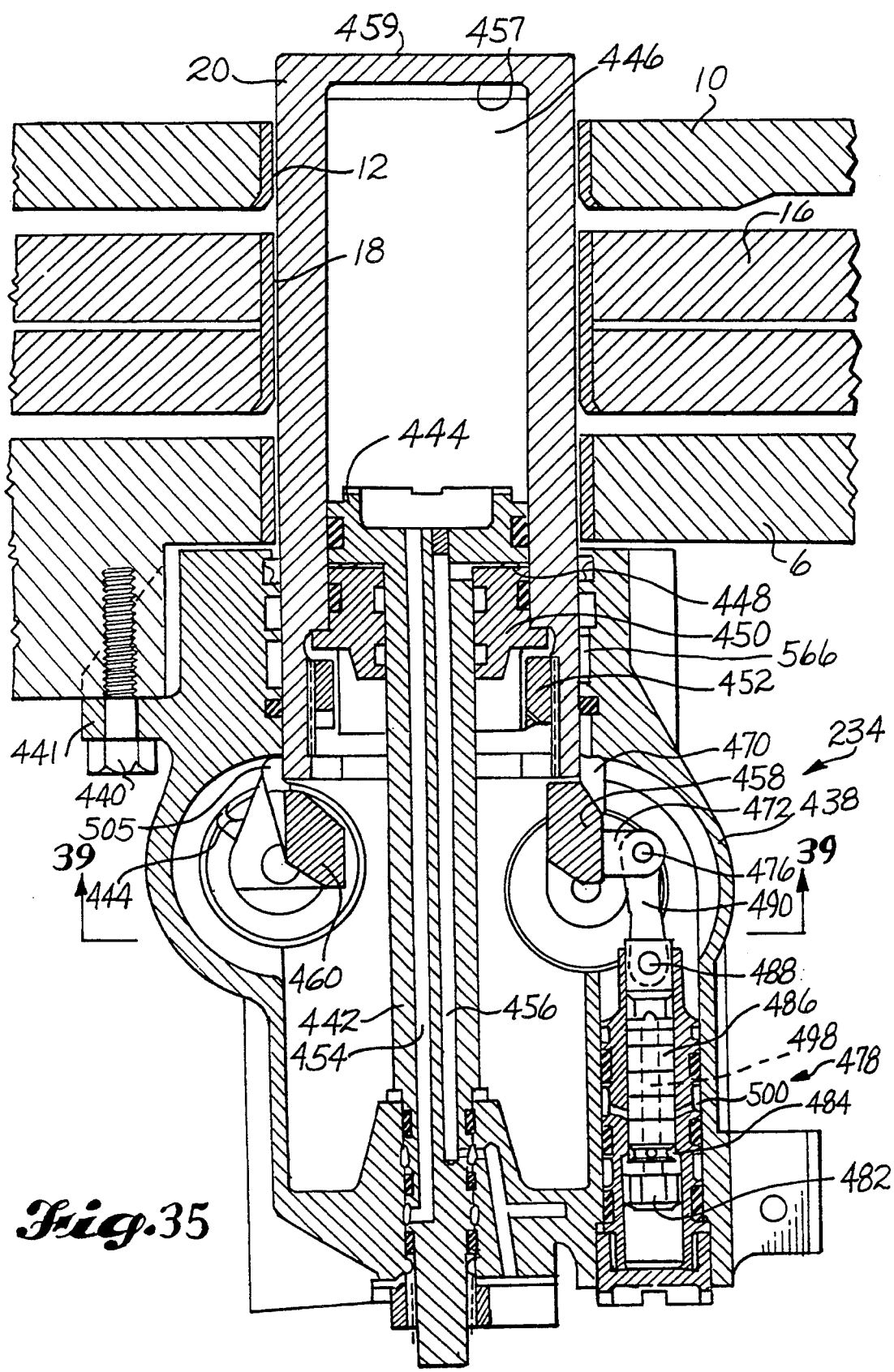
FIG. 35 is a detail sectional view of the latch pin actuator shown in a latched and locked condition.

Referring to FIGS. 2, 3, and 35, each latch pin actuator unit 234 has a latch pin 20 that is slidingly received within an actuator housing 438. The housing 438 is mounted by bolts 440 (FIG. 34), which extend through mounting ears 441, to the lower lug 6 located at the outboard end of the fixed inboard wing portion 4. The latch pin 20 is extended and retracted in and out of the housing 438 by hydraulic pressure.

Figure 36:
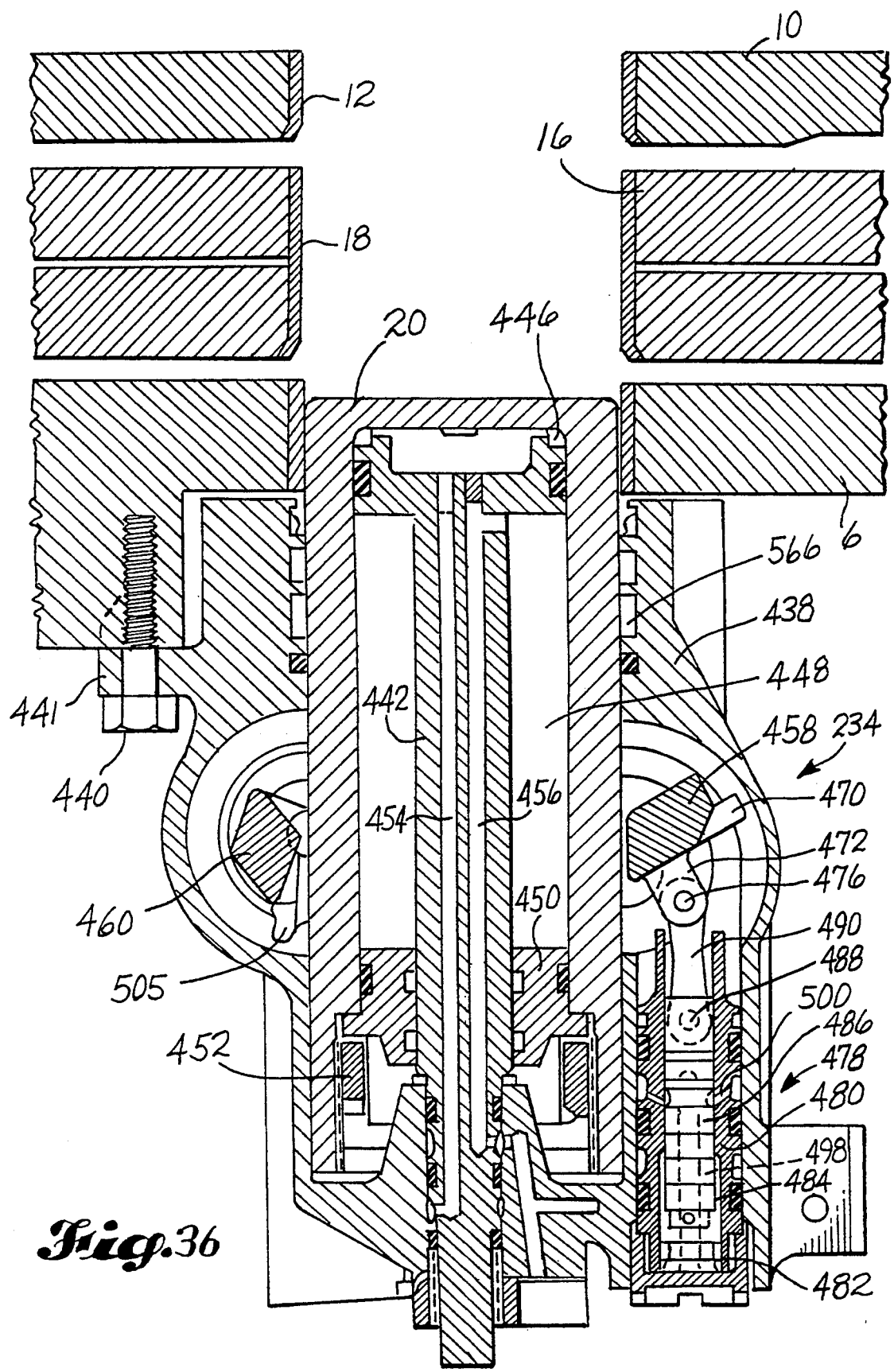
FIG. 36 is a view similar to FIG. 35 showing the latch pin actuator in an unlocked and unlatched condition.

In preferred form, a stem or piston rod 442 is fixedly connected to the housing 438 and extends generally along the centerline axis of the housing 438 and latch pin 20. The latch pin 20 itself is in the form of a travelling cylinder barrel. A piston head 444 is located at the free end of the rod 442 and divides the cylindrical latch pin 20 into two internal chambers 446, 448. The chamber 448 on the piston rod side of the piston head 444 is closed by a cylinder head 450 which is held in place by a threaded retainer nut 452. The stem or piston rod 442 is provided with internal fluid conduits 454, 456 through which hydraulic fluid pressure is delivered to and from each chamber 446, 448. Delivery of hydraulic fluid into the first chamber 446 through conduit 454 causes the latch pin 20 to be extended through the aligned openings 18, 12 in the lug 16 on the wing tip 14 and the upper lug 10 on the inboard wing portion 4. This position is shown in FIGS. 2 and 35. Connecting conduit 454 to return and conduit 456 to pressure causes delivery of hydraulic fluid pressure to the second chamber 448, and the latch pin 20 is withdrawn. This position is shown in FIGS. 3 and 36.

The floating cylinder construction of the latch pin 20 causes actuating fluid pressure to bear directly against an inner "cylinder head" surface 457 of the leading portion 459 of the latch pin 20. In this manner, the latch pin 20 is self-adjusting for slight misalignments and tends to be "pulled" into position by the hydraulic fluid pressure. When the latch pin 20 is being retracted, hydraulic pressure applies force to the cylinder head 450 which is then adjacent to the "leading" end of the latch pin 20.

The surface area against which hydraulic pressure bears in the first chamber 446 is greater than the surface area against which hydraulic pressure bears in the second chamber 448. This differential in surface area causes the latch pin 20 to be biased toward a "latched" position when hydraulic pressure is static or neutral to both chambers 446, 448. Thus, the latch pin 20 is always biased in default toward the "safe" position, which corresponds to a spread wing condition.

Referring now specifically to FIGS. 35 and 39, therein it can be seen that, when the latch pin 20 is extended into a latched position, it can be securely locked in place by rotatable primary and secondary lock members 458, 460. The secondary lock 460 is mounted on a shaft having first and second opposite ends 462, 464. The ends 462, 464 extend outwardly of the housing 438 so that the 'secondary locks 460 of adjacent actuator units 234 may be ganged together for operation in unison. The connection of shafts 462, 464 between adjacent units 438 will be discussed in more detail below.

The primary lock 458 also rotates on a shaft having one end 466 which projects outwardly of the housing 438. An external inhibit lever 468 is mounted onto this end 466 of the shaft. The design and function of this inhibit lever 468 will be also described separately below.

Both the primary and secondary lock members 458, 460 are shaped such that rotation to a first position mechanically blocks retraction of the latch pin 20 into the housing 438 and rotation to another position will permit retraction of the latch pin 20.

As can be seen most clearly in FIG. 35, the primary lock 458 is spaced more closely to the cylinder of the latch pin 20 when in a latched and locked position than is the secondary lock 460. Therefore, the primary lock 458 bears any loads created by settling of the latch pin 20. Under normal circumstances, the secondary lock 460 will be protected from contact with the latch pin 20. It is intended that the secondary lock 460 will always be the first to unlock and the latter to lock. The secondary lock 460 is shaped, as shown, such that it can rotate between locked and unlocked positions without interference or contact with the latch pin 20. Both the primary and secondary lock members 458, 460 are designed to be "self-energizing." Each lock member 458, 460 rotates in a direction such that, if the latch pin 20 migrates out of its lug opening 12 and contacts the lock 458, 460, the lock member 458, 460 will be pushed or rotated in the "locked" direction. As a result, pin migration cannot unlock the primary or secondary lock.

Rotation of the primary lock member 458 in the locked direction is limited by a stop member 470 which is positioned to contact either the base end of the latch pin 20 or an interior surface of the housing 438. The primary lock 458 includes a pair of radially-extending arms 472, 474 which, in preferred form, are enclosed within the housing 438. These arms 472, 474 are preferably in the form of a clevis or similar connection such that another member may be pivotally connected thereto. In preferred form, a single pivot pin 476 extends through both arms 472, 474.

The primary lock member 458 is moved from the locked position (FIG. 35) to the unlocked position (FIG. 36) by a single-acting piston/cylinder unit 478. A cylinder 480 is formed integrally with the housing 438 and a slidable piston 482 is located within the cylinder 480 to define a chamber 484 therein. A rod portion 486 extending from the piston 482 is pivotally connected (at 488) by a linkage 490 to the first arm 472 on the primary lock member 458. Substantially parallel to the piston/cylinder unit 478 is a compression-type spring (not shown) which is pivotally connected to the second arm 474, also by a pivoting linkage 492. Because the piston/cylinder unit 478 is single acting only and, therefore, is used only to move the primary lock member 458 from the locked position to the unlocked position, the aforementioned spring is used to move the primary lock member 458 from the unlocked position to the locked position. In this manner, the primary lock member 458 will remain biased toward the locked position when no hydraulic pressure or power is present.

An important feature of the latch pin 20 is that it cannot be withdrawn from the lugs 10, 16, 6 until the secondary lock member 460 is first moved to its unlocked position and then the primary lock member 458 is moved to its unlocked position. FIGS. 37 and 38 illustrate this feature schematically. FIG. 37 shows the actuator unit 234 in a latched and locked condition. FIG. 38 shows the actuator unit 234 in an unlocked and unlatching condition.

As will be described separately below with respect to the operational sequence of the latch pin actuator 234, an external secondary lock inhibit cam 494 prevents movement, by interference with an external primary lock inhibit cam 468, of the primary lock member 458 from a locked position to an unlocked position. After the secondary lock member 460 and inhibit cam 494 have been moved to an unlocked position, the primary lock 458 is mechanically free to move and the actuator 234 is commanded to unlatch by providing hydraulic pressure to an unlatch (UNLCH) supply line and connecting the hydraulic latch pressure (LCH) line to return, as described further below.

UNLCH hydraulic pressure is not initially provided to conduit 456. Instead, UNLCH hydraulic pressure is delivered to chamber 484 of the previously-described piston/cylinder unit 478 causing the piston 482 to shift within the cylinder 480 and, thereby, overcoming the spring biasing and rotating the primary lock member 458 from the locked position to an unlocked position. A spool valve 496 is integrally formed with the rod portion 486 of the piston head 482. After the primary lock member 458 has been fully shifted to its unlocked position, the valve 496 ports UNLCH hydraulic pressure to the second chamber 448 of the latch pin cylinder 20 through conduit 456. As shown in FIGS. 35 and 36, an internal passageway 498 formed in the rod portion 486 connects the chamber 484 with a port 500 in the cylinder wall 480 after the piston 482 has been fully shifted. This port 500 is operatively connected to convey hydraulic pressure to conduit 456.

The combined functions of actuating the primary lock member 458 and the sequence valve 496 allow the primary lock and latch pin 20 both to be operated by a common pair of hydraulic lines. This provides the added safety benefit of making it physically impossible to hydraulically actuate the latch pin 20 prior to actuation of the primary lock 458. This could prevent damage to the lock members 458, 460 and will warn the flight crew of a hydraulic malfunction relating to the primary lock 458. Additionally, the using the LCH and UNLCH hydraulic supply lines to actuate the primary lock eliminates the need for an additional hydraulic circuit which would have to be extended along the entire length of the stationary wing portion 4 and into an already cramped location within the fairing 432.

As previously described, movement of the latch pin 20 into the latched position is achieved by providing LCH hydraulic pressure to the first chamber 446 of the latch pin 20 and connecting the UNLCH line to return. Bypass of the valve 496 is then provided through a check valve 502. Referring now to FIG. 39, the structure and operation of the secondary lock member 460 will be described. The secondary lock 460 has a latch pin-blocking portion 504 which, when the secondary lock member 460 is in a locked position, extends transversely across the latch pin's 20 linear line of travel. The secondary lock member 460 includes a stop portion 505 which is positioned to bear against the latch pin 20 when the secondary lock 460 is biased toward the locked position. The secondary lock member 460 is normally biased toward the locked position by a torsion spring 507 mounted at the second end 464 of the secondary lock shaft. A separate torsion spring 507 is provided for each actuator unit 234 even though, because of the ganged-together relationship of the secondary lock members 460, each secondary lock member 460 will not operate independently.

The secondary lock member 460 also has an arcuate recess 506 which is sized and shaped to generally correspond to the outer curvature of the latch pin 20. Rotation of the secondary lock member 460 to an unlocked position correspondingly rotates the recess 506 into a position to allow retraction of the latch pin 20. In preferred form, the axis of rotation of the secondary lock member 460 intersects the arc defined by recess 506, as shown in FIG. 39.

As illustrated in FIG. 34, each actuator unit 234 is installable and removable as a separate unit. This feature facilitates maintenance in the event that replacement or repair of a single unit 234 is required. However, when all of the actuator units 234 are installed properly, all of the secondary lock members 460 are drivingly interconnected in a ganged-together relationship. This is also shown in FIGS. 19 and 20. Connection of secondary lock members 460 between adjacent actuator units 234 is achieved by connection of the outwardly-extending shaft ends 462, 464 of adjacent units 234. However, because the bank of units is slightly curved due to the airfoil shape of the wing 4, 14, connection must be made by a joint which provides adequate swivel movement.

Figure 42:
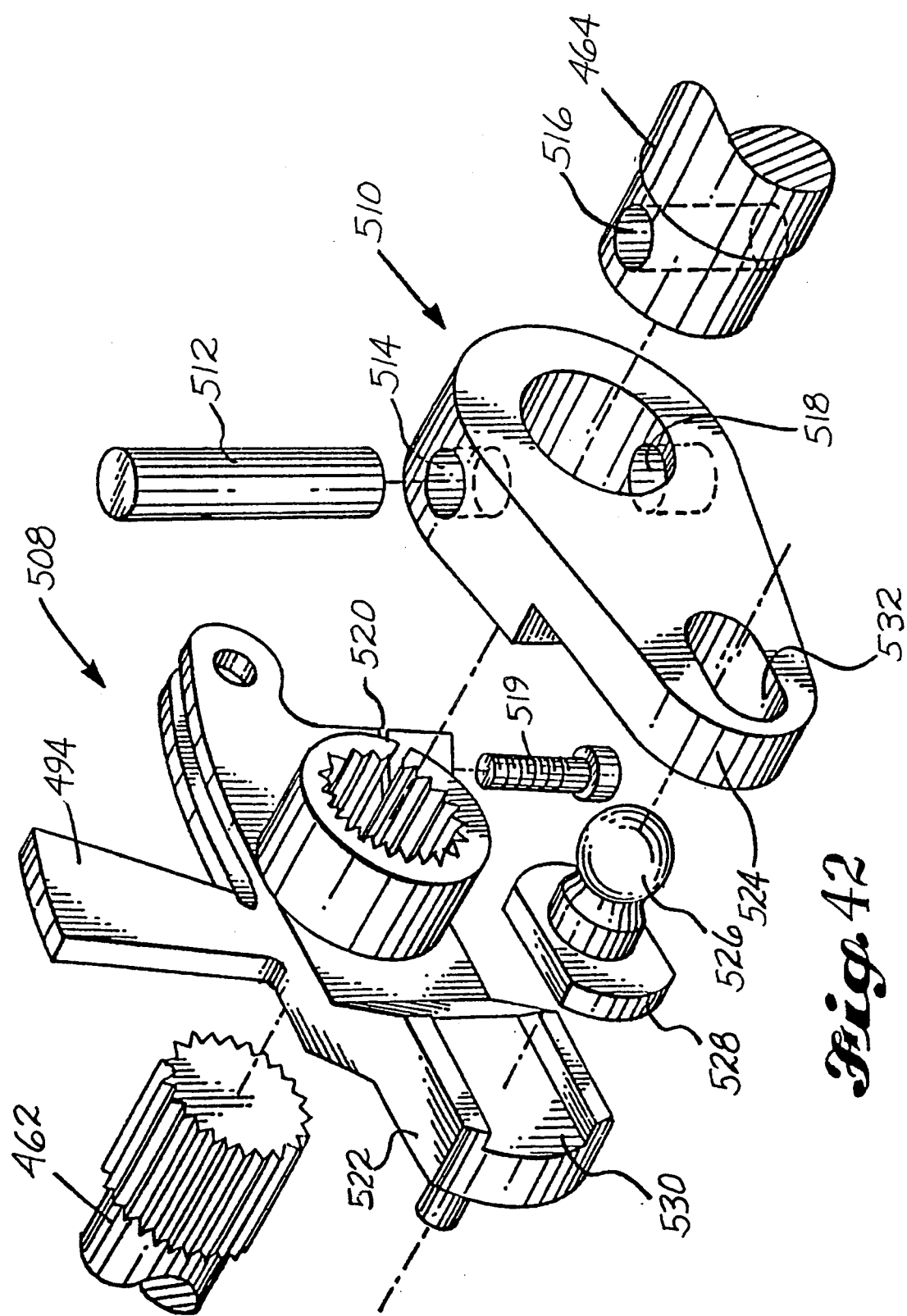
FIG. 42 is an exploded view of the ball stud connection shown in FIG. 41.

A preferred form of this connection is shown in FIGS. 41 and 42. First and second connectors 508, 510 are connected to outward ends of the secondary lock member's shaft ends 462, 464, respectively. A spline fit attaches connector 508 to end shaft 462. An attachment pin 512 extending through aligned openings 514, 516, 518 attaches the connector 510 to shaft end 464. Frictional fit between the connector member 508 and the shaft end 462 is enhanced by providing a spline connection in which a conventional screw 519 is used to close or tighten a split portion 520 of the connector 508.

In order to facilitate swivel connection between the shaft ends 462, 464, each connector 508, 510 includes a flange portion 522, 524 which is radially offset from the axis of its respective shaft end 462, 464. A ball stud or ball and socket-type connection is made between the flange portions 522, 524 of adjacent connector members 508, 510. A ball stud 526 is mounted on one connector member 508 and includes a base 528 which is sized and shaped to fit within a receiving groove 530 on the flange portion 522. This type of connection causes the ball stud 526 to be rotatably fixed relative to the shaft end 462, but allows some radial adjustment relative thereto. The ball stud 526 is positioned to engage within a socket-type opening 532 in the flange portion 524 of the other connector member 510.

Rotation of the ganged-together secondary lock members 460 is provided by the independent hydraulic PDU 236 described above. This results in operation of the secondary lock member 460 that is fully independent of operation of the primary lock members 458. As described above and as shown in FIGS. 20 and 34, the PDU 236 is preferably positioned centrally between two banks of latch pin actuator units 234.

Another feature of the latch pin actuator assembly 234 is an inhibit post 534, the position of which is shifted by end of stroke unlatching movement of the latch pin 20. The inhibit post 534 inhibits or controls the "unlocked" position of the ganged-together secondary lock members 460. Referring to FIG. 40, the inhibit post 534 is biased by a spring 536 into a first or inhibiting position. The inhibit post 534 is axially slidable on a central guide member 538 within a cylindrical guide opening 540 formed in the housing 438. One end 542 of the inhibit post 534 is positioned to cause interfering contact with a cam portion or stop 544 on the secondary lock member 460. As previously described, the inhibit post 534 is spring biased into this first position. Rotation of the secondary lock member 460 from a locked position to an unlocked position while the latch pin 20 is in a latched position is limited by contact of the stop portion 544 with the end 542 of the inhibit post 534.

The inhibit post 534 includes a flange portion 546 at an opposite end which is positioned to be contacted by and axially displaced by retraction of the latch pin 20. This relationship is illustrated in FIG. 39. The flange 546 is positioned so that the inhibit post 534 is displaced only as the latch pin 20 is reaching its fully-unlatched position. When the inhibit post 534 is displaced, the first end 542 of the inhibit post 534 is shifted away from its inhibiting position in which the stop member 544 is blocked. At this time, the secondary lock member 460, which is still being biased toward an unlocked position by the PDU 236, is allowed to rotate approximately another 30° to 35°. As described above and as shown in FIG. 28, this further rotation activates switch 346 in the PDU 236 to signal to the control system that all latch pins 20 are fully unlatched. Because the secondary lock members 460 are ganged together, the further rotation is not permitted until the inhibit post 534 in every actuator unit 234 of the gang has been displaced. Displacement of all the inhibit posts 534 allows the simultaneous rotation of all secondary lock members 460 from an "unlocked" position to an "unlocked and unlatched" position.

Another feature of the latch pin actuator 234 is that it is self-lubricating. A heavy grease is used to lubricate the exterior surface of the latch pin 20 as it extends into and out of housing 438 and through the openings 8, 12, 18 in the lugs 6, 10, 16. The actuator 234 has a self-actuating grease delivery system to ensure proper lubrication of the latch pins 20 without the need for frequent time consuming maintenance procedures.

Still referring to FIG. 40, a variable volume grease reservoir 548 is provided within the housing 438. A plunger 550 is provided within the cylindrical reservoir 548 and is biased in one axial direction by a pair of springs 552, 554. The reservoir 548 may be pressure filled with an appropriate type and amount of grease lubricant, displacing the plunger 550 against the springs 552, 554. The force of the springs 552, 554 causes the grease placed in the reservoir 548 to remain under pressure. An indicator post 556 extends axially outwardly from the plunger 550 such that a portion is visibly exposed beyond the confines of the housing 438. As grease in the reservoir 548 is used, the plunger 550, and in turn the indicator post 556, are moved. When the indicator post 556 is no longer visible outside the housing 438, this indicates to maintenance personnel that the reservoir 548 needs to be refilled.

A first conduit 558 connects the grease reservoir 548 to an annular chamber 560 adjacent the inhibit post 534. A second conduit 562 operatively extends between another annular chamber 564 surrounding the inhibit post 534 and an annular lubricant-delivering chamber 566 which encircles the latch pin 20. An internal passageway 568 in the inhibit post 534 operates to connect conduit 558 and chamber 560 to chamber 564 and conduit 562 each time it is displaced by retraction of the latch pin 20. A predetermined amount of grease in the reservoir 548 is delivered under pressure to the annular chamber 566 during each stroke of the latch pin 20. In this manner, it is assured that each latch pin 20 is properly lubricated and maintenance by ground crews is significantly reduced.

Operation of the latch pin actuator 234 during the fold and spread sequences is as follows.

FIGS. 45A–45F illustrate the specific steps in the fold sequence. Each of these figures schematically illustrates the position and condition of the latch pin 20, primary lock 458, secondary lock 460, external lock inhibit cams 468, 494 and latch pin inhibit post 534. Although only one latch pin actuator 234 of the in-line bank of actuators is shown, it is to be understood that each latch pin actuator 234 would be identically operated and controlled.

FIG. 45A schematically shows the actuator 234 in a latched and locked condition and with no hydraulic pressure applied to the unit. This is also illustrated in FIG. 43. In this condition, the wing tip 14 is spread for take-off, flight, or landing. Absent applied hydraulic force, the latch pin 20 may have settled slightly and be resting on the primary lock 458.

After the system has been armed, as described below under the "Control and Monitoring" section of this description, the fold sequence is initiated. Referring to FIG. 45B, latch pressure (LCH) is applied to the latch pin 20, biasing the latch pin 20 in the direction shown by the arrow. In this manner, a latch pin 20 which may have settled onto or against the primary lock 458 is moved away from the lock 458 to unload the lock 458. According to a feature of the invention, latch hydraulic pressure (LCH) must be applied prior to initiation of the unlock and unlatch sequence.

Referring to FIG. 45C, the secondary lock 460 is rotated approximately 135° by the PDU 236 into an unlocked position. In this position, an internal stop 544 on the secondary lock 460 contacts the latch pin inhibit post 534. The control system senses, via the PDU 236, that the secondary locks 460 are unlocked, but that the latch pin 20 is still in a latched condition.

Referring to FIG. 45D, unlatch hydraulic pressure (UNLCH) is then sent to the latch pin actuator 234 first causing the primary lock 458 to be rotated approximately 1204 into an unlocked position. This is also illustrated in FIG. 44. As previously described, actuation of the primary lock 458 simultaneously opens a control valve 496 which ports hydraulic pressure into the rod side chamber 448 of the hydraulic cylinder latch pin 20, causing it to retract into an unlatched position. Upon full retraction, the base end of the latch pin contacts the base flange 546 of the latch pin inhibit post 534, shifting it axially a distance sufficient to allow the stop 544 on the secondary lock 460 to rotate approximately 30° further. This further rotation of the secondary locks 460 activates the PDU switch 346 to indicate to the system that every latch pin 20 has been fully retracted.

Referring to FIG. 45E, the fold actuator 634 is then commanded to fold. When fold has been accomplished, and the fold actuator 634 has locked in its folded position, the PDU 236 is commanded to reverse toward a locked position. The external secondary lock inhibit cam 494 is biased against the external primary lock inhibit cam 468, limiting rotation of the secondary lock 460 to approximately 44°. Referring to FIG. 45F, when all hydraulic power is removed from the latch pin actuator 234 and the PDU 236, the primary and secondary locks 458, 460 remain spring biased toward a locked position. The primary lock 458 is allowed to move approximately 13.25° from its fully-unlocked position. This is important because, after some time in an idle condition, the latch pins 20 may tend to migrate toward a latched position.

FIGS. 46A-46F illustrate schematically the position and condition of the latch pin 20, primary lock 458, secondary lock 460, external lock inhibit cams 468, 494 and latch pin inhibit post 534 during the spread sequence.

FIG. 46A shows the actuator in a disarmed state. Both the primary lock 458 and the secondary lock 460 are spring biased toward a locked position. The primary lock 458 is limited in rotation by contact with the latch pin 20. Rotation of the secondary lock 460 is limited by contact between its inhibit cam 494 and primary lock inhibit cam 468. Referring to FIG. 46B, once the system is armed, the PDU 236 is initially commanded to bias the secondary locks 460 toward a locked position. Unlatch hydraulic pressure (UNLCH) is sent to the latch pin actuator 234 causing any latch pins 20 which may have migrated toward a latched position during the disarmed state to be fully retracted to the unlatched position and causing the primary locks 458 to be hydraulically biased toward an unlocked position.

Referring to FIG. 46C, the PDU 236 is commanded to rotate the secondary locks 460 toward the unlocked position. When all latch pins 20 have been fully retracted, each displacing an inhibit post 534, the secondary lock 460 moves to the "fully unlocked and unlatched" position. Then, wing tip spread is commanded as described below. The fold actuators 634 then move the wing tips 14 to the spread position. Referring to FIG. 46D, during the spreading movement of the wing tips 14, the PDU 236 is commanded to bias the secondary locks 460 toward the locked position. The external lock inhibit cams 468, 494 of the primary and secondary locks 458, 460 limit movement of the secondary locks 460. The primary lock 458 drags against the outer surface of the latch pin 20.

Referring to FIG. 46E, when the wing tip 14 is fully spread, hydraulic pressure is applied to the cylinder end chamber 446 of the hydraulic cylinder latch pin 20 causing it to move through the lug openings 18, 12 into a latched position. As the latch pin 20 clears the primary lock 458, the primary lock 458 is spring biased to rotate into the locked position. The lock inhibit cam 468 of the primary lock 458 is allowed to roll along the secondary lock inhibit cam 494. This feature allows detection of any primary lock spring failure. Rotation of the secondary locks 460 is prevented by the failure of any one primary lock 458 to move to the locked position. Detection of a primary lock spring failure is important because the spring holds the primary lock 458 in place during flight.

Referring to FIG. 46F, the secondary lock 460 is then moved by the PDU 236 into a locked position. Premature rotation of the secondary lock 460 is prevented by the lock inhibit cam 494. All primary locks 458 must be in place to allow the ganged-together secondary locks 460 to rotate into position. Full rotation of the ganged-together secondary locks 460 activates the follow-up switch 820 described below to provide the system with an indication that every latch pin 20 is fully latched, every primary lock 458 has been spring biased into its looked position, and every secondary lock 460 is in its locked position. When these conditions have been achieved, the external lock inhibit cam 494 of the secondary lock 460 prevents unlocking movement of the primary lock 458.

Fold Actuator

Referring to FIGS. 47 and 48, the outboard wing portions 14 are moved between spread and folded positions, relative to the inboard wing portions 4, by hydraulic actuators 634, one for each wing. In preferred form, each actuator 634 is a tandem actuator comprising a fixed portion and a movable portion. In the disclosed embodiment, the fixed portion 636 is an elongated cylinder housing. The movable portion 638 is an elongated piston rod and, as will be hereinafter described, two spaced apart piston heads within the cylinder housing 636. In a conventional manner, the outer end of piston rod 638 is pivotally connected at 640 to a lever 642 that is connected to outboard wing portion 14. At the opposite end of the actuator 634, the cylinder housing 636 is pivotally connected at 643 to a frame portion 644 of the inboard wing portion 4. As shown by FIG. 47, retraction of the piston 638 into the cylinder housing 636 pulls on the lever 642 and swings the outboard wing portion 14 about the axis defined by the hinge 24. This swings the outboard wing portion 14 downwardly from its folded position into its spread position (FIG. 47). Extension of piston rod 638 out from cylinder housing 636 pushes on the lever 642 and swings the outboard wing portion 14 upwardly, about the hinge axis. In this manner the outboard wing portion 14 is moved from its spread position (FIG. 47) up into its folded position (FIG. 48).

Figure 49:
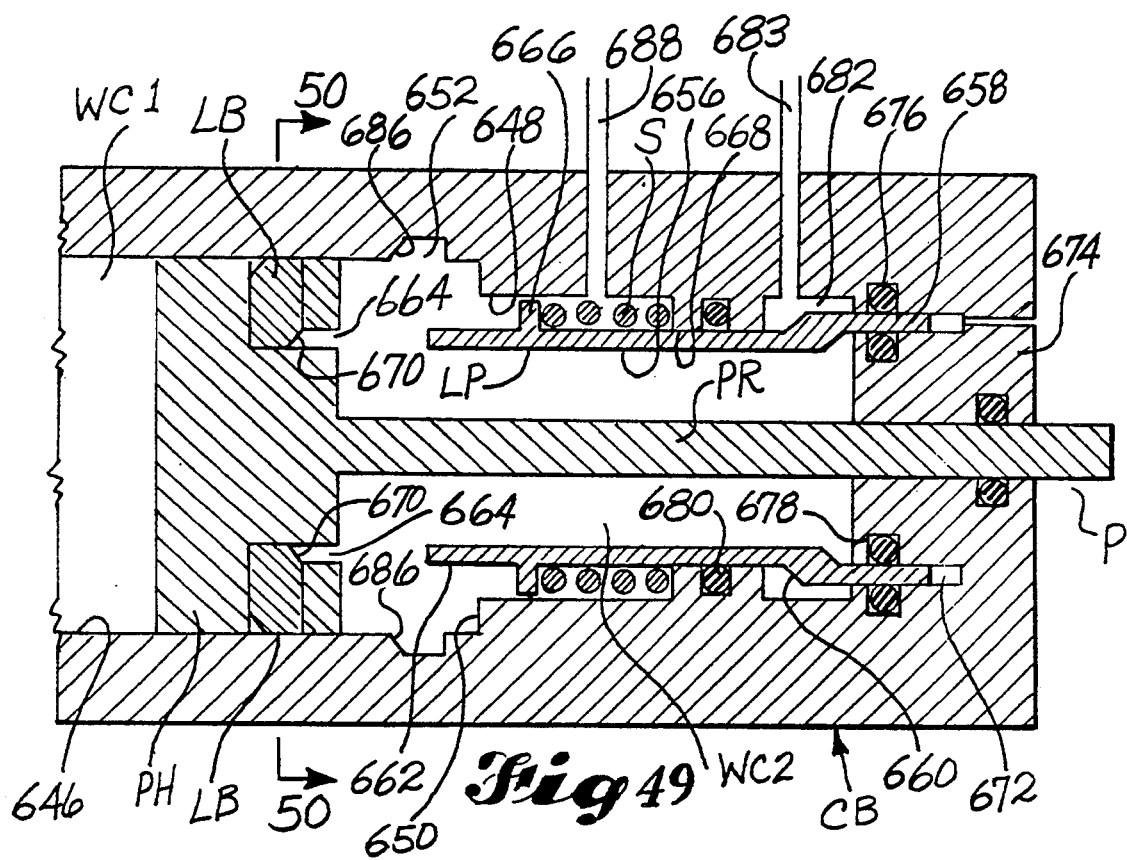
FIG. 49 is a diagrammatic longitudinal sectional view taken substantially along line 49—49 of FIG. 50, showing the fold/extend actuator in an unlocked position.
Figure 50:
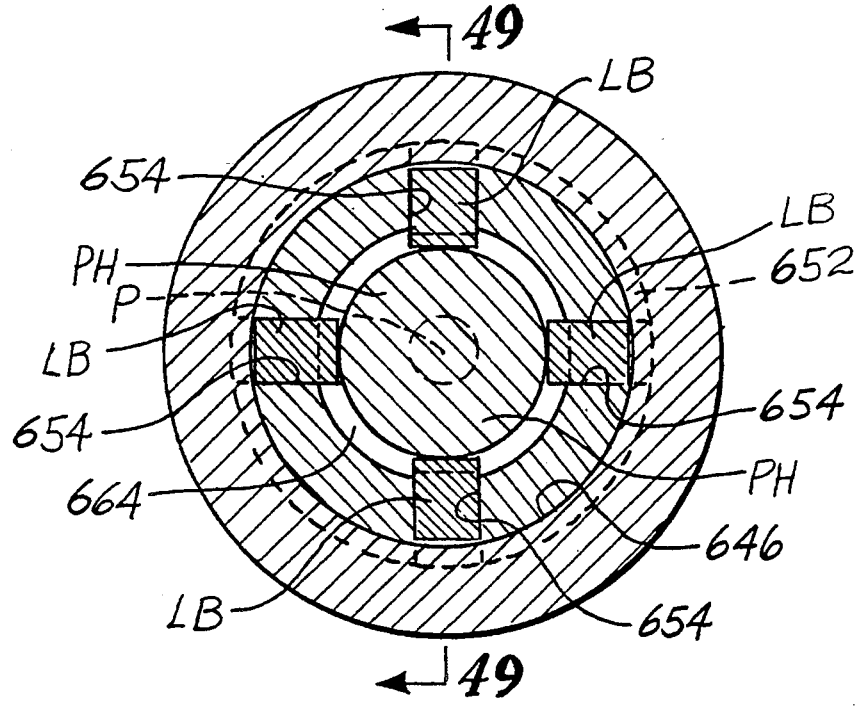
FIG. 50 is a cross-sectional view taken substantially along line 50—50 of FIG. 49, such view by solid line showing lock bolts in a retracted position, and by broken line showing the lock bolts in an extended position.

FIGS. 49-52 are partially schematic structural diagrams of an actuator which includes a lock mechanism. In these figures, the actuator is shown to include a cylinder body CB and a piston P. Piston P includes an elongated piston rod PR and a piston head PH. Cylinder body CB is elongated and includes an interior space. The piston head PH divides the interior space into two working chambers WC1, WC2. Cylinder body CB is axially elongated. FIGS. 49 and 50 show an end portion of the cylinder body CB. The opposite end portion, which includes most of working chamber WC1, is not shown. Cylinder body CB includes a cylindrical sidewall 646 and a reduced diameter end portion 648. A radial shoulder 650 is formed where sidewall 646 meets reduced diameter portion 648. An annular lock-bolt cavity 652 is formed in the sidewall 646, closely adjacent shoulder 650. Piston head PH is provided with four circumferentially spaced apart lock bolts LB. The number of lock bolts LB may be varied. It is preferred that the lock bolts LB be evenly spaced about "the circumference of the cylinder body CB.

Herein the term "lock bolt" is used in the same way that the term is used in lock technology. That is, it is a metal bar or rod in the mechanism of a lock. As shown by FIGS. 49-52, each lock bolt LB is located within a radial socket 654 in the piston head PH. When the lock bolts LB are retracted into the sockets 654, the outer ends of the lock bolts LB are at or slightly inward of the sidewall 646 (FIGS. 49 and 50). As shown by FIG. 51, when piston head PH is against shoulder 650, i.e. the actuator is in its fully extended "lock" position, the lock bolts LB are in radial alignment with the lock bolt cavity 652 and are extendable radially outwardly into the cavity 652.

The actuator's releasable lock includes a locking piston LP. In preferred form, lock piston LP is tubular and includes a main body portion 656, an enlarged diameter end portion 658, and a piston face 660. Lock piston LP also includes an annular end portion 662 which is herein termed a "bolt block." Piston head PH includes an annular passageway 664 sized to receive the bolt block 662 (FIG. 51). Bolt block 662 and passageway 664 confront each other (FIG. 49).

In preferred form, locking piston LP further includes a radial abutment 666, and cylinder body CB includes a radial abutment 668. A compression spring S is located between the abutments 666, 668. Spring S normally biases the locking piston LP into the position shown by FIG. 51. When the locking piston LP is in the position shown by FIG. 51, and the piston head PH is moved towards the shoulder 650, the bolt block 662 moves relatively into the passageway 664. Each lock bolt LB includes an extend cam 670 that is in alignment with passageway 664 when the lock bolt LB is retracted. Movement of piston head PH toward shoulder 650 also moves lock bolts LB into radial alignment with the lock bolt cavity 652. The bolt block 662 is moved relatively into passageway 664 and eventually contacts the extend cams 670. The contact between the bolt block 662 and the extend cams 670 exerts a radially outward component of force on the lock bolts LB, "camming" them radially outwardly into the bolt cavity 652. Additional movement of the piston head PH toward the shoulder 650 will result in a relative movement of the bolt block 662 into a position radially inwardly of the lock bolts LB. When piston head PH is against shoulder 650, the bolt block 662 is radially inward of the lock bolts LB (FIG. 51). In this position, the bolt block 662 prevents a radially inward movement of the lock bolts LB, out from engagement with the lock bolt cavity 652. So long as the bolt block 662 is positioned radially inwardly of the lock bolts LB, the piston head PH, and thus the piston P, is mechanically locked against movement relative to the cylinder body CB.

The end portion 658 of locking piston LP fits into an annular passageway 672 that is formed in chamber endwall 674. Chamber endwall 674 may be the closed end of the cylinder body CB or may be a divider wall intermediate the length of the cylinder body CB. Annular passageway 672 confronts end portion 658. End portion 658 extends between two O-ring seals 676, 678. The O-ring seals 676,678 seal against fluid leakage from working chamber WC2 out through the annular passageway 672. Spring abutment 668 is a radial wall which includes a central passageway 673 through which the main body portion 656 of locking piston LP extends. This wall includes an annular groove. There is an O-ring 680 within the groove which seals between the sidewall of passageway 673 and the outer surface of wall 656.

As shown by FIGS. 49 and 51, an annular chamber 682 is formed in the cylinder body CB axially between O-ring seal 680 and O-ring seal 676,680. This chamber 682 is located radially outwardly of the portion of locking piston LP which includes piston face 660. A fluid pressure passageway 683 is provided to deliver hydraulic pressure into chamber 682. As previously stated, spring S normally biases the locking piston LP towards the piston head PH. As will be appreciated, hydraulic pressure within chamber 682 acts on piston face 660 to produce an endwise force on the locking piston LP wanting to move it against the force of spring S. In response, locking piston LP moves into the position shown by FIG. 49.

The hydraulic pressure is introduced into chamber 682 when the actuator and the lock mechanism are in the position shown by FIG. 51. The endwise movement (to the right as pictured), caused by the hydraulic pressure acting on piston face 660, moves the bolt-block 662 out from its blocking position, viz. a position radially inwardly of the lock bolts LB. Once the bolt block 662 is out from a position radially inward of the lock bolts LB, the upper lock bolts LB may fall by gravity into their retracted positions. The lower lock bolts LB will be held by gravity into the lock bolt cavity 652. However, these lock bolts LB are freed for radial inward movement as there is no longer anything positioned to block or prevent their radially inward movement.

Referring to FIGS. 49-54, each lock bolt LB has both an extend cam 670 and a retract cam 684. As previously stated, the extend cams 670 coact with the end surface of bolt block 662, to cam the lock bolts LB radially outwardly in response to a relative movement of the bolt blocks 662 against the cam surfaces 670. Retract cams 684 coact with cam surface 686, which is a side surface of lock bolt cavity 652, to cam the lock bolts LB radially inwardly in response to an axial movement of piston head PH, relative to the cylinder body CB, away from the "lock" position.

As previously stated, spring S normally biases the locking piston LP into the position shown by FIG. 51. Movement of piston head PH against shoulder 650, moves the bolt block 662 relatively into bolt block passageway 664. As best shown by FIG. 53, during this movement there is contact between bolt block 662, which is stationary, and the extend cam surfaces 670 on the lock bolts LB. Piston head PH is moving relative to bolt block 662, in the direction indicated by the arrow in FIG. 53. The lock bolts LB are carried by and move with the piston head PH. This relative movement, and the contact which occurs between the end surface of bolt block 662 and the cam surfaces 670, exert a radially outwardly directed component of force on the lock bolts LB, camming or forcing them radially outwardly. Such movement of the lock bolts LB is permitted because the camming contact occurs just as the outer end portions of the lock bolts LB come into register with the lock bolt cavity 652. This is also shown in FIG. 53. As the piston head PH continues towards the shoulder 650, the continuous contact between the bolt block 662 and the cam surfaces 670, and the continuous movement of the lock bolts LB, in the axial direction, causes the radially outward movement of the lock bolts LB to continue until the bolt block 662 enters between the respective inner radial ends of the lock bolts LB and the lock bolt sockets 654. When the piston head PH is against the shoulder 650, the bolt block 662 is positioned radially inwardly of the lock bolts LB. This position is shown in FIGS. 51 and 52. When the bolt block 662 is in this position, it fills the radial space between the radial inner ends of the lock bolts LB and the lock bolt sockets 654. The lock bolts LB are thus "blocked" against retraction out from the lock bolt cavity 652. The engagement of the lock bolts LB in the lock bolt cavity mechanically "locks" the piston head PH to the cylinder body CB. Until this mechanical lock is released, the piston P will not move relative to the cylinder body CB, even if fluid pressure is removed from both working chambers WC1, WC2.

In FIGS. 49 and 51, the passageway for delivering hydraulic fluid pressure into working chamber WC2 is shown schematically at 688. A fluid pressure delivery passageway for working chamber WC1 is not illustrated. However, it may enter into the working chamber WC1 through the piston P or through a sidewall portion of the cylinder body CB, at a location to the left of FIGS. 49 and 51.

Referring to FIG. 51, let it be assumed that the actuator is in this position and it is desired to release or unlock the lock mechanism. Firstly, the pressure within working chamber WC1 is increased for the purpose of moving and holding the piston head PH tight against shoulder 650. The lock bolts LB, the lock bolt cavity 652 and the lock bolt sockets 654 are positioned and dimensioned so that when the piston head PH is tight against shoulder 650, the lock bolts LB carry no load, axially of the actuator. In this position, the lock bolts LB can be moved radially without having to overcome friction forces, either between surfaces of the lock bolts LB and the lock bolt cavity 652, or surfaces of the lock bolts LB and the lock bolt sockets 654. Next, while the piston head PH is held tight against shoulder 650, by fluid pressure within working chamber WC1, hydraulic pressure is introduced through passageway 683 into chamber 682. As previously described, this pressure acts on piston surface 660 and moves the locking piston LP to the right (as illustrated), thereby withdrawing the bolt block 662 from its position radially inward of the lock bolts LB. FIG. 54 shows the bolt block 662 removed from the region that is radially between the radial inner end of the lock bolts LB and the radial inner ends of the lock bolt cavities 654. This frees the lock bolts LB for a radial inward movement. If the actuator is in a generally horizontal position, the upper lock bolts LB may, under the force of gravity, drop radially inwardly into their lock bolt cavities 654. Or, they may stick and have to be cammed inwardly, in a manner to be described. The force of gravity will maintain the lower lock bolts LB extended until they are forced radially inwardly.

Following retraction of the bolt block 662, the hydraulic pressure is released from working chamber WC1 and introduced into working chamber WC2. As will be appreciated, a higher pressure in working chamber WC2 than in working chamber WC1 will make the piston P and piston head PH want to move to the left (as illustrated). Owing to the presence of cam surfaces 684, 686, this movement is not prevented by the lock bolts LB. Referring to FIG. 54, as the piston head PH starts to move in the direction indicated by the arrow in this figure, the contact between cam surfaces 684, 686 cams or forces the lock bolts LB radially inwardly into the lock bolt sockets 654. The lock bolts LB bottom out within the lock bolt cavities 654 substantially when the outer end surfaces of the lock bolts LB move radially inwardly clear of side surface 646 of working chamber WC1. Additional introduction of fluid pressure into working chamber WC2, while working chamber WC1 is connected to return, will result in the piston P and piston head PH continuing to move to the left (as illustrated).

FIGS. 55-58 disclose the best mode of the actuator 634 in more detail. The actuator 634 itself is based on conventional design for a tandem actuator. However, the lock mechanism, the piston head, and the internal divider wall are novel. The piston includes two piston heads designated PH1, PH2, respectively. The endwall at the closed end of the cylinder body is designated 696. The cylinder head at the opposite end of the cylinder body CB is designated 698. The divider wall between the two ends of the cylinder body CB is designated 700. There are four working chambers designated 701, 702, 704 and 706. A first inlet/outlet port 708 communicates directly with working chamber 701 and indirectly with working chamber 704 via passageways 710, 712, 714 and 716, formed in the piston rod 638. A second inlet/outlet port 718 is directly connected to working chamber 706 and is indirectly connected to working chamber 702 via passageways 720, 722, 724, 726. A third port 728 provides hydraulic fluid pressure for unlocking the lock mechanism, in a manner which is described below.

For the purposes of illustration, FIG. 56 is limited to the essential components of the lock mechanism that are part of the preferred embodiment. The divider wall 700 shown in FIG. 56 is comparable to the endwall 674 shown in FIGS. 49 and 50 and is an endwall for working chamber 704. Working chambers 704 and 706 are a part of an interior space that is divided into two parts by the piston head PH2. In FIG. 56, an inlet/outlet port 730, for working chamber 706, is shown schematically. An inlet/outlet port 732 for working chamber 704 is also shown schematically. Ports 728, 730, 732 are shown differently and in more detail in FIGS. 55, 57 and 58.

Referring to FIG. 56, divider wall 700 includes a center passageway 734. The wall defining passageway 734 includes an annular groove which receives an O-ring 738, for sealing against fluid leakage between the passageway sidewall and the piston 638. Piston head PH2 includes an annular groove which receives an O-ring 742 to seal against leakage between the piston head PH2 and sidewall 744 of working chamber 706. The locking piston has a first diameter part 748 that is sized to snugly slide along the piston rod 638. It also has a larger diameter second portion 750 which slides on a member 752 that is a part of the divider wall 700. Locking piston part 750 includes an annular groove in which there is situated an O-ring 756. O-ring 756 seals against leakage between the locking piston and member 752. A shoulder is formed where locking piston portion 748 meets locking piston portion 750. This shoulder includes a piston face 660. The region of piston face 660 is surrounded by an annular chamber 682. In the axial direction, on each side of chamber 682, the center wall 700 carries O-rings 766, 768 to seal against leakage out from chamber 682.

Divider wall 700 includes a first spring abutment 770. The locking piston includes a second spring abutment 772. A compression spring S is positioned within working chamber 704 between abutments 770, 772. Spring S normally biases the locking piston toward the lock position of the actuator. Piston head PH2 includes a plurality of radially extending, circumferentially spaced lock bolt sockets 776. A separate lock bolt LB is positioned within each lock bolt cavity 776. An annular lock bolt cavity 652 is formed in the sidewall of cylinder body CB. Lock bolts LB include extend cams 670 and retract cams 684.

Port 728 communicates with a passageway 786 which in turn communicates with an annular chamber 788. Chamber 788 is connected by passageway 790 to working chamber 682.

Referring to FIG. 56, when the actuator is locked, working chamber 682 is connected to return pressure via passageway 790, chamber 788, passageway 786 and port 728. Spring S biases the locking piston toward piston head PH2, and places bolt block 662 in a position radially inward of the lock bolts LB. The lock bolts LB are at their outer ends within lock bolt cavity 652 to lock the piston rod 638 and the piston head PH2 against movement relative to the cylinder body CB. When it is desired to unlock the lock mechanism, fluid pressure is introduced into port 728. This fluid pressure enters into the working chamber 682 and creates an endwise force on the piston surface 660 in a direction opposite the force provided by spring S. The force moves the locking piston to the left (as pictured) and moves bolt block 662 out from a position radially inward of the lock bolts LB. Then, the lock bolts LB are free for radial inward movement in response to the force of gravity or a mechanical force imposed on them. Once the lock mechanism is unlocked, hydraulic pressure is introduced into working chamber 704 via port 732. The pressure acting on piston head PH2 moves the piston head PH2 and the piston rod 638 to the right (as illustrated). The lock bolts LB will not prevent this movement. The retract cams 684 are against cam surface 686 that is an axial sidewall of the lock bolt cavity 652. The cam surfaces 684, 686 coact to force or cam the lock bolts LB radially inwardly in response to axial movement of the piston head PH2. The lock bolts LB will move inwardly until their outer ends clear sidewall 744. Then, the piston head PH2 moves through working chamber 704, with the lock bolts LB fully retracted (FIG. 58).

With respect to FIGS. 49–54, it was stated that, prior to unlocking, fluid pressure is introduced into working chamber WC1 for the purpose of moving the piston head PH tight against the shoulder 650 and unloading the lock bolts LB. Referring to FIGS. 55–58, piston head PH1 is over against cylinder head 698 when the actuator is in its "lock" position. Prior to "unlocking", fluid pressure is increased in working chambers 702 and 706, to pressure load the piston assembly 638, PH1, PH2 to the left (as illustrated). This moves piston head PH1 tight against cylinder head 698 and "unloads" the lock bolts LB. That is, side loads on the lock bolts LB, caused by contact between surfaces 684, 686 are removed. The release of these forces removes friction forces from between the side surfaces of the lock bolts LB and the adjoining side surfaces of the lock bolt sockets 776.

Figure 58:
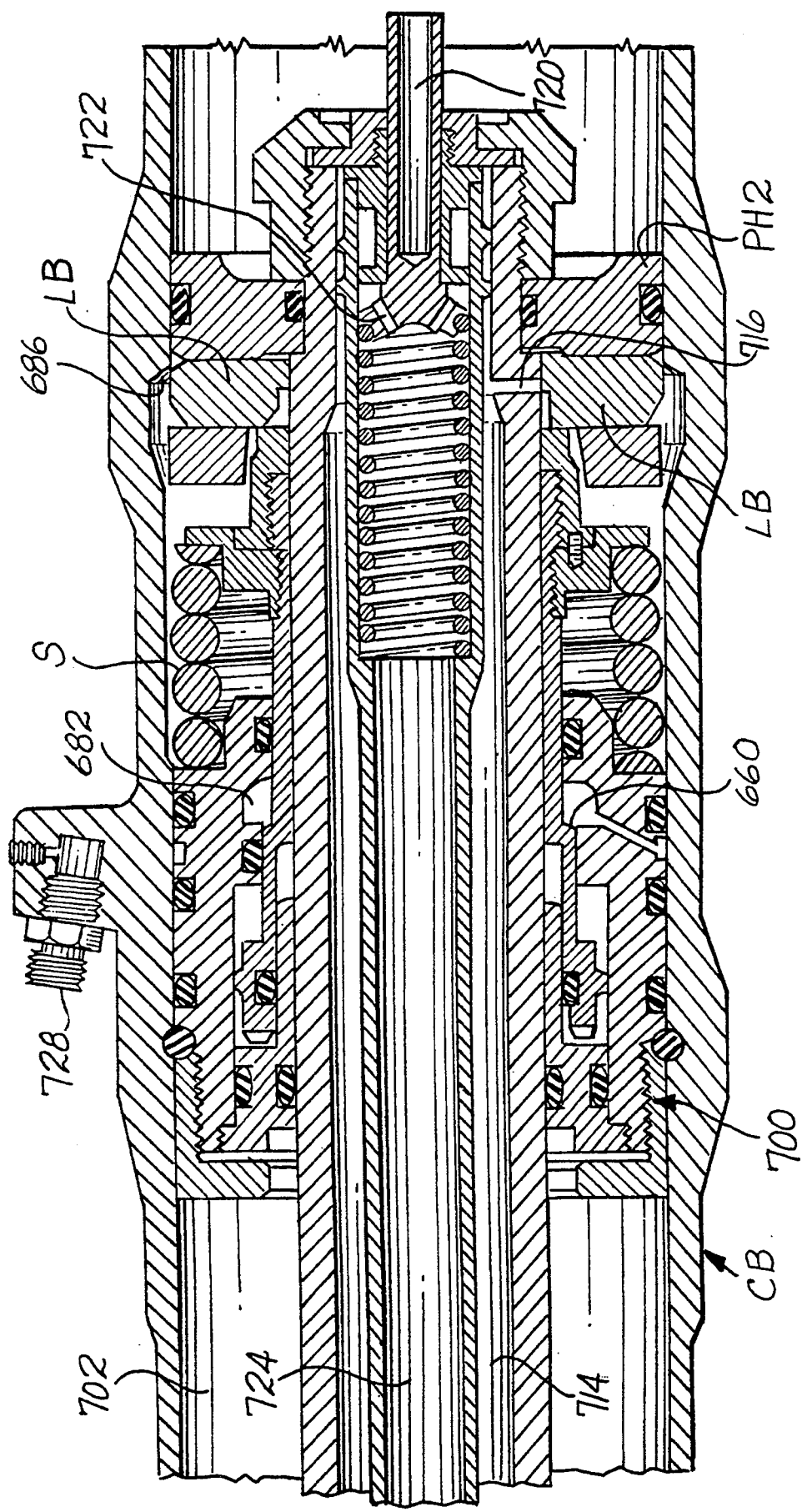
FIG. 58 is a view like FIG. 57, but showing the actuator in an unlocked position.

Referring to FIGS. 57 and 58, the separator wall 700 may be constructed from several parts, as illustrated. These parts may comprise a main body part and an end part and an inner part, both of which are thread connected to the main body part. Seal ring grooves and seal rings may be provided, as illustrated. The locking piston may also be constructed from several parts. In the illustrated embodiment, these include a main body part, a spring retainer part, and an end part. Referring to the right end (as illustrated) of the piston rod 638, piston head PH2 is held in place by a nut and may be provided with a tubular member 720, fittings, and a spring that together form a snubber for cushioning the end of the retraction stroke.

The actuator 634 is preferably also provided with a snubber at the other end, internal rate control valves, and a position sensing switch. A lock signal from the switch is transmitted to the flight deck to indicate a folded and locked position. Switch signals are also used for system sequencing.

The actuator lock locks the wing tip 14 in the folded position independent of hydraulic power. Therefore, the actuator 634 acts as a strut when the wing tip 14 is folded. This ensures that the folded condition will be maintained during ground procedures even though the folding wing-tip system is electrically and hydraulically isolated.

An important feature of the actuator 634 is the use of a dedicated unlock port. This port is designated 683 in FIGS. 49 and 51 and 728 in FIGS. 55 and 56. Another important feature is the operation sequence in which the actuator 634 is unloaded prior to unlocking. This is accomplished by (1) applying extend pressure, (2) applying unlock pressure through the dedicated unlock port 683, 728, (3) removing extend pressure, and (4) applying retract pressure. By applying extend pressure first, even external loads on the actuator are reduced or eliminated during the unlock sequence.

Control and Monitoring

Figure 59:
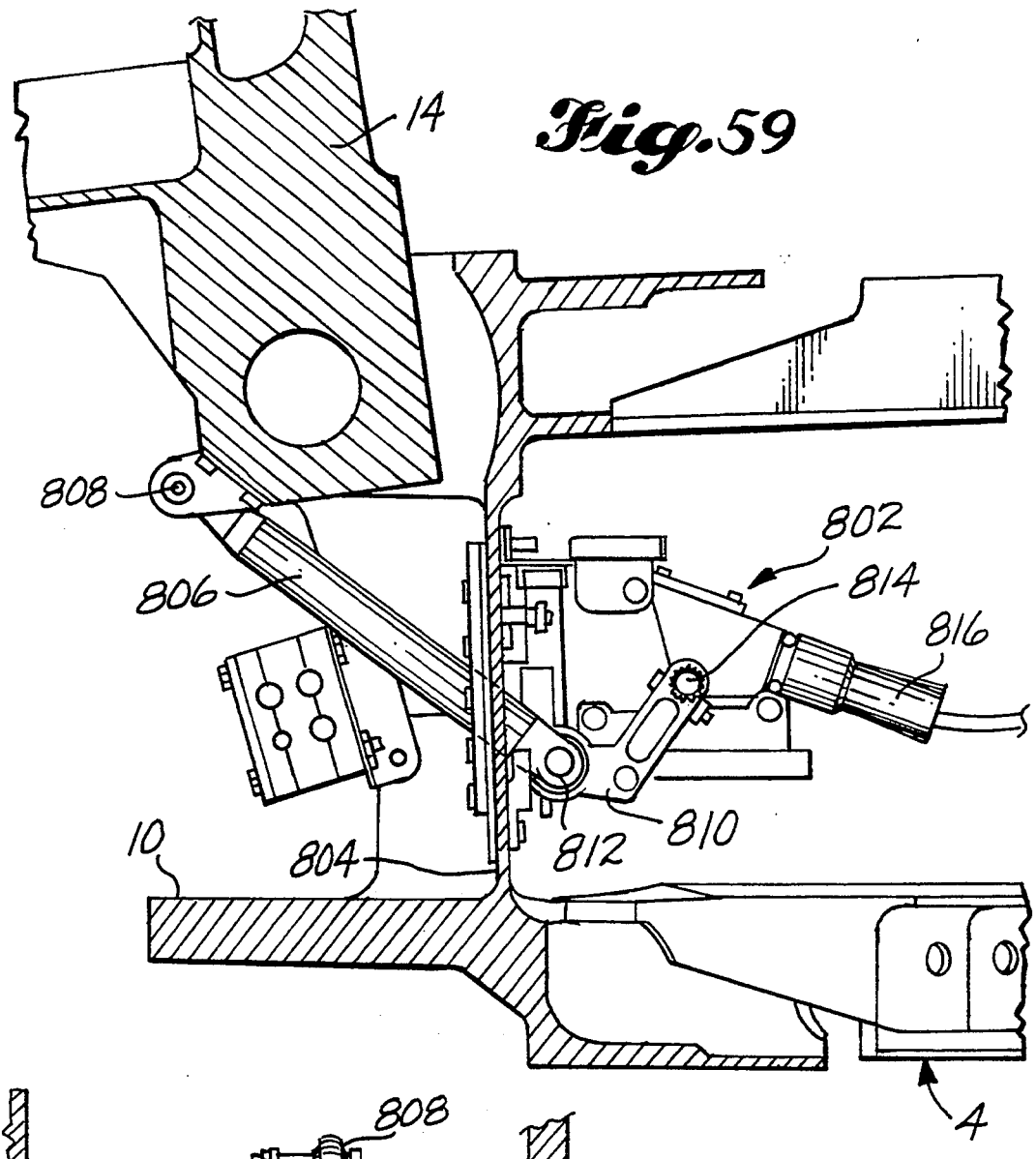
FIG. 59 is a sectional view taken along the hinge line showing the spread switch and the wing tip in a folded position, with parts shown in elevation.
Figure 61:
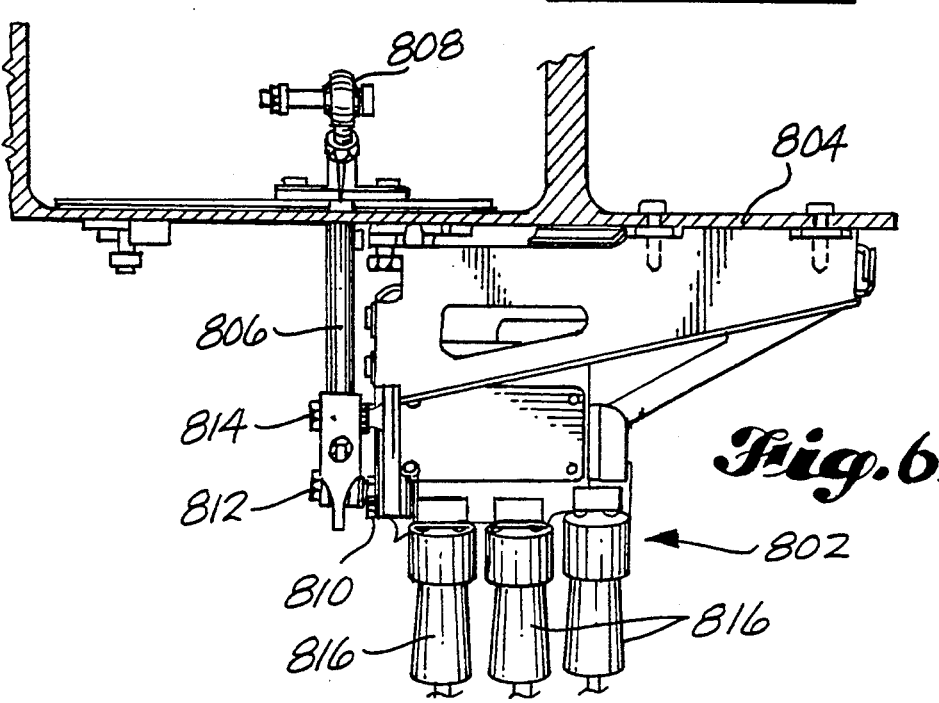
FIG. 61 is a plan view of the apparatus shown in FIG. 60.
Figure 60:
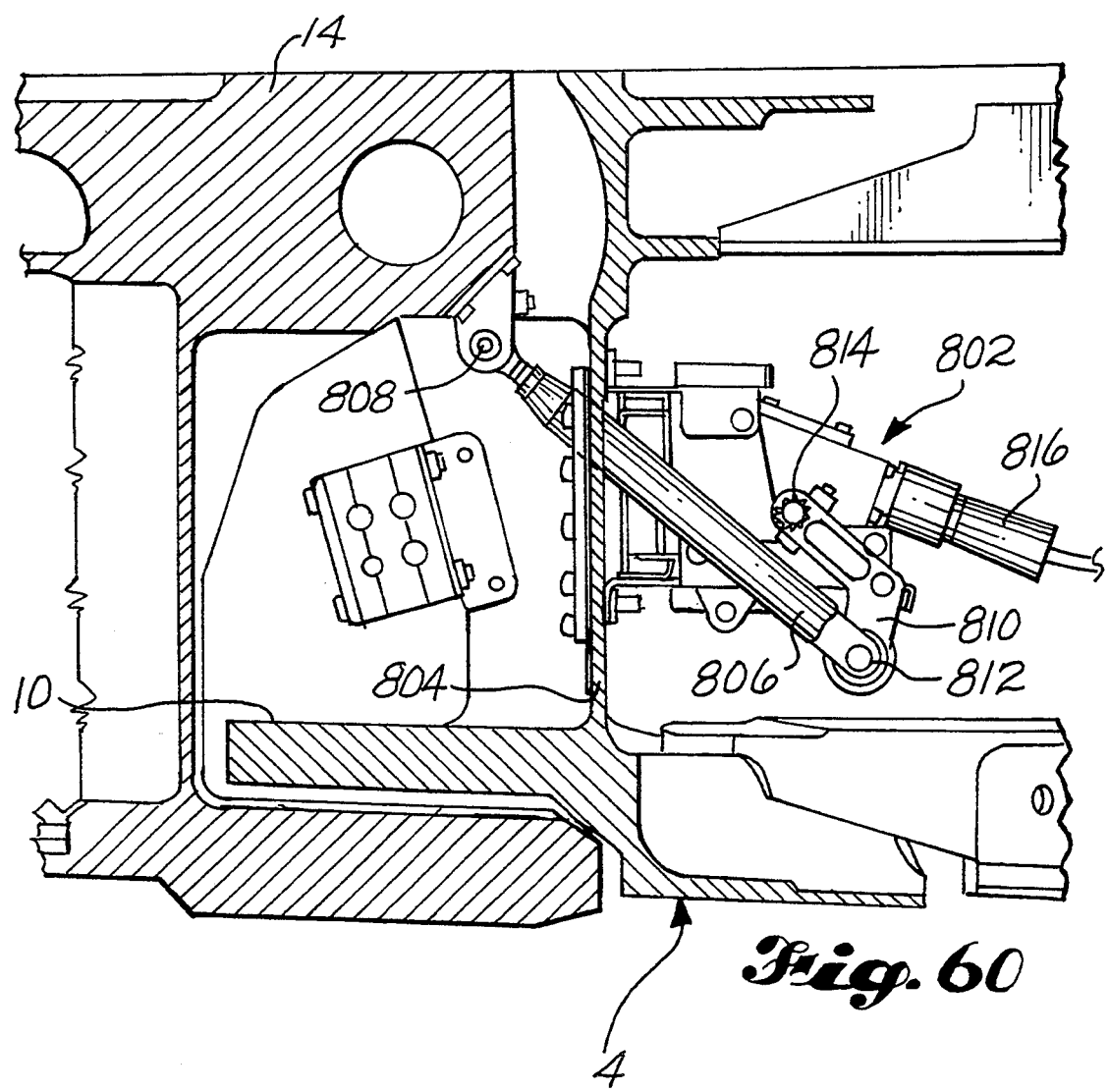
FIG. 60 is like FIG. 59 except that it shows the wing tip in a spread position.
Figure 62:
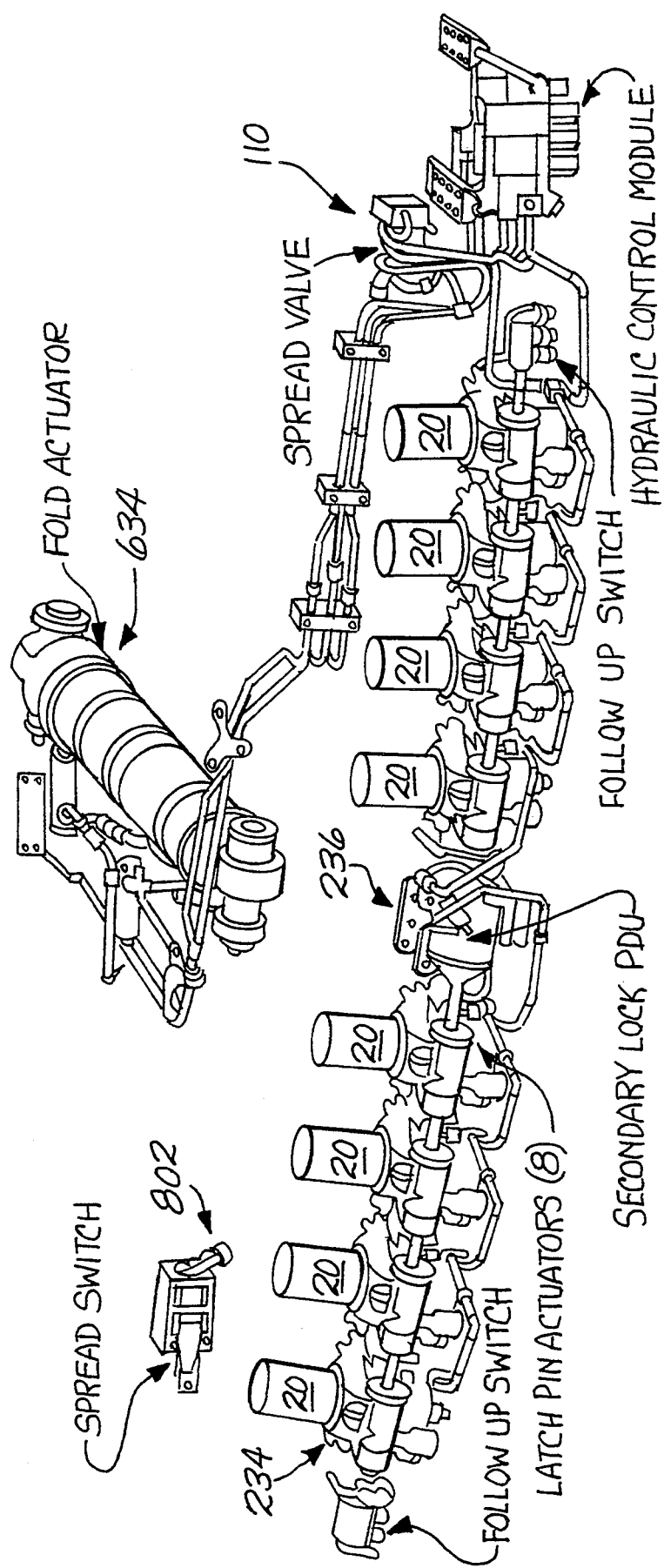
FIG. 62 is a schematic view showing the components of the system that are located along the hinge line.
Figure 63:
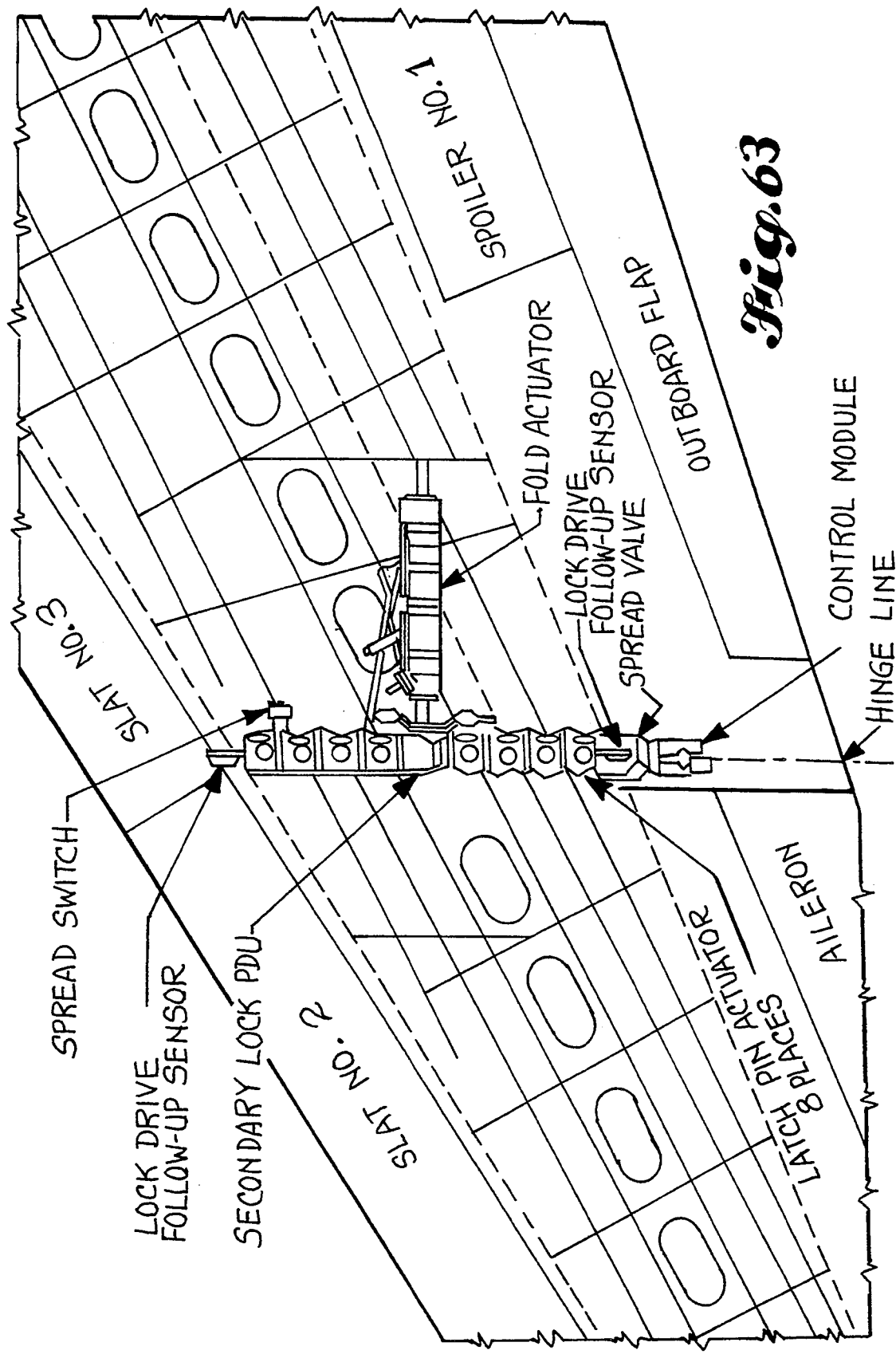
FIG. 63 is a partially schematic plan view showing the hinge location and the positions of the components shown in FIG. 62.

In addition to the components described above, i.e. the inhibitor/spread valve combination 28, 110, the PDU 236, the latch pin actuators 234, and the fold actuator 634, the system includes a number of components that relate directly to the control and monitoring of the system. FIGS. 62 and 63 illustrate the general configuration and relative positions of the components located along the hinge line 24. The additional components include a spread switch 802, shown in FIGS. 59–61. The function of the spread switch 802 is to electrically indicate the spread position of the wing tip 14. There is one spread switch 802 mounted on the inboard hinge rib 804 of each wing inside the wing box. The spread switch 802 is actuated by a linkage connected to the wing tip 14. A lever 806 is pivotably connected to the wing tip 14 at location 808. The opposite end of the lever 806 is pivotably connected to a link 810 by a pin connection 812. The link 810 is angled and has an opposite end pivotably connected to the spread switch 802 by a pin connection 814. The spread switch 802 includes three separate pressure switches that are connected to three separate electrical lines by connectors 816. Pivotal movement of the link 810 caused by pivoting of the wing tip 14 about the hinge 24 actuates cams inside the spread switch 802 to separately activate the three pressure switches. The resulting separate signals are each sent to the control and monitoring portions of the system through a separate connector 816 so that failure of one of the pressure switches will not affect the functioning of the others. One of the signals is used for system control, while the other two are used for monitoring the functioning of the system.

Another component that is important to the control and monitoring of the system is the follow-up switch 820, shown in FIGS. 19, 20, 62, 63, 66–68, and 70. There is one follow-up switch 820 located at each end of the secondary lock shaft, as shown in FIGS. 20, 62, 63, 66, and 68. One follow-up switch 820 is mounted aft of the aftmost latch pin actuator assembly 234 on the aft fairing bulkhead, and the other is mounted forward of the forwardmost latch pin actuator assembly 234 on the forward fairing bulkhead. The follow-up switch 820 is preferably a triple redundant position sensing device actuated by rotating movement of the secondary lock shaft. Also preferably, the follow-up switch 820 is identical to the spread switch 802 to enhance the commonality of parts in the overall system and thus help reduce the cost of providing and maintaining the system.

The function of the follow-up switch 820 is to indicate the locked position of the secondary lock shaft, which interconnects the latch pin actuators 234, and thus to monitor the position of the secondary locks 460. Since it is not possible for the secondary locks 460 and the secondary lock shaft to be in their locked positions unless all eight primary locks 458 are locked, all eight latch pins 20 are latched, and the wing tip 14 is spread, the follow-up switches 802 provide a crucial signal that the latching and locking mechanism is in its proper locked and latched condition near the end of the spread sequence. This signal is an indication that the wing configuration is safe for flight.. The signal from the follow-up switch 820 on each wing is processed by the FWE (described below), and the switch output is used by the monitoring system to indicate a safe flight condition to the flight crew. In addition to this indication function, the signal commands the system to disable, i.e. isolate, after the completion of the spread cycle.

Figure 65:
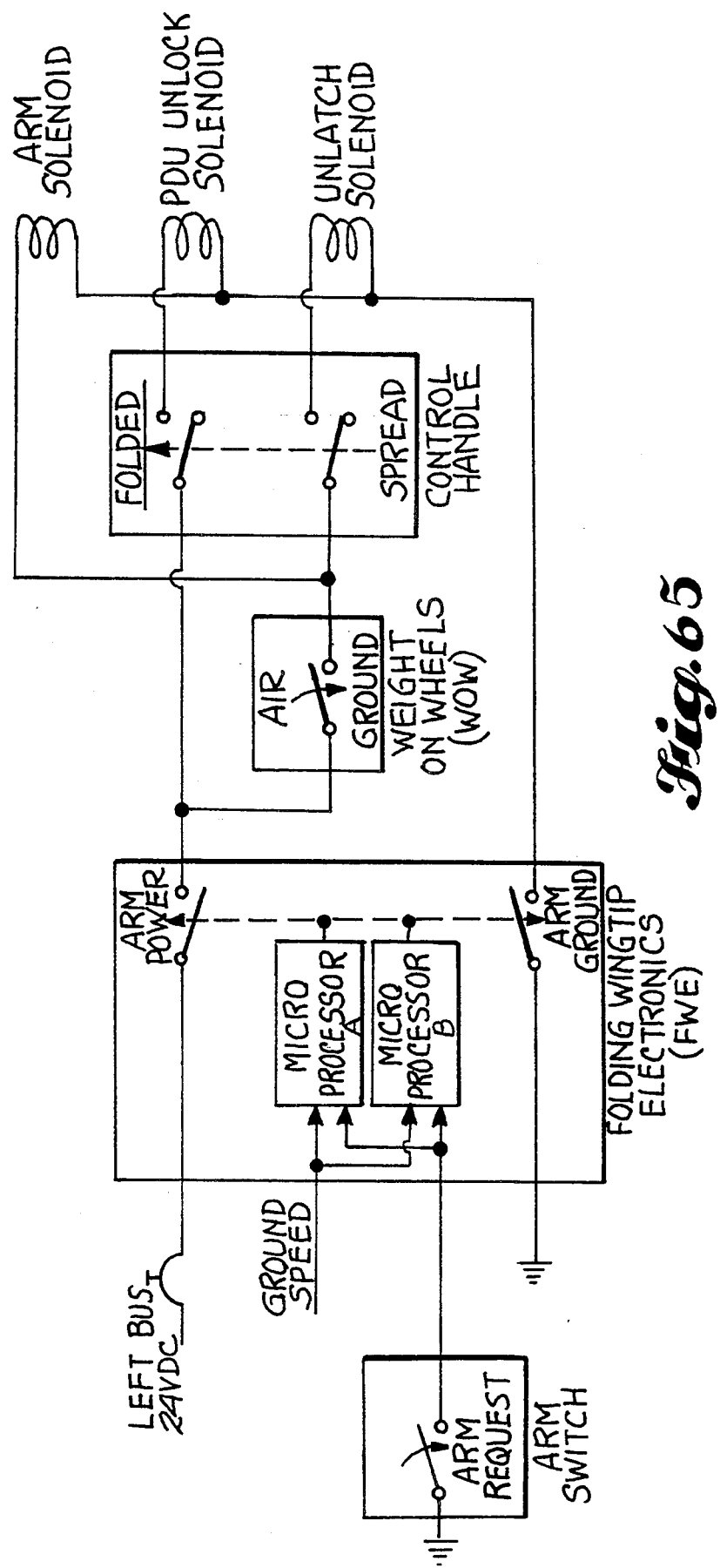
FIG. 65 is a diagram illustrating an overview of the control system.

The folding wing-tip system of the invention is a two-position system (folded or spread) that is electrically controlled and hydraulically powered. The system is controlled by operation of an arm switch and control lever or handle located in the flight deck. Enable, indication, and built-in test equipment (BITE) functions are performed by the folding wing-tip electronics (FWE), which is common to both wing tips and is located in the electrical/electronics bay. Beyond the common control outputs from the FWE, each wing tip operates independently of the other. Referring to FIG. 65, the FWE has dual identical microprocessors that perform essential functions, including checking ground speed data prior to responding to the arm switch and providing information to the flight crew through the engine indicating and crew alerting system (EICAS), which is an indication function. The FWE also provides enabling power to the system and interfaces with the arm light and control lever on the flight deck.

The system architecture is such that the FWE has no direct control over the wing tips. Therefore, failure of the FWE will not cause uncommanded motion of the wing tips. On completion of a fold or spread sequence, the FWE automatically disarms the system by removing the enable power.

Control of the system by the flight crew is provided by an arm switch and a control lever or handle located in the flight deck. Wing tip motion can be initiated only from the flight deck. The arm switch is a momentary contact push button switch. It is lighted with a legend indicating when the system is armed. After the arm request has been acknowledged, the arm sequence continues automatically. When at least one wing tip is electrically and hydraulically armed, the FWE illuminates the arm switch and unlocks the control lever.

The control lever has two detented positions, folded and spread. It is spring loaded so that it will move to the closest detented position if the pilot moves it out of detent and then releases it. The design of the control lever includes several safety features. A solenoid lock holds the lever in position until the system is armed. A manual lock override located in the flight deck near the lever allows the lever to be released manually if the solenoid lock fails. The lever has dual electrical contacts that are separately actuated. This prevents common-mode failures from causing both switch contacts to close. The lever is also designed to minimize inadvertent operation by requiring two pilot actions to move it to a new position. After the system is armed, the pilot must first squeeze the handle to release the lever and then rotate the lever to the new position. The three separate and specific steps required for the pilot to command fold or spread provide protection against inadvertent system operation but are simple and can be accomplished quickly in less than five seconds. To summarize, the three steps are pushing the arm switch, squeezing the control lever to release it, and rotating the control lever to the new position.

Figure 67A:
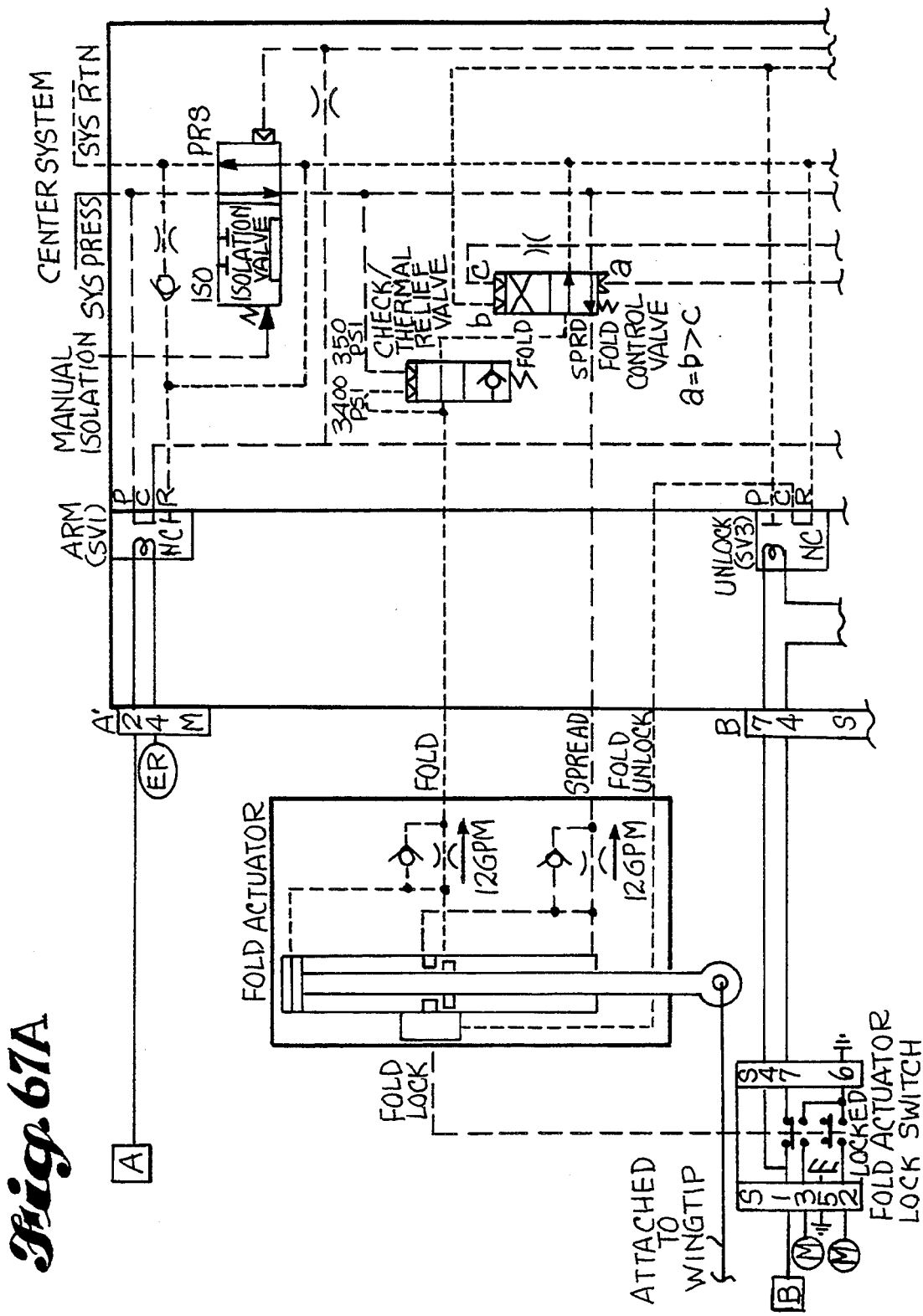
FIGS. 67–69 are detailed schematic diagrams that together show the complete system in detail.

A hydraulic control module is located in each wing tip 14 to provide control and sequencing functions. The module controls hydraulic flow to the fold actuator 634, the latch pin actuators 234, the secondary lock PDU 236, and the spread valve 110. As can be seen in FIG. 67, the module includes a number of components. These components are: an arm solenoid valve (SV1), an unlatch solenoid valve (SV2), a fold actuator unlock solenoid valve (SV3), a fold actuator control solenoid valve (SV4), an isolation valve with a manual isolation interface, a fold control valve, a latch control valve, two redundant pressure switches, a sequence valve, a delay valve, and a pressure-operated check/thermal relief valve. The control module receives electrical control inputs from the FWE, the arm switch and control lever located on the flight deck, the air/ground relays, the fold actuator lock switch, and the secondary lock PDU 236. Hydraulic inputs are received from the spread valve 110. Hydraulic flow from the aircraft center hydraulic system is ported by the control module to the latch pin actuator assemblies 234, the fold actuator 634, and the secondary lock PDU 236. The functioning of the hydraulic control module and its interfaces with the other parts of the system is explained in greater detail below in connection with the detailed description of the operation of the system.

Before describing in detail the steps of the fold sequence and the spread sequence, some comments in the nature of an overview of the system are appropriate. As noted above, the folding wing-tip system is a two-position system which is electrically controlled and hydraulically powered. Both wing tips are controlled by a single arm switch and control lever on the flight deck. Beyond the common command inputs from the flight deck, each wing tip operates independently of the other. The system is a "set and forget" type system, meaning that the pilot commands either spread or fold and the system thereafter automatically sequences the rest of the operation. The system is electrically and hydraulically isolated during all phases of flight and ground operations and is only powered during an actual fold or spread sequence. The system is enabled only when the aircraft is on the ground and is not moving or is moving at a taxi speed of less than fifty knots. The term "enabled" means that the system is available for use. The arm switch responds only when the system is enabled.

Figure 64:
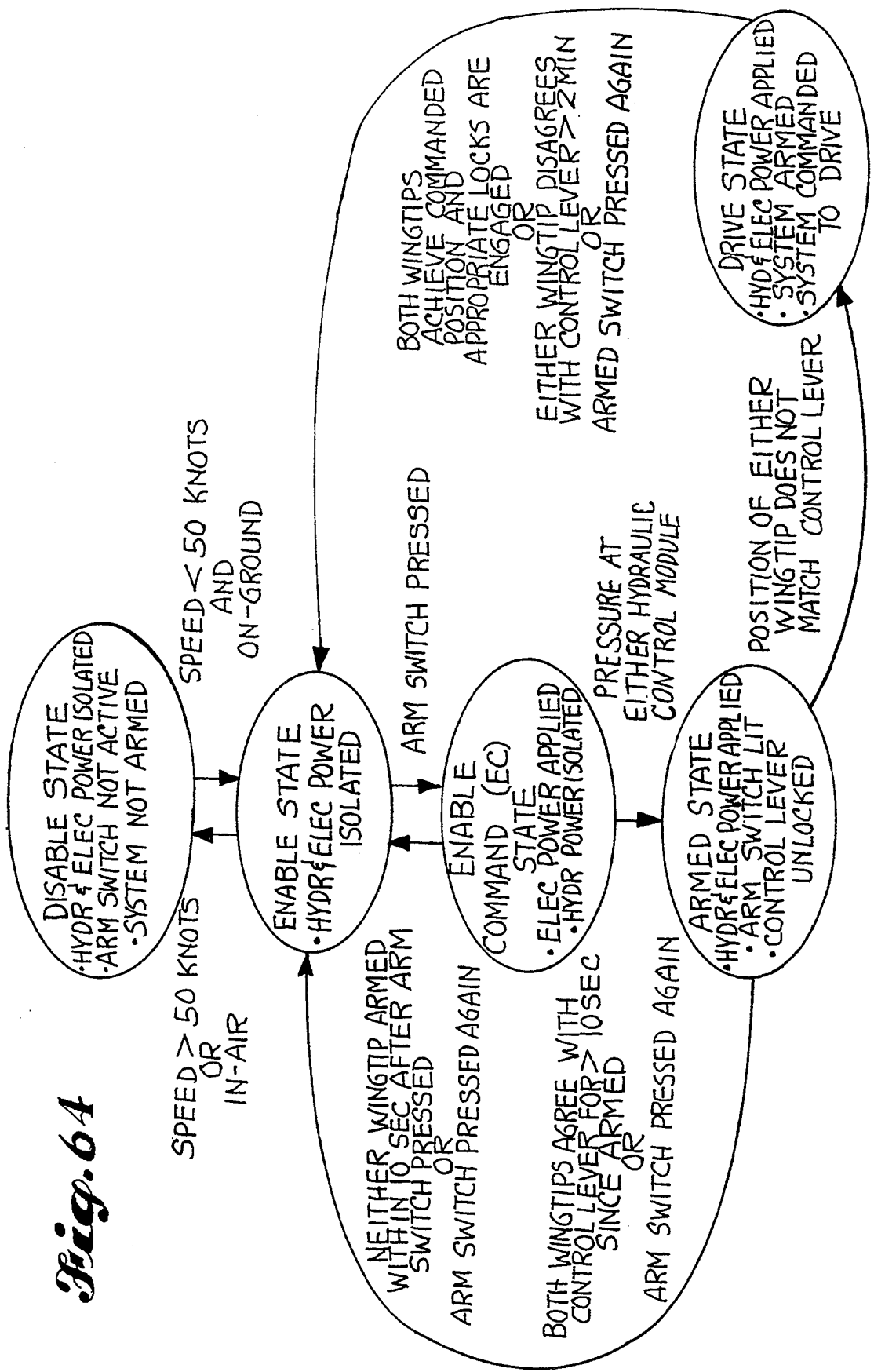
FIG. 64 is a diagram of the control states of the system.

In the normal operation of the system, in preparation for takeoff, the pilot commands the wing tips 14 to spread just prior to entering the active runway. The pilot first presses the arm switch, the arm switch lights up to indicate that the system is armed, and the pilot then commands spread by squeezing the control lever handle and rotating it downwardly. After landing, the pilot commands the wing tips 14 to fold as the aircraft exits the active runway. To fold the wing tips, the pilot first presses the arm switch, the arm switch lights up to indicate that the system is armed, and the pilot then commands fold by squeezing the control lever and rotating it upwardly. The system is designed so that a command reversal when the wing tips 14 are in transit will cause the wing tips to stop, reverse direction, and move to the new commanded position without damage to the system. FIG. 64 illustrates the enable and armed states of the system.

During a fold or spread sequence, the transit times of the wing tips 14 may vary slightly due to system tolerances and variations in aerodynamic loading between the two wing tips 14. These transit time variations may cause one wing tip 14 to reach the commanded position before the other. In most cases, the variation in transit time is not a problem. The secondary lock PDU differential gearing ensures that both wing tips ultimately reach their commanded position, and a spread condition or fold condition indication is not sent to the flight crew until the slowest wing tip reaches the commanded position. It is possible, however, that wing tip asymmetry could be caused by a system failure, rather than simply transit time variations. If the asymmetry persists such that the commanded position is not achieved by both wing tips 14 within thirty seconds, the pilot is provided with a caution message. The system continues to attempt to move the failed wing tip 14 for two minutes. If the commanded movement is still unsuccessful, the system disarms.

Figure 66:
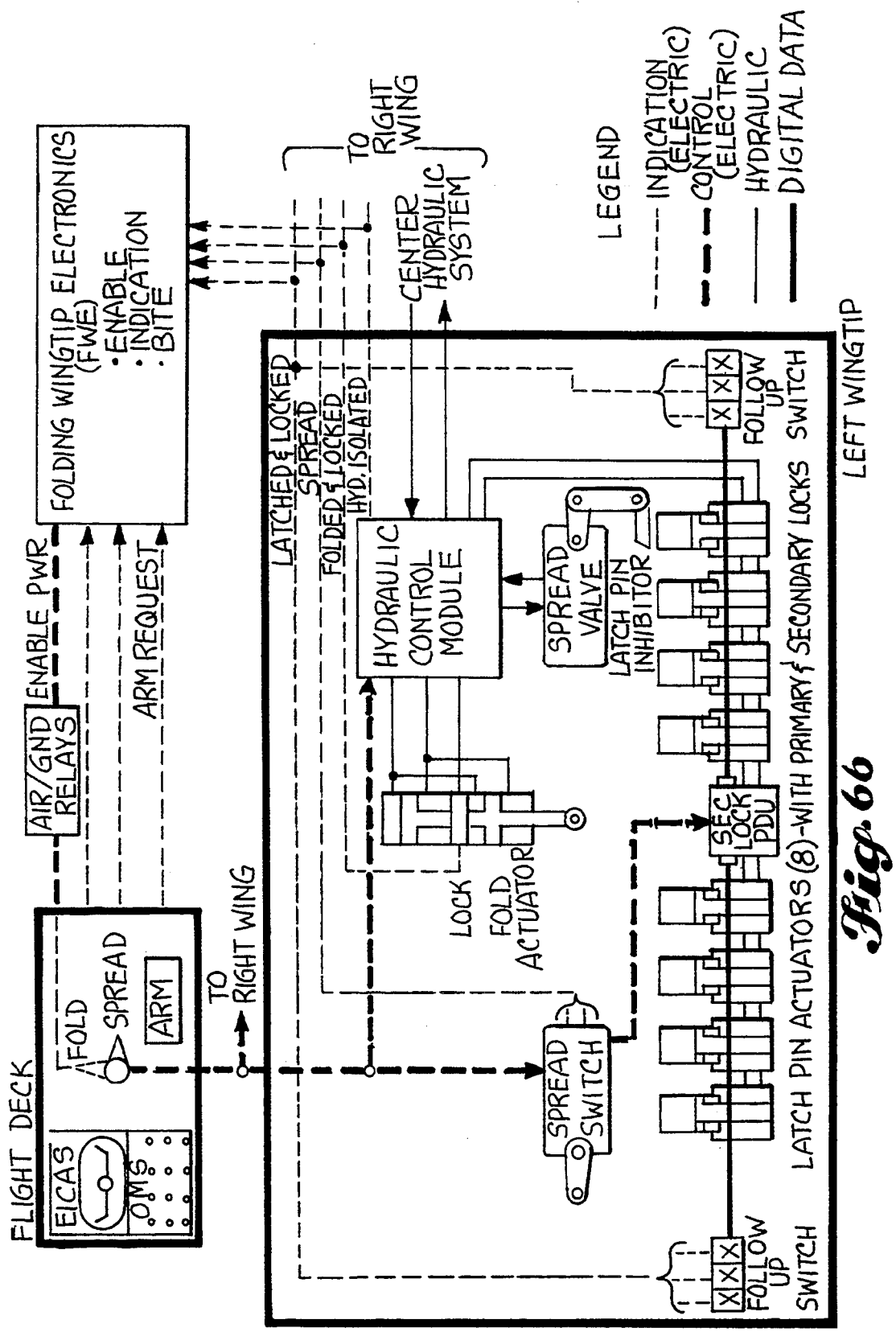
FIG. 66 is a schematic diagram of the overall system.
Figure 68A:
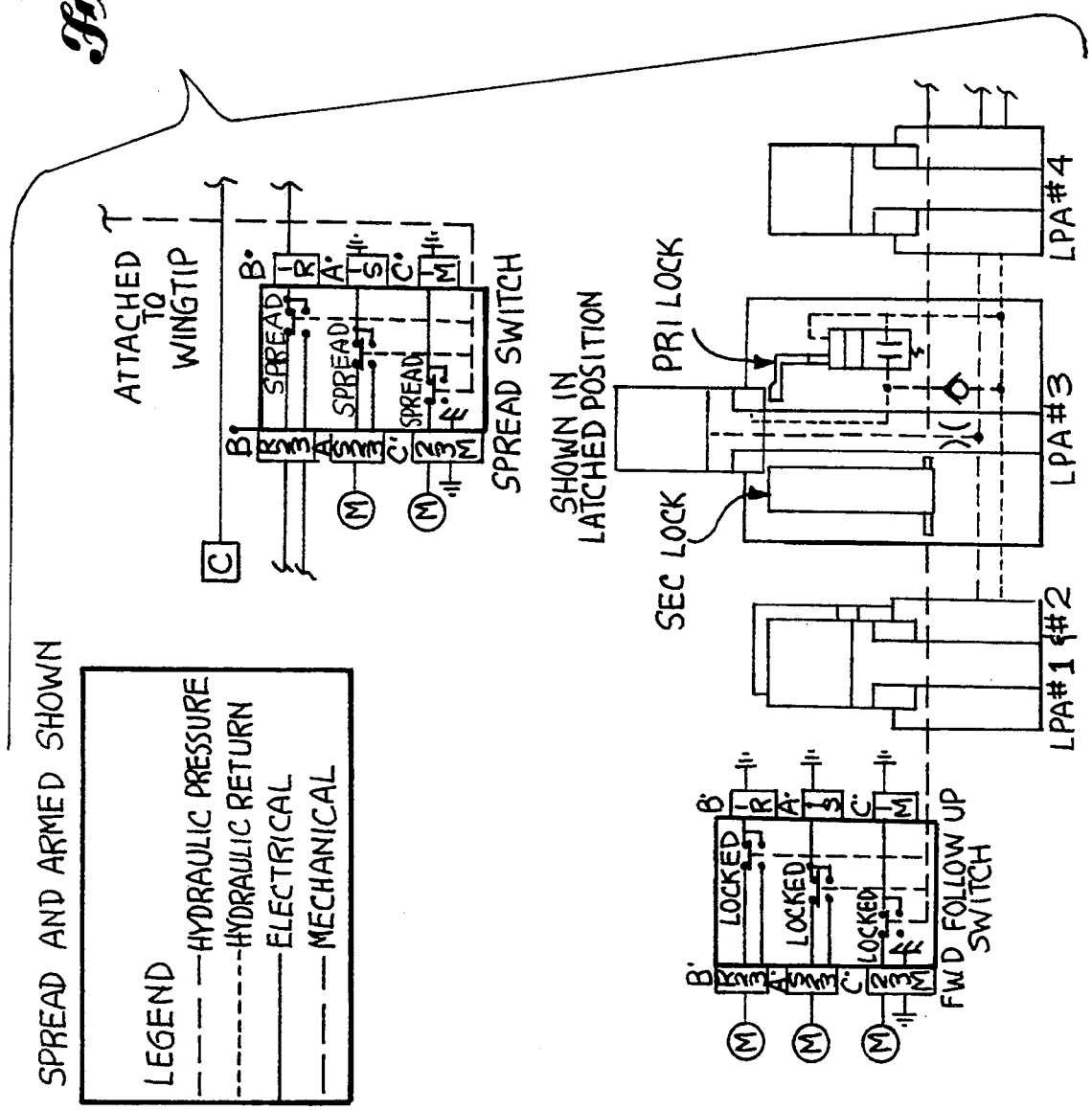
Figure 69B:
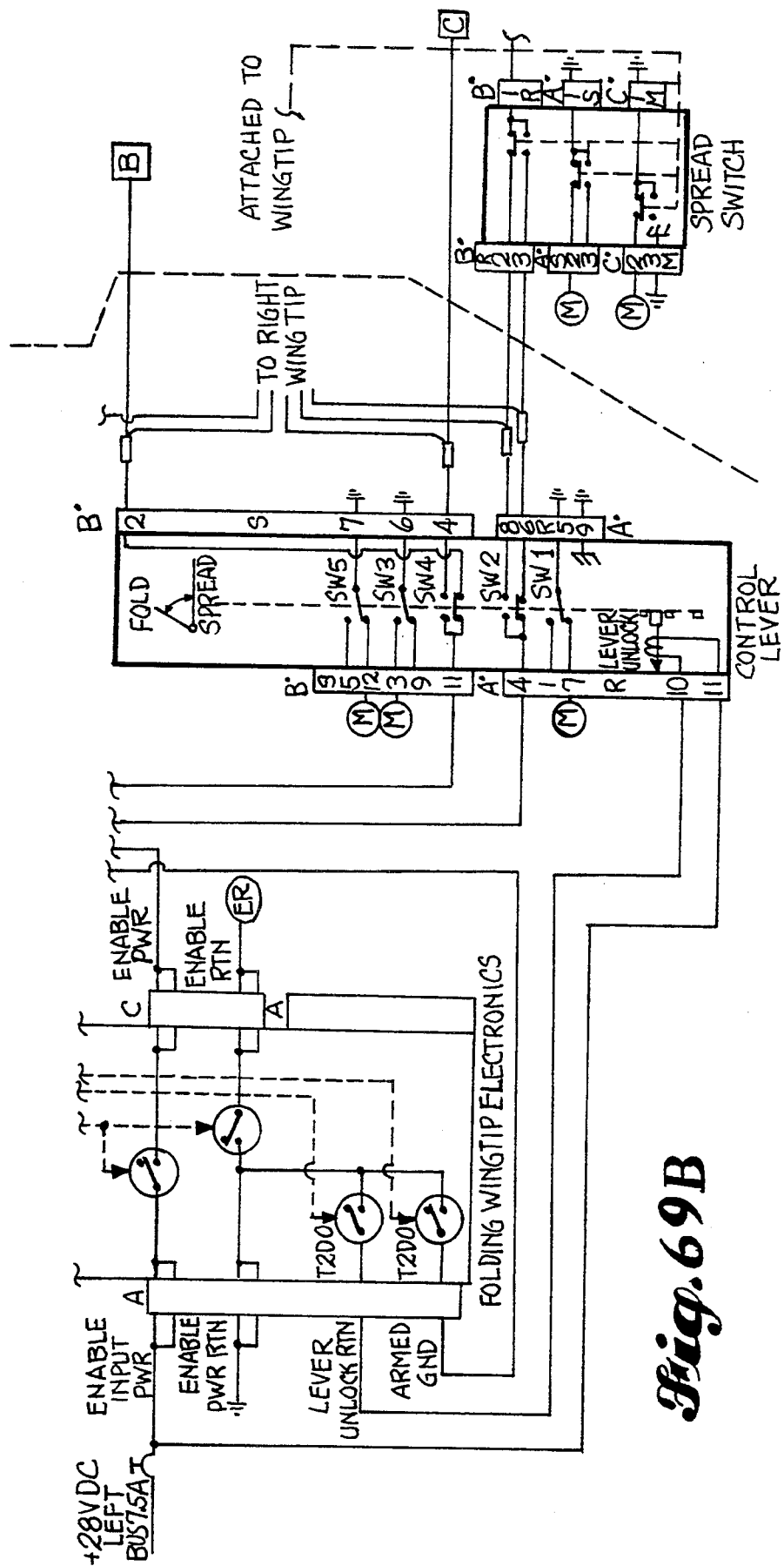
Figure 10:
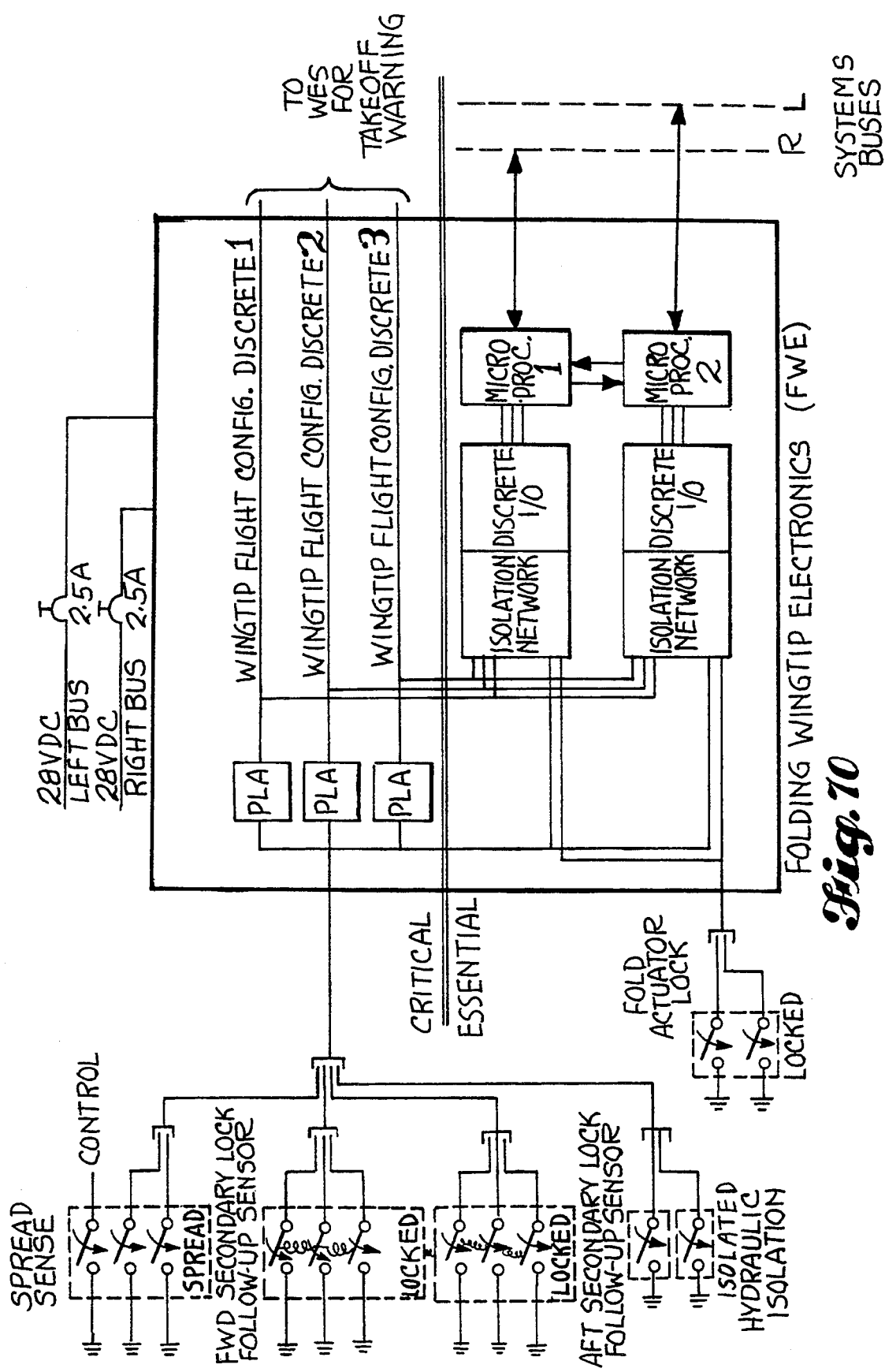

The detailed operation of the system is described below and illustrated in FIGS. 67-69, which show the system in its spread and armed condition. The operation is more generally illustrated in FIGS. 64-66. In FIG. 66, "OMS" stands for on-board maintenance system. In FIGS. 67-69, an "M" in a circle indicates that the element is monitored by the FWE. An "ER" in an oval indicates a connection to the FWE's enable return. An "A", "B", or "C" indicates a break in a connection as shown caused by the necessity for showing the system in three separate figures. Each end of a particular break is given the same letter designation. FIGS. 67-69 have overlapping portions to assist understanding of the overall system.

As described in connection with the general operation of the system, the system enable and arm commands are the same for both the fold sequence and the spread sequence. The system enable logic becomes true when the arm switch has been pressed on the flight deck and the ground speed of the aircraft is less than fifty knots. This is illustrated in FIG. 64 as a transition from the enable state to the enable command state. When the enable logic is true and either of the two air/ground relays WOW indicates that the aircraft is on the ground, the FWE energizes solenoid valve SV1 in the control module. The energizing of valve SV1 causes the isolation valve to open so that the system is pressurized. The armed logic becomes true, i.e. the system enters the armed state illustrated in FIG. 64, when the enable logic is true and both of the control module pressure switches (one on each wing tip 14) indicate that the corresponding control module is pressurized. If both wing tips 14 fail to arm within ten seconds after the arm switch is pressed, the system will automatically disarm. It should be noted that, if at any time both air/ground relays switch to an in-air indication, valve SV1 becomes de-energized and the system isolates.

Once the armed state has been achieved, the pilot commands either the fold sequence or the spread sequence. The fold sequence will be described first. The fold sequence begins with the enable command true, the wing-tips 14 spread, and the latch pins 20 inserted and locked. The secondary locks 460 are spring biased to their locked, i.e. 0°, position. After the armed logic becomes true, i.e. the armed state shown in FIG. 64 has been achieved, the FWE sends out appropriate signals to cause the arm switch to become lit to indicate the armed state shown in FIG. 64 to the flight crew, the control lever to become unlocked by releasing the solenoid lock, the secondary lock PDU 236 on each wing tip to be commanded to the locked position, the latch pin actuators 234 to be commanded to the latch position, the fold actuator 634 to be commanded to retract, and an indication to be provided to the flight crew that the control lever may be operated. The commands to the latch pin actuators 234 to latch and the fold actuator 634 to retract are accomplished by the provision of latch pressure to these components, in other words by the control module connecting the latch hydraulic line to pressure and the unlatch line to return. The commanding of the secondary lock PDU 236 to the locked position is also caused by latch pressure, and is reinforced by the fact that the PDU unlock solenoid 358 is de-energized. The movement of the latch pins 20 to their fully latched position unloads the primary locks 458. The full retraction of the fold actuator 634 ensures a fully spread position and unloads the latch pins 20.

After receiving an indication that the above steps have occurred, the pilot commands fold by moving the control lever from its spread position to its fold position. This must be accomplished within ten seconds of the armed logic becoming true or the system will automatically disarm. Movement of the control lever signals the FWE to supply power to the PDU unlock solenoid 358. Power is supplied to the solenoid 358 via the spread switch 802, as shown in FIGS. 68 and 69.

The energizing of the solenoid 358 causes the PDU 236 to reverse direction and move away from its 0° locked position. When the PDU 236 has rotated about 131°, the PDU unlocked switch 348 (FIG. 28) is activated, thereby energizing unlatch solenoid SV2 in the hydraulic control module. The unlatch solenoid SV2 ports hydraulic fluid to move the sequence valve to its fold position and the latch control valve to its unlatch position. This switches pressure in the system to the unlatch line, and connects the latch line to return. The unlatch pressure shifts the PDU spool valve 360 to permit further rotational movement of the PDU 236 under unlatch pressure. The PDU 236 continues to rotate to its unlatch-inhibit position (135°) where it stalls against the unlatch inhibit post 534 (FIG. 45C). The movement of the sequence valve to the fold position ensures that, when solenoid valve SV4 is subsequently energized, pressure will be supplied to the fold control valve to move it to a fold position and thereby cause the fold actuator 634 to extend.

The unlatch pressure is also provided to each latch pin actuator 234 via the unlatch hydraulic line it has in common with the PDU 236. The unlatch pressure unlocks the primary lock 458 of each latch pin actuator 234 and causes the latch pin 20 to begin to unlatch, i.e. retract. When each latch pin 20 is completely unlatched, it forces its corresponding unlatch inhibit post 534 to retract. When all of the latch pins 20 on a wing tip 14 have unlatched, the PDU 236 is permitted to drive the secondary lock shaft to the unlatched position (165°). The PDU unlatched switch 346 (FIG. 28) is activated by movement of the PDU 236 to its unlatched position. The switch 346 sends a signal to the control module that energizes the fold solenoid SV4. This causes the fold control valve to move to the fold position.

In response to movement of the fold control valve, the fold actuator 634 begins to extend, thereby pushing the wing tip 14 toward the folded position. When the wing tip 14 reaches 6.9° relative to the ground, the latch pin inhibitor 28 moves back to its inhibit position, thereby moving the spread valve 110 to indicate a not-spread condition. The movement of the spread valve 110 causes the delay valve in the hydraulic control module to move to the not-spread position. In the fold sequence, the delay valve does not cause a delay. The movement of the delay valve holds the fold control valve in its fold position and the latch control valve in its unlatched position. When the wing tip 14 reaches 19° relative to the ground, the spread switch 802 indicates not-spread. This causes the PDU unlock solenoid 358 to de-energize, thereby equalizing pressure in the two chambers 274, 278 of the PDU hydraulic actuator 264. The equalization of the pressure and the springs on the secondary lock gang shaft cause the PDU 236 to reverse its direction. The PDU 236 drives in the locked direction and stalls at the lock inhibit position (121°) when the secondary lock inhibit cam 494 contacts the primary lock inhibit cam 468, as shown in FIG. 45E. The PDU unlatch switch 346 indicates not-unlatched and sends a signal to the hydraulic control module that de-energizes the fold solenoid valve SV4. At this point, the spread valve 110 prevents the fold control valve from moving.

The purpose for returning the PDU 236 to the lock inhibit position is to enable verification that all of the latch pins 20 are present and retracted when the PDU 236 is commanded to unlatch at the beginning of the spread sequence. When the fold actuator 634 reaches its fully extended position, the fold actuator lock bolts LB automatically engage. The movement of the lock bolts into their locked position activates the fold actuator lock switch to indicate locked. Each fold actuator 634 is preferably provided with at least two redundant lock switches. When at least one fold actuator lock switch on each wing tip 14 indicates locked, the FWE sets the enable command to false, thereby de-energizing the arm solenoid SV1. This causes the isolation valve to depressurize the system. When the control module pressure switches indicate isolated, the FWE locks the control lever in the flight deck and turns off the arm light. The disarming of the system causes the primary locks 458 to be depressurized, and they come to rest against the latch pins 20 due to the force of their biasing springs. The PDU secondary lock inhibit cams 494 move to rest against the lock inhibit cams 468 on the primary locks 458 because of the torsion spring force on the secondary lock shaft. The system remains in this condition until the system is subsequently armed and a spread sequence is initiated.

The implementation of the spread sequence begins with the enable command true, the wing tips 14 folded, the fold actuator 634 locked, and the latch pins 20 retracted. The latch pins 20 may have drifted from their fully retracted positions due to leakage across the isolation valve and the unequal area of the latch pin actuator piston. The secondary locks 460 are spring biased to their lock inhibit position (121°).

After the armed logic becomes true, the arm switch becomes lit, the control lever is unlocked, the PDU 236 is pressurized toward the locked position (0°) but remains stalled at the lock inhibit position (121°), and the control module supplies pressure to the unlatch line and connects the latch line to return. The pressure in the unlatch hydraulic line causes the latch pin actuators 234 to fully retract any latch pins 20 that have drifted out of position. It also causes the fold actuator 634 to fully extend to unload the fold actuator lock bolts LB. The PDU 236 is pressurized toward the lock position because the PDU unlock solenoid 358 is de-energized and the unequal areas in the two PDU actuator chambers thus biases the PDU actuator 64 to the locked position.

The pilot commands spread by moving the control lever from its fold position to its spread position. As was the case in the fold sequence, this command must occur within ten seconds of arming of the system or the system will automatically disarm. Following the spread command, power is supplied to the PDU unlock solenoid 358 via the spread switch 802. This causes the PDU 236 to reverse direction under the influence of the high unlatch pressure and move from the lock inhibit position (121°) toward the unlatch position (165°). The PDU 236 may temporarily stall at the unlatch inhibit position (135°) if all of the latch pins 20 are not completely retracted. When the PDU 236 reaches 157°, the PDU unlatched switch 346 sends power to the unlock solenoid SV3 in the control module. The solenoid SV3 is thereby actuated to direct pressure from the spread valve 110 to unlock the fold actuator lock. When the fold actuator lock switches indicate unlocked, the fold solenoid SV4 is energized and directs pressure via the sequence valve to the fold control valve to move the fold control valve to its spread position.

Movement of the fold control valve causes the fold actuator 634 to begin to retract, thereby pulling the wing tip 14 toward the spread position. When the wing tip 14 reaches 12° relative to the ground, the spread switch 802 indicates spread, and the PDU unlock solenoid 358 is de-energized. This reverses the PDU direction. The PDU 236 drives toward the locked position (0°) but stalls at the lock inhibit position (121°) when the secondary lock inhibit cam 494 contacts the primary lock inhibit cam 468, as shown in FIG. 46D. When the wing tip reaches 6.9° relative to the ground, the latch pin inhibitor 28 is moved by the wing tip lug 16 to its engaged position. Movement of the inhibitor 28 activates the spread valve 110 via the linkage between the inhibitor 28 and the valve 110 so that the valve 110 moves to the spread position. Movement of the spread valve 110 activates the delay valve in the control module, which shuttles in one second and then causes the latch control valve to move to the latch position. Movement of the latch control valve switches high pressure to the latch line and connects the unlatch line to return. This pressurizes the latch pins 20 to extend. The PDU 236 continues to be driven toward its locked position (0°) but is blocked by the primary lock inhibit cams 468. The primary locks 458 are spring driven toward a lock position, but stall against the retracted latch pins 20. The high latch pressure causes the latch pin actuators 234 to extend the latch pins 20 to the latched position. As each pin 20 reaches its latched position, its primary lock 458 is freed and moves to the locked position shown in FIG. 46E. When the final primary lock 458 on a wing tip 14 is locked, the PDU 236 is free to continue movement toward the locked position and thereby move the secondary locks 460 to the locked position shown in FIG. 46F.

When the secondary lock shaft reaches its locked position and thereby activates the follow-up switches 820, and the spread switches 802 detect a spread condition on both wing tips 14, the FWE sets the enable command to false. This de-energizes the arm solenoid SV1 and causes the control module isolation valve to depressurize the system. When the control module pressure switches indicate isolated, the FWE locks the control lever and turns off the arm light. This causes the EICAS to display to the crew an indication of a safe flight condition.

The monitoring portion of the system is illustrated in FIG. 70. The FWE receives electrical signals from the spread switch ("spread sense" in FIG. 70) 802, the secondary lock shaft follow-up switches or sensors 820, the hydraulic isolation pressure switches in the control module, and the fold actuator lock switches. The FWE processes these signals through a flight critical takeoff warning path to indicate to the flight crew when the wing tips are unsafe for flight. The warning path includes triple redundant programmable logic arrays (PLA's) which derive a "wingtip flight configuration" (safe for flight) discrete based on the switch information. The three discretes are hard wired to the warning electronic system (WES). The WES provides the fail-safe, flight critical takeoff warning function through the aircraft master caution and warning system and through EICAS. No single failure within the folding wing-tip system can prevent the critical indication function from accurately indicating whether or not the wing tips 14 are properly in the spread-latched-and-locked flight configuration.

For maintenance purposes, the system includes a manual isolation drive located near the wing hinge line 24. The isolation drive permits manual locking of the control module isolation valve into an isolation position to ensure that the system components are hydraulically isolated at the wing tip 14. In order to make possible the dispatch of the aircraft with the folding wing-tip system inoperative, a manual lockout drive 288, described above, is provided on the secondary lock PDU 236. This drive 288 manually locks the secondary lock 460 in the locked position.

There are a number of aspects to the system that are novel and contribute to the high level of safety and cost effectiveness of the system. As discussed above, the system is a set and forget system from the point of view of the flight crew. All the pilot must do to cause a fold or spread sequence is to arm the system and then command spread or fold. In contrast, the military folding wing tip aircraft design requires the pilot to sequence the entire operation.

The secondary lock PDU 236 and the latch pin actuators 234 are the heart of the system. The architecture of these components minimizes the number of hydraulic lines required along the crowded hinge line 24. The architecture also results in the use of the secondary lock shaft for both detecting latch pin position and accomplishing the locking of the latch pins 20 into position. The locking is carried out by use of mechanical interferences within the latch pin actuators 234, which allows the minimum number of hydraulic lines.

The system utilizes a combination of hydro-mechanical, electro-hydraulic, and electro-mechanical sequencing to complete each of the steps in the fold sequence and the spread sequence. To guarantee flight safety, certain crucial conditions must occur on each wing tip 14 before takeoff. These conditions are: the wing tip 14 must be spread; all eight latch pins 20 must be latched; all eight primary locks 458 must be locked; the secondary lock 460 must be locked; and the system must be isolated from hydraulic power. If any one of these conditions did not occur, flight safety would be compromised. Therefore, accurate and full-proof indication of the wing-tip and system status must be provided to the flight deck and to the takeoff warning system. Electrical position sensing of each component would be relatively unreliable due to the large number of components that must be monitored. The use by the system of hydro-mechanical, electro-hydraulic, and electro-mechanical sequencing solves the problem of the need for reliability and the potentially conflicting need for maintaining simplicity of the monitoring elements. The system uses mechanical interference during the fold and spread sequences to prevent the next state from occurring unless the previous state has been successfully completed. The final locked position of the secondary lock shaft is the only state of the latching and locking components that is electrically monitored to confirm ready-for-takeoff status. This allows the system to remain relatively simple while providing an extremely high level of safety.

The system also provides a high level of in-flight safety. The system effectively prevents uncommanded fold in-flight by the use of dual locks 458, 460 on each latch pin 20 combined with the hydraulic isolation of the system in flight. In addition, the FWE, in its monitoring function, provides three separate electrical control paths to prevent uncommanded fold during flight. The net result is that no two failures, regardless of probability, can cause the wing tips to fold in-flight. Folding of the wing tips 14 due to a fold command in-flight is also prevented. System operation is inhibited in-flight via the air/ground and air speed logic. Folding wing tip operation is inhibited when the aircraft is in the air or is moving at speeds greater than fifty knots, as described above. Additional safety is built into the PDU 236. The unlock-inhibit valve 360 prevents the PDU from unlocking if the PDU is in its locked position and the unlatch line is pressurized. This prevents latent system failures from causing unlocking and unlatching during flight.

The hydraulic isolation of the system when the system is not operating ensures that the wing tips 14 are held in either the spread position or the fold position without relying on hydraulic power. The latches and locks of the latch pin actuator assemblies 234 retain the wing tip 14 in the spread position. The lock internal to the fold actuator 634 holds the wing tip 14 in the folded position. In contrast, the military aircraft uses active hydraulics to retain the wing in the folded position and the latch pins in the unlatch position on the ground. In addition, the hydraulics in the military aircraft are active on the wingfold during flight whenever the landing gear is down. This increases the exposure to inadvertent or uncommanded fold in-flight.

Although the preferred embodiment of the invention has been illustrated and described herein, it is intended to be understood by those skilled in the art that various modifications and omissions in form and detail may be made without departing from the spirit and scope of the invention as defined by the following claims.

What is claimed is:

1. A folding wing-tip system, comprising:
    a hinge extending substantially in a forward/aft direction along an aircraft wing and pivotably connecting a wing-tip portion to an inboard wing portion;
    a plurality of latch pin assemblies; each said assembly including a latch pin having a latch position in which it latches said wing-tip portion in a spread position, and a primary lock and a secondary lock; each said lock having a locked position in which it blocks movement of said latch pin out of said latch position; and each said primary lock, when it is out of its locked position, mechanically blocking movement of the secondary lock in its assembly into said secondary lock's locked position;
    a mechanism ganging said secondary locks together to cause them to move together into and out from their locked positions, said mechanism having a locked position corresponding to said locked positions of said secondary locks; and
    a follow-up switch mounted adjacent to said mechanism to sense movement of said mechanism and send a signal in response to said mechanism moving into said mechanism's locked position.

2. The system of claim 1, further comprising a spread switch mechanically linked to said wing-tip portion and responsive to movement of said wing-tip portion into said spread position.

3. The system of claim 2, in which each said primary lock is movable independently of the other primary locks, into and out of its locked position.

4. The system of claim 1, in which each said primary lock is movable independently of the other primary locks, into and out of its locked position.

5. A method of monitoring a latched and locked condition of a plurality of latch pins each having a latch position in which it latches a folding aircraft wing tip in a spread position, comprising:
    providing each said latch pin with a primary lock and a secondary lock, each said lock having a locked position in which it blocks movement of said latch pin out of said latch position;
    configuring and positioning said primary locks and said secondary locks so that each said primary lock mechanically blocks its corresponding secondary lock from moving into said secondary lock's locked position when said primary lock is out of its locked position;
    ganging said secondary locks together so that they all move together into and out from their locked positions;
    sensing movement of said secondary locks into their locked positions and sending a signal in response to said movement of said secondary locks; and
    using said signal to determine that all of said latch pins are latched and all of said primary and secondary locks are in their locked positions.

6. The method of claim 5, comprising mounting said primary locks to be movable, independently of each other, into and out from their locked positions.

7. The method of claim 6, further comprising mechanically linking a spread switch to said wing tip to be responsive to movement of said wing tip into and out from said spread position.

8. The method of claim 5, further comprising mechanically linking a spread switch to said wing tip to be responsive to movement of said wing tip into and out from said spread position.

9. A method for determining if a folding aircraft wing tip is fully spread and of sequencing spreading of the wing tip and latching it into a spread position, comprising:
    with the wing tip in a folded position, positioning an inhibitor in an inhibit position in which it blocks movement of a latch pin into a latch position and in which it will be contacted and moved by the wing tip as the wing tip moves toward said spread position;
    linking said inhibitor to a valve member of a valve to translate movement of said inhibitor caused by contact with the wing tip into movement of said valve member from a first position in which a sense port is connected to a first hydraulic pressure to a second position in which said sense port is connected to a second hydraulic pressure; connecting said sense port to an additional valve and transmitting said second hydraulic pressure from said sense port to said additional valve; and allowing said second hydraulic pressure to shift said additional valve to, in turn, cause hydraulic pressure to be supplied to extend said latch pin.

10. A method of preventing in-flight movement of a wing tip, in a folding wing-tip aircraft, from a spread position to a folded position, comprising:

latching the wing tip into said spread position by moving a plurality of hydraulically actuated latch pins into a latch position;

providing each said latch pin with a primary lock and a secondary lock, each said lock being hydraulically actuated and having a locked position in which it blocks movement of said latch pin out of said latch position;

biasing said secondary locks into their locked positions;

configuring and positioning said primary locks and said secondary locks so that each said secondary lock mechanically blocks its corresponding primary lock from moving out from said primary lock's locked position when said secondary lock is in its locked position; and during flight, isolating said latch pins and said primary and secondary locks from hydraulic pressure.

11. A method of sequencing spreading of a folding aircraft wing tip, moving a plurality of latch pins into a latch position in which they latch the wing tip in a spread position, and locking the latch pins in said latch position, comprising:

manually actuating a control member to initiate a command to spread the wing tip;

electrically activating, and electrically and hydraulically powering, a control and monitoring system in response to said command;

automatically spreading the wing tip and latching and locking said latch pins under the control of said control and monitoring system, using mechanical interferences to inhibit each step until previous steps have been successfully completed, and using each step to trigger a subsequent step.

12. The method of claim 11, comprising providing a lock mechanism and a lock mechanism actuator, and moving said lock mechanism actuator into a lock position to activate said lock mechanism to mechanically block movement of said latch pins out of said latch position; and further comprising sequencing folding of the wing tip from said spread position to a folded position, including positioning an inhibit member to mechanically block movement of said lock mechanism actuator out of said lock position when said actuator is in said lock position and hydraulic pressure is supplied to move said latch pins out of said latch position, to enable detection of a sequencing malfunction.

13. A method of locking a folding aircraft wing tip of a folding wing system into a folded position, comprising:

providing a hydraulic fold actuator having lock mechanism, and providing an isolation valve;

hydraulically operating said actuator to move it into a fold position and thereby move said wing tip into said folded position;

automatically activating said lock mechanism to lock said actuator in said fold position in response to movement of said actuator into said fold position;

generating an electrical signal in response to locking said actuator; and using said signal to cause said valve to depressurize the system, to isolate said actuator, including said lock mechanism, from hydraulic power, and allowing said actuator to act as a strut to hold said wing tip in said folded position.

* * * * *

UNITED STATES PATENT AND TRADEMARK OFFICE
CERTIFICATE OF CORRECTION

PATENT NO. : 5,381,986

DATED : January 17, 1995

INVENTOR(S) : Mark H. Smith, Michael E. Renzelmann, and Alan D. Marx

It is certified that error appears in the above-indentified patent and that said Letters Patent is hereby corrected as shown below:

In the Abstract, [57], 10th line from the bottom, "looked" should be -- locked --.

Column 6, line 61, "ends,portion" should be -- end portion --.

Column 8, line 33, "pilot" should be -- pivot --.

Column 16, line 42, "looks" should be -- locks --.

Column 19, lines 40, 41, "Cylinder" should be -- cylinder --.

Column 20, line 55, delete the apostrophe before "secondary".

Column 22, line 45, "Referring" begins a new paragraph.

Column 25, line 35, "1204" should be -- 120° --.

Column 32, line 1, "Once" begins a new paragraph.

Column 38, line 61, "actuator 64" should be -- actuator 264 --.

UNITED STATES PATENT AND TRADEMARK OFFICE
CERTIFICATE OF CORRECTION

PATENT NO.   : 5,381,986
DATED        : January 17, 1995
INVENTOR(S)  : Mark H. Smith, Michael E. Renzelmann, and Alan D. Marx It is certified that error appears in the above-indentified patent and that said Letters Patent is hereby corrected as shown below:

Column 39, line 25, insert -- 14 --, after "wing tip".

Claim 9, column 42, line 65, "connecting" begins a new paragraph.

Claim 13, column 44, line 21, insert -- a -- after "having".

Signed and Sealed this

Twenty-seventh Day of June, 1995

Attest:

BRUCE LEHMAN

Attesting Officer

Commissioner of Patents and Trademarks